US009453857B2

(12) United States Patent
Proksch et al.

(10) Patent No.: US 9,453,857 B2
(45) Date of Patent: Sep. 27, 2016

(54) AM/FM MEASUREMENTS USING MULTIPLE FREQUENCY OF ATOMIC FORCE MICROSCOPY

(71) Applicant: Oxford Instruments Asylum Research, Inc., Goleta, CA (US)

(72) Inventors: Roger Proksch, Santa Barbara, CA (US); Jason Bemis, Santa Barbara, CA (US); Aleksander Labuda, Goleta, CA (US)

(73) Assignee: Oxford Instruments Asylum Research, Inc, Goleta, CA (US)

( * ) Notice: Subject to any disclaimer, the term of this patent is extended or adjusted under 35 U.S.C. 154(b) by 0 days.

(21) Appl. No.: 14/694,980

(22) Filed: Apr. 23, 2015

(65) Prior Publication Data

US 2015/0309071 A1    Oct. 29, 2015

Related U.S. Application Data

(60) Provisional application No. 61/995,905, filed on Apr. 23, 2014.

(51) Int. Cl.
*G01Q 60/32* (2010.01)
*G01Q 40/00* (2010.01)

(52) U.S. Cl.
CPC .............. *G01Q 60/32* (2013.01); *G01Q 40/00* (2013.01)

(58) Field of Classification Search
CPC .............................. G01Q 60/32; G01Q 40/00
See application file for complete search history.

(56) References Cited

U.S. PATENT DOCUMENTS

| 5,047,633 | A | 9/1991 | Finlan et al. | |
|---|---|---|---|---|
| 5,412,980 | A | 5/1995 | Elings et al. | |
| 6,906,450 | B2 * | 6/2005 | Tamayo De Miguel | G01Q 60/32 310/316.01 |
| 7,434,445 | B2 * | 10/2008 | Proksch | G01Q 40/00 73/1.79 |
| 7,603,891 | B2 | 10/2009 | Proksch | |
| 7,617,720 | B2 * | 11/2009 | Okajima | G01Q 60/32 73/105 |
| 7,921,466 | B2 | 4/2011 | Garcia Garcia et al. | |
| 7,937,991 | B2 | 5/2011 | Proksch et al. | |
| 7,958,563 | B2 | 6/2011 | Garcia et al. | |
| 8,024,816 | B2 * | 9/2011 | Iyoki | G01Q 10/06 250/307 |
| 8,024,963 | B2 * | 9/2011 | Proksch | G01Q 60/32 73/105 |
| 8,677,809 | B2 * | 3/2014 | Proksch | G01Q 40/00 73/105 |
| 8,997,259 | B2 * | 3/2015 | Su | G01Q 30/00 73/105 |
| 2015/0301080 | A1 * | 10/2015 | Proksch | G01Q 60/32 850/33 |

* cited by examiner

*Primary Examiner* — Jack Berman
(74) *Attorney, Agent, or Firm* — Law Office of Scott C Harris, Inc

(57) ABSTRACT

Apparatus and techniques presented combine the features and benefits of amplitude modulated (AM) atomic force microscopy (AFM), sometimes called AC mode AFM, with frequency modulated (FM) AFM. In AM-FM imaging, the topographic feedback from the first resonant drive frequency operates in AM mode while the phase feedback from second resonant drive frequency operates in FM mode. In particular the first or second frequency may be used to measure the loss tangent, a dimensionless parameter which measures the ratio of energy dissipated to energy stored in a cycle of deformation.

1 Claim, 33 Drawing Sheets

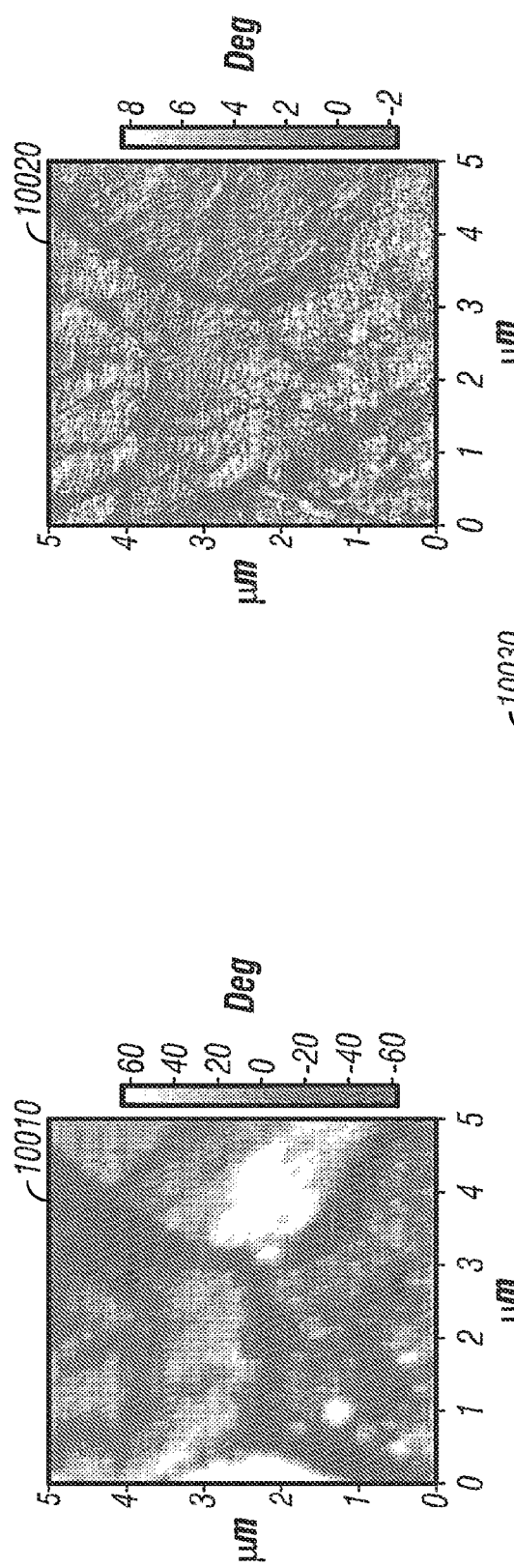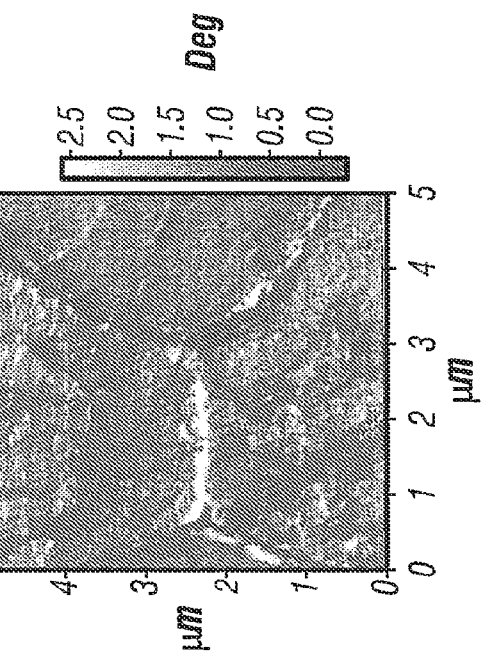
FIG. 10A  FIG. 10B  FIG. 10C

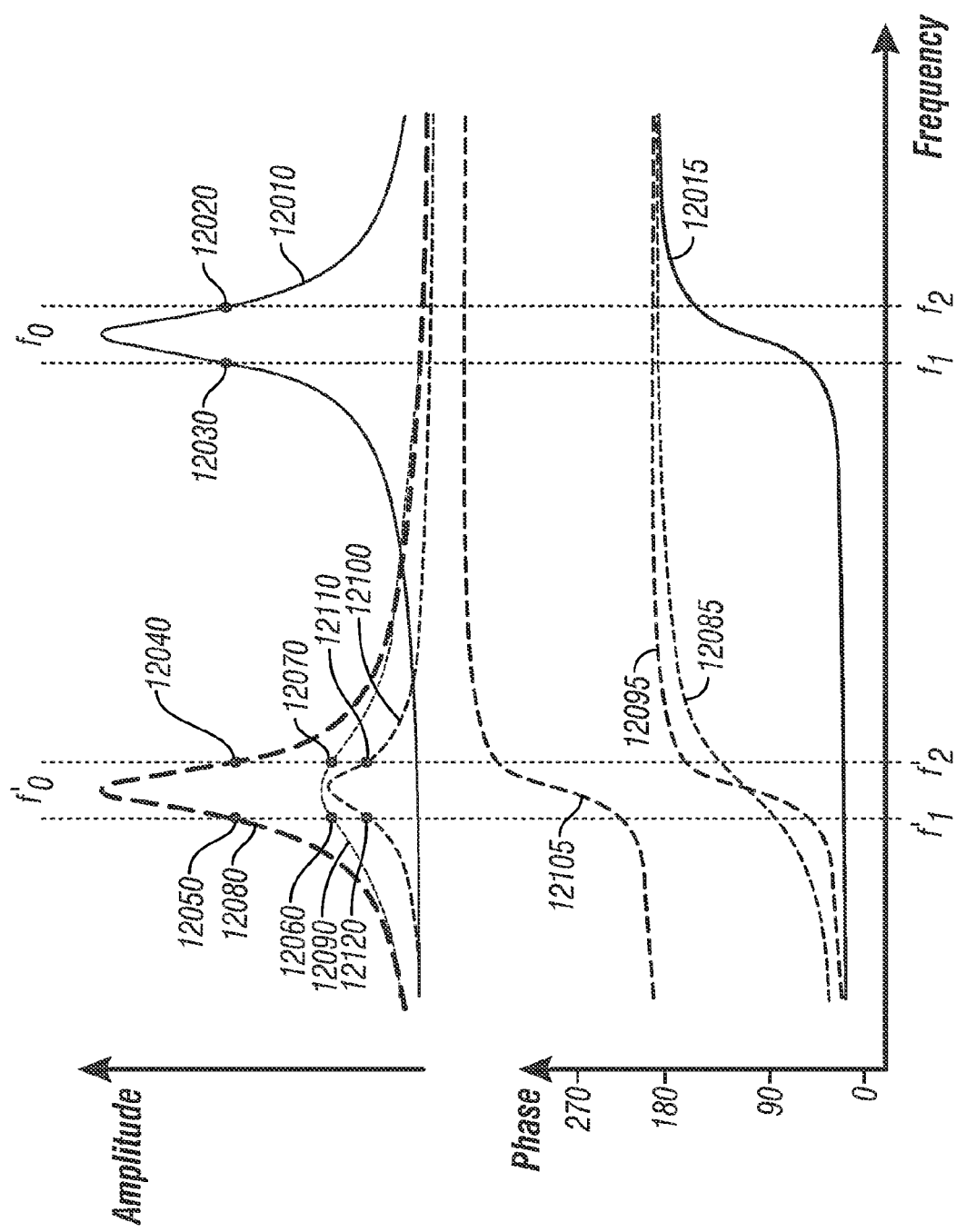

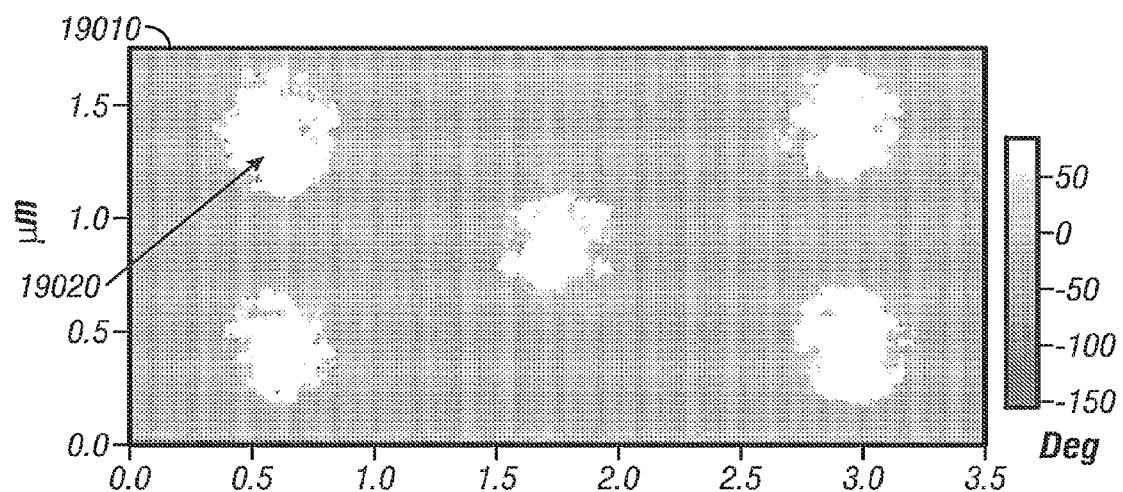
FIG. 17
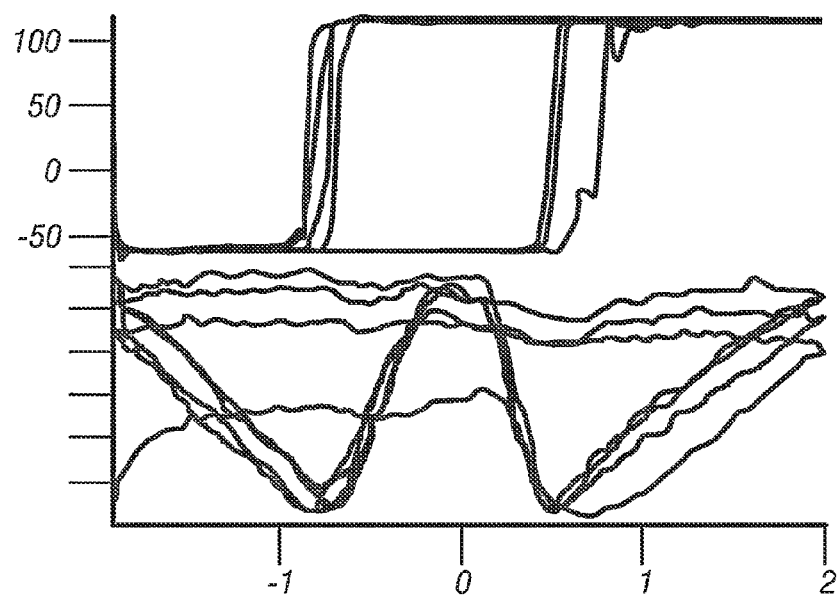
FIG. 18          V

AM/FM MEASUREMENTS USING MULTIPLE FREQUENCY OF ATOMIC FORCE MICROSCOPY

This application claims priority from provisional No. 61/995,905, filed Apr. 23, 2014, the entire contents of which are herewith incorporated by reference.

BACKGROUND OF THE INVENTION

For the sake of convenience, the current description focuses on systems and techniques that may be realized in a particular embodiment of cantilever-based instruments, the atomic force microscope (AFM). Cantilever-based instruments include such instruments as AFMs, molecular force probe instruments (1D or 3D), high-resolution profilometers (including mechanical stylus profilometers), surface modification instruments, chemical or biological sensing probes, and micro-actuated devices. The systems and techniques described herein may be realized in such other cantilever-based instruments.

An AFM is a device used to produce images of surface topography (and/or other sample characteristics) based on information obtained from scanning (e.g., rastering) a sharp probe on the end of a cantilever relative to the surface of the sample. Topographical and/or other features of the surface are detected by detecting changes in deflection and/or oscillation characteristics of the cantilever (e.g., by detecting small changes in deflection, phase, frequency, etc., and using feedback to return the system to a reference state). By scanning the probe relative to the sample, a "map" of the sample topography or other sample characteristics may be obtained.

Changes in deflection or in oscillation of the cantilever are typically detected by an optical lever arrangement whereby a light beam is directed onto the cantilever in the same reference frame as the optical lever. The beam reflected from the cantilever illuminates a position sensitive detector (PSD). As the deflection or oscillation of the cantilever changes, the position of the reflected spot on the PSD changes, causing a change in the output from the PSD. Changes in the deflection or oscillation of the cantilever are typically made to trigger a change in the vertical position of the cantilever base relative to the sample (referred to herein as a change in the Z position, where Z is generally orthogonal to the XY plane defined by the sample), in order to maintain the deflection or oscillation at a constant pre-set value. It is this feedback that is typically used to generate an AFM image.

AFMs can be operated in a number of different sample characterization modes, including contact mode where the tip of the cantilever is in constant contact with the sample surface, and AC modes where the tip makes no contact or only intermittent contact with the surface.

Actuators are commonly used in AFMs, for example to raster the probe or to change the position of the cantilever base relative to the sample surface. The purpose of actuators is to provide relative movement between different parts of the AFM; for example, between the probe and the sample. For different purposes and different results, it may be useful to actuate the sample, the cantilever or the tip or some combination of both. Sensors are also commonly used in AFMs. They are used to detect movement, position, or other attributes of various components of the AFM, including movement created by actuators.

For the purposes of the specification, unless otherwise specified, the term "actuator" refers to a broad array of devices that convert input signals into physical motion, including piezo activated flexures, piezo tubes, piezo stacks, blocks, bimorphs, unimorphs, linear motors, electrostrictive actuators, electrostatic motors, capacitive motors, voice coil actuators and magnetostrictive actuators, and the term "position sensor" or "sensor" refers to a device that converts a physical parameter such as displacement, velocity or acceleration into one or more signals such as an electrical signal, including capacitive sensors, inductive sensors (including eddy current sensors), differential transformers (such as described in co-pending applications US20020175677A1 and US20040075428A1, Linear Variable Differential Transformers for High Precision Position Measurements, and US20040056653A1, Linear Variable Differential Transformer with Digital Electronics, which are hereby incorporated by reference in their entirety), variable reluctance, optical interferometry, optical deflection detectors (including those referred to above as a PSD and those described in co-pending applications US20030209060A1 and US20040079142A1, Apparatus and Method for Isolating and Measuring Movement in Metrology Apparatus, which are hereby incorporated by reference in their entirety), strain gages, piezo sensors, magnetostrictive and electrostrictive sensors.

In both the contact and AC sample-characterization modes, the interaction between the probe and the sample surface induces a discernable effect on a probe-based operational parameter, such as the cantilever deflection, the cantilever oscillation amplitude, the phase of the cantilever oscillation relative to the drive signal driving the oscillation or the frequency of the cantilever oscillation, all of which are detectable by a sensor. In this regard, the resultant sensor-generated signal is used as a feedback control signal for the Z actuator to maintain a designated probe-based operational parameter constant.

In contact mode, the designated parameter may be cantilever deflection. In AC modes, the designated parameter may be oscillation amplitude, phase or frequency. The feedback signal also provides a measurement of the sample characteristic of interest. For example, when the designated parameter in an AC mode is oscillation amplitude, the feedback signal may be used to maintain the amplitude of cantilever oscillation constant to measure changes in the height of the sample surface or other sample characteristics.

The periodic interactions between the tip and sample in AC modes induces cantilever flexural motion at higher frequencies. Measuring the motion allows interactions between the tip and sample to be explored. A variety of tip and sample mechanical properties including conservative and dissipative interactions may be explored. Stark, et al., have pioneered analyzing the flexural response of a cantilever at higher frequencies as nonlinear interactions between the tip and the sample. In their experiments, they explored the amplitude and phase at numerous higher oscillation frequencies and related these signals to the mechanical properties of the sample.

Unlike the plucked guitar strings of elementary physics classes, cantilevers normally do not have higher oscillation frequencies that fall on harmonics of the fundamental frequency. The first three modes of a simple diving board cantilever, for example, are at the fundamental resonant frequency (f0), 6.19 f0 and 17.5 f0. An introductory text in cantilever mechanics such as Sarid has many more details. Through careful engineering of cantilever mass distributions, Sahin, et al., have developed a class of cantilevers whose higher modes do fall on higher harmonics of the fundamental resonant frequency. By doing this, they have observed that cantilevers driven at the fundamental exhibit enhanced contrast, based on their simulations on mechanical properties of the sample surface. This approach is has the disadvantage of requiring costly and difficult to manufacture special cantilevers.

The simple harmonic oscillator (SHO) model gives a convenient description at the limit of the steady state amplitude A of the eigenmode of a cantilever oscillating in an AC mode:

$$A = \frac{\frac{F_0}{m}}{\sqrt{(\omega_0^2 - \omega^2)^2 - (\omega \omega_0 / Q)^2}} \quad \text{(SHO)}$$

where $F_0$ is the drive amplitude (typically at the base of the cantilever), m is the mass, $\omega$ is the drive frequency in units of rad/sec, $\omega_0$ is the resonant frequency and Q is the "quality" factor, a measure of the damping.

If, as is often the case, the cantilever is driven through excitations at its base, the SHO expression becomes $$A = \frac{A_{drive} \omega_0^2}{\sqrt{(\omega_0^2 - \omega^2)^2 - (\omega_0 \omega)^2}} \quad \text{(SHO Amp)}$$

where $F_0/m$ has been replaced with $A_{drive} \omega_0^2$, where $A_{drive}$ is the drive amplitude.

The phase angle $\phi$ is described by an associated equation $$\phi = \tan^{-1}\left[\frac{\omega \omega_0}{Q(\omega_0^2 - \omega^2)}\right] \quad \text{(SHO Phase)}$$

When these equations are fulfilled, the amplitude and phase of the cantilever are completely determined by the user's choice of the drive frequency and three independent parameters: $A_{drive}$, $\omega_0$ and Q.

In some very early work, Martin, et al., drove the cantilever at two frequencies. The cantilever response at the lower, non-resonant frequency was used as a feedback signal to control the surface tracking and produced a topographic image of the surface. The response at the higher frequency was used to characterize what the authors interpreted as differences in the non-contact forces above the Si and photo-resist on a patterned sample.

Recently, Rodriguez and Garcia published a theoretical simulation of a non-contact, attractive mode technique where the cantilever was driven at its two lowest eigenfrequencies. In their simulations, they observed that the phase of the second mode had a strong dependence on the Hamaker constant of the material being imaged, implying that this technique could be used to extract chemical information about the surfaces being imaged. Crittenden et al. have explored using higher harmonics for similar purposes.

There are a number of techniques where the instrument is operated in a hybrid mode where a contact mode feedback loop is maintained while some parameter is modulated. Examples include force modulation and piezo-response imaging.

Force modulation involves maintaining a contact mode feedback loop while also driving the cantilever at a frequency and then measuring its response. When the cantilever makes contact with the surface of the sample while being so driven, its resonant behavior changes significantly. The resonant frequency typically increases, depending on the details of the contact mechanics. In any event, one may learn more about the surface properties because the elastic response of the sample surface is sensitive to force modulation. In particular, dissipative interactions may be measured by measuring the phase of the cantilever response with respect to the drive.

A well-known shortcoming of force modulation and other contact mode techniques is that the while the contact forces may be controlled well, other factors affecting the measurement may render it ill-defined. In particular, the contact area of the tip with the sample, usually referred to as contact stiffness, may vary greatly depending on tip and sample properties. This in turn means that the change in resonance while maintaining a contact mode feedback loop, which may be called the contact resonance, is ill-defined. It varies depending on the contact stiffness. This problem has resulted in prior art techniques avoiding operation at or near resonance.

SUMMARY OF THE INVENTION

Cantilevers are continuous flexural members with a continuum of vibrational modes. The present invention describes different apparatus and methods for exciting the cantilever simultaneously at two or more different frequencies and the useful information revealed in the images and measurements resulting from such methods. Often, these frequencies will be at or near two or more of the cantilever vibrational eigenmodes Past work with AC mode AFMs has been concerned with higher vibrational modes in the cantilever, with linear interactions between the tip and the sample. The present invention, however, is centered around non-linear interactions between the tip and sample that couple energy between two or more different cantilever vibrational modes, usually kept separate in the case of linear interactions. Observing the response of the cantilever at two or more different vibrational modes has some advantages in the case of even purely linear interactions however. For example, if the cantilever is interacting with a sample that has some frequency dependent property, this may show itself as a difference in the mechanical response of the cantilever at the different vibrational modes.

BRIEF DESCRIPTION OF THE DRAWINGS

FIGS. 10A-10D and 11 Images of a piezoelectric sample when the cantilever potential was driven at two different frequencies, one slightly below and the other slightly above the same contact resonance frequency.

FIG. 12 Amplitude versus frequency and phase versus frequency curves simultaneously measured at different frequencies.

FIG. 17-19 Images of a piezoelectric sample when the cantilever potential was driven at two different frequencies, one slightly below and the other slightly above the same contact resonance frequency.

DESCRIPTION OF THE PREFERRED EMBODIMENTS

Figure 1:
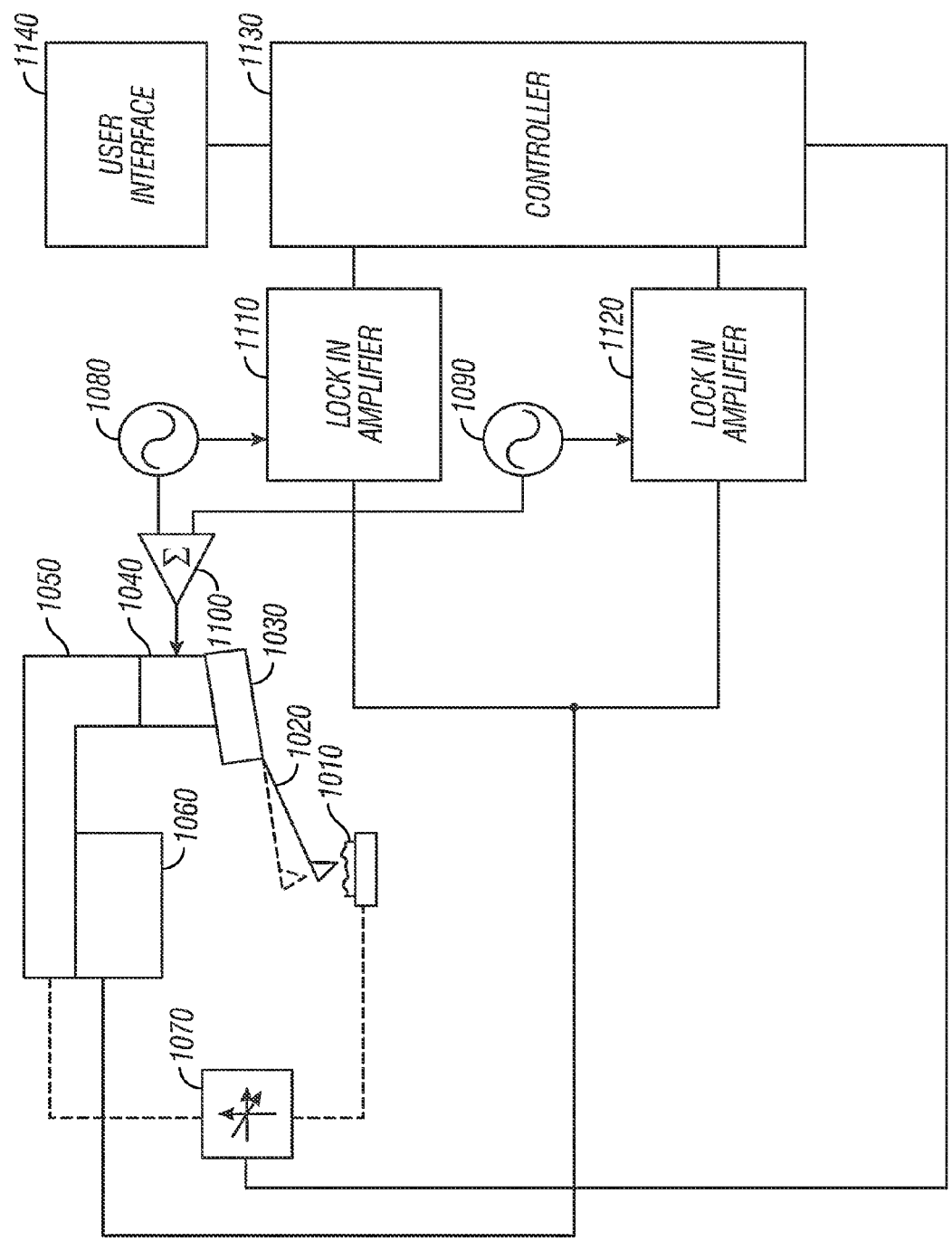
FIG. 1 Preferred embodiment for probing multiple eigenmodes of a cantilever.

FIG. 1 is a block diagram of a preferred embodiment of an apparatus for probing multiple eigenmodes of a cantilever in accordance with the present invention. The sample 1010 is positioned below the cantilever probe 1020. The chip of the cantilever probe 1030 is driven by a mechanical actuator 1040, preferably a piezoelectric actuator, but other methods to induce cantilever motion known to those versed in the art could also be used. The motion of the cantilever probe 1020 relative to the frame of the microscope 1050 is measured with a detector 1060, which could be an optical lever or another method known to those versed in the art. The cantilever chip 1030 is moved relative to the sample 1010 by a scanning apparatus 1070, preferably a piezo/flexure combination, but other methods known to those versed in the art could also be used.

The motion imparted to the cantilever chip 1030 by actuator 1040 is controlled by excitation electronics that include at least two frequency synthesizers 1080 and 1090. There could be additional synthesizers if more than two cantilever eigenmodes are to be employed. The signals from these frequency synthesizers could be summed together by an analog circuit element 1100 or, preferably, a digital circuit element that performs the same function. The two frequency synthesizers 1080 and 1090 provide reference signals to lockin amplifiers 1110 and 1120, respectively. In the case where more than two eigenmodes are to be employed, the number of lockin amplifiers will also be increased. As with other electronic components in this apparatus, the lockin amplifiers 1110 and 1120 can be made with analog circuitry or with digital circuitry or a hybrid of both. For a digital lockin amplifier, one interesting and attractive feature is that the lockin analysis can be performed on the same data stream for both eigenmodes. This implies that the same position sensitive detector and analog to digital converter can be used to extract information at the two distinct eigenmodes.

The lockin amplifiers could also be replaced with rms measurement circuitry where the rms amplitude of the cantilever oscillation is used as a feedback signal.

There are a number of variations in the FIG. 1 apparatus that a person skilled in the art could use to extract information relative to the different eigenmodes employed in the present invention. Preferably, a direct digital synthesizer (DDS) could be used to create sine and cosine quadrature pairs of oscillating voltages, each at a frequency matched to the eigenmodes of the cantilever probe 1030 that are of interest. This implementation also allows dc voltages to be applied, allowing methods such as scanning Kelvin probing or simultaneous current measurements between the tip and the sample. The amplitude and phase of each eigenmode can be measured and used in a feedback loop calculated by the controller 1130 or simply reported to the user interface 1140 where it is displayed, stored and/or processed further in an off-line manner. Instead of, or in addition to, the amplitude and phase of the cantilever motion, the quadrature pairs, usually designated x and y, can be calculated and used in a manner similar to the amplitude and phase.

In one method of using the FIG. 1 apparatus, the cantilever is driven at or near two or more resonances by the single "shake" piezo 1040. Operating in a manner similar to AC mode where the cantilever amplitude is maintained constant and used as a feedback signal, but employing the teachings of the present invention, there are now a number of choices for the feedback loop. Although the work here will focus on using the amplitude of the fundamental (A0), we were able to successfully image using one of the higher mode amplitudes (Ai) as a feedback signal as well as a sum of all the amplitudes A0+A1+ . . . . One can also choose to exclude one or more modes from such a sum. So for example, where three modes are employed, the sum of the first and second could be used to operate the feedback loop and the third could be used as a carry along signal.

Because higher eigenmodes have a significantly higher dynamic stiffness, the energy of these modes can be much larger that that of lower eigenmodes.

The method may be used to operate the apparatus with one flexural mode experiencing a net attractive force and the other a net repulsive force, as well as operating with each mode experiencing the same net sign of force, attractive or repulsive. Using this method, with the cantilever experiencing attractive and repulsive interactions in different eigenmodes, may provide additional information about sample properties.

One preferred technique for using the aforesaid method is as follows. First, excite the probe tip at or near a resonant frequency of the cantilever keeping the tip sufficiently far from the sample surface that it oscillates at the free amplitude A10 unaffected by the proximity of the cantilever to the sample surface and without making contact with the sample surface. At this stage, the cantilever is not touching the surface; it turns around before it interacts with significant repulsive forces.

Second, reduce the relative distance in the Z direction between the base of the cantilever and the sample surface so that the amplitude of the probe tip A1 is affected by the proximity of the sample surface without the probe tip making contact with the sample surface. The phase p1 will be greater than p10, the free first eigenmode phase. This amplitude is maintained at an essentially constant value during scanning without the probe tip making contact with the sample surface by setting up a feedback loop that controls the distance between the base of the cantilever and the sample surface.

Third, keeping the first eigenmode drive and surface controlling feedback loop with the same values, excite a second eigenmode of the cantilever at an amplitude A2. Increase A2 until the second eigenmode phase p2 shows that the cantilever eigenmode is interacting with predominantly repulsive forces; that is, that p2 is less than p20, the free second eigenmode phase. This second amplitude A2 is not included in the feedback loop and is allowed to freely roam over a large range of values. In fact, it is typically better if variations in A2 can be as large as possible, ranging from 0 to A20, the free second eigenmode amplitude.

Fourth, the feedback amplitude and phase, A1 and p1, respectively, as well as the carry along second eigenmode amplitude and phase, A2 and p2, respectively, should be measured and displayed.

Alternatively, the drive amplitude and/or phase of the second frequency can be continually adjusted to maintain the second amplitude and/or phase at an essentially constant value. In this case, it is useful to display and record the drive amplitude and/or frequency required to maintain the second amplitude and/or phase at an essentially constant value.

A second preferred technique for using the aforesaid method follows the first two steps of first preferred technique just described and then continues with the following two steps:

Third, keeping the first eigenmode drive and surface controlling feedback loop with the same values, excite a second eigenmode (or harmonic) of the cantilever at an amplitude A2. Increase A2 until the second eigenmode phase p2 shows that the cantilever eigenmode is interacting with predominantly repulsive forces; that is, that p2 is less than p20, the free second eigenmode phase. At this point, the second eigenmode amplitude A2 should be adjusted so that the first eigenmode phase p1 becomes predominantly less than p10, the free first eigenmode phase. In this case, the adjustment of the second eigenmode amplitude A2 has induced the first eigenmode of the cantilever to interact with the surface in a repulsive manner. As with the first preferred technique, the second eigenmode amplitude A2 is not used in the tip-surface distance feedback loop and should be allowed range widely over many values.

Fourth, the feedback amplitude and phase, A1 and p1, respectively, as well as the carry along second eigenmode amplitude and phase, A2 and p2, respectively, should be measured and displayed.

Either of the preferred techniques just described could be performed in a second method of using the FIG. 1 apparatus where the phase of the oscillating cantilever is used in a feedback loop and the oscillation frequency is varied to maintain phase essentially constant. In this case, it is preferable to use the oscillation frequency as an input into a z-feedback loop that controls the cantilever-sample separation.

Relative changes in various parameters such as the amplitude and phase or in-phase and quadrature components of the cantilever at these different frequencies could also be used to extract information about the sample properties.

A third preferred technique for using the first method of using the FIG. 1 apparatus provides an alternative for conventional operation in a repulsive mode, that is where the tip is experiencing a net repulsive force. The conventional approach for so operating would be to use a large amplitude in combination with a lower setpoint, and a cantilever with a very sharp tip. Using this third preferred technique, however, the operator begins, just as with the first two techniques, by choosing an amplitude and setpoint for the fundamental eigenmode that is small enough to guarantee that the cantilever is experiencing attractive forces, that is, that the cantilever is in non-contact mode. As noted before, this operational mode can be identified by observing the phase of the cantilever oscillation. In the non-contact case, the phase shift is positive, implying that the resonant frequency has been lowered. With these conditions on the first eigenmode, the second eigenmode excitation can be introduced and the amplitude, drive frequency and, if applicable, set point chosen with the following considerations in mind:

1. Both eigenmodes are in the attractive mode, that is to say that the phase shift of both modes is positive, implying both eigenmode frequencies have been shifted negatively by the tip-sample interactions. Generally, this requires a small amplitude for the second eigenmode.

2. The fundamental eigenmode remains attractive while the second eigenmode is in a state where the tip-sample interactions cause it to be in both the attractive and the repulsive modes as it is positioned relative to the surface.

3. The fundamental eigenmode is in an attractive mode and the second eiegenmode is in a repulsive mode.

4. In the absence of any second mode excitation, the first eigenmode is interacting with the surface in the attractive mode. After the second eigenmode is excited, the first eigenmode is in a repulsive mode. This change is induced by the addition of the second eigenmode energy. The second eigenmode is in a state where the tip-sample interactions cause it to be attractive and/or repulsive.

5. The first eigenmode is in a repulsive mode and the second mode is in a repulsive mode.

Figure 4:
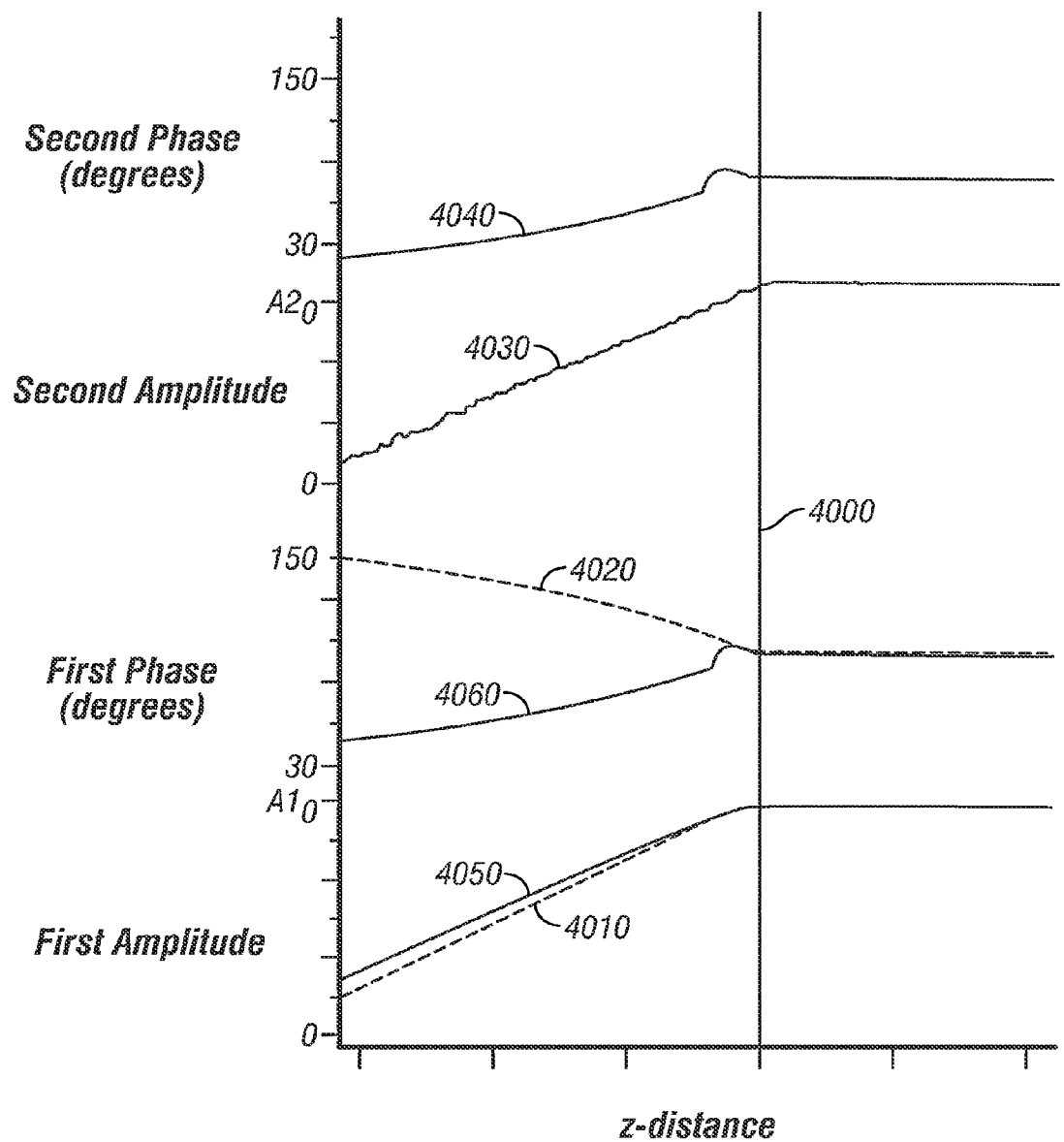
FIG. 4 Phase and amplitude shifts of the fundamental eigenmode with and without the second eigenmode being driven.
Figure 5A:
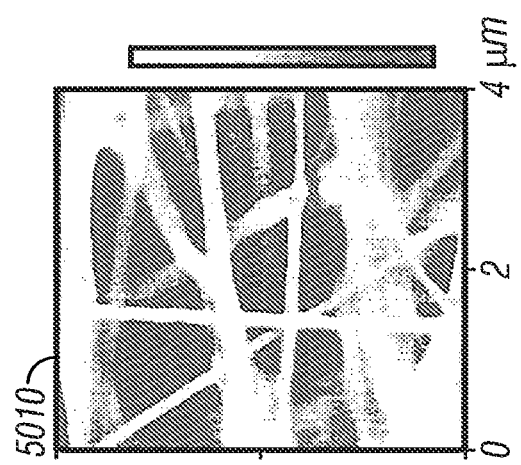
FIG. 5A-5E Images of collagen fibers taken with the preferred embodiment.
Figure 5B:
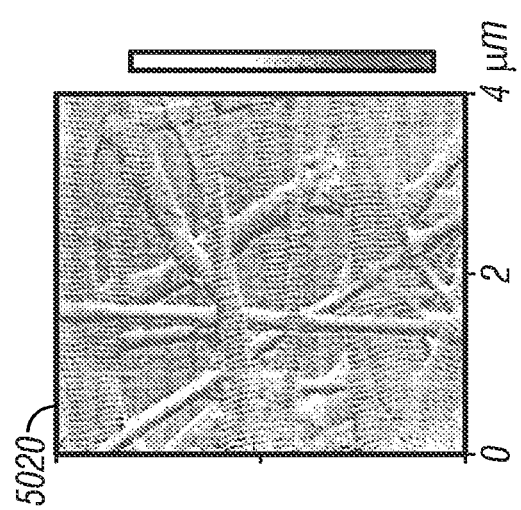
Figure 5C:
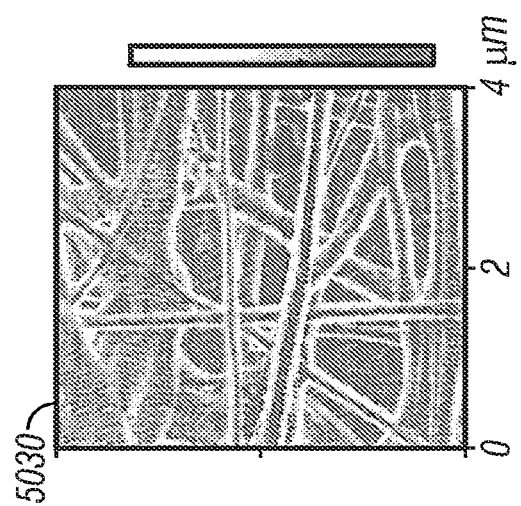
Figure 5D:
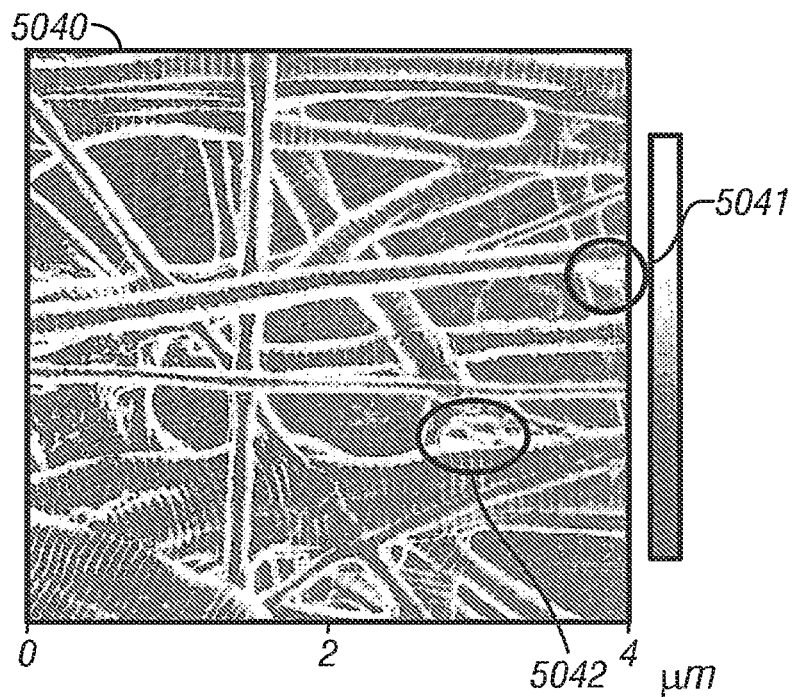
Figure 5E:
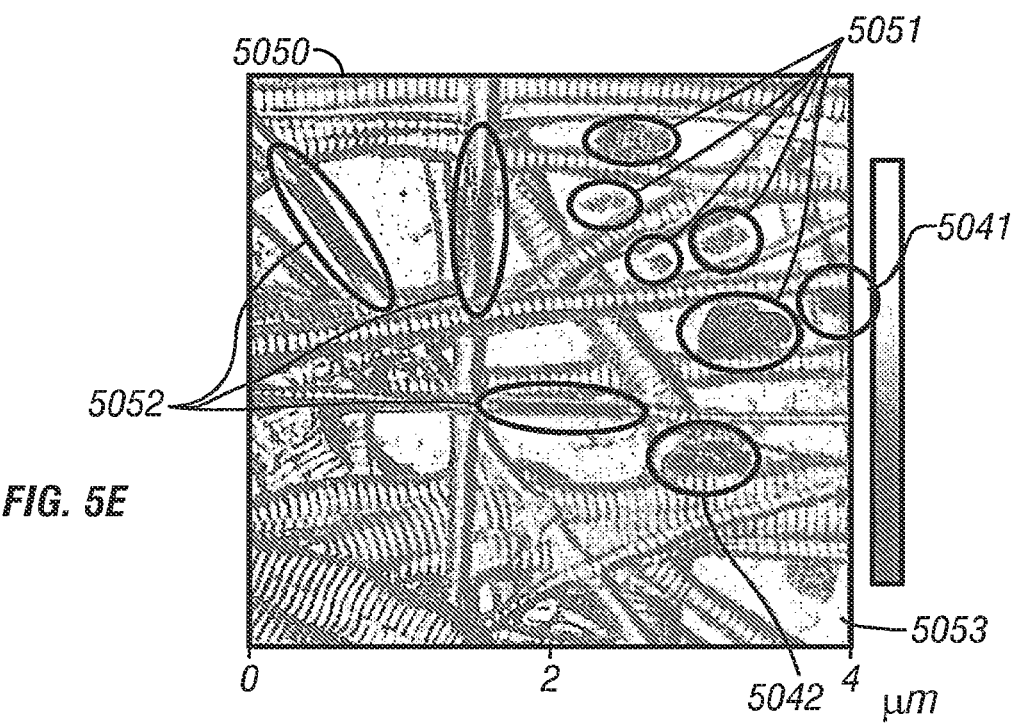

The transition from attractive to repulsive mode in the first eigenmode, as induced by the second eigenmode excitation, is illustrated in FIG. 4, where the amplitude and phase of the first and second eigenmodes are plotted as a function of the distance between the base of the cantilever and the surface of the sample. The point where the tip begins to interact significantly with the surface is indicated with a solid line 4000. The fundamental amplitude 4010 of the cantilever decreases as the cantilever starts to interact with the surface, denoted by the solid line 4000. The associated phase 4020 shows a positive shift, consistent with overall attractive interactions. For these curves, the second eigenmode amplitude is zero and therefore not plotted in the Figure (and neither is phase, for the same reason). Next, the second eigenmode is excited and the same curves are re-measured, together with the amplitude and phase of the second eigenmode, 4030 and 4040. There is a notable change in the fundamental eigenmode amplitude 4050 and more strikingly, the fundamental eigenmode phase 4060. The fundamental phase in fact shows a brief positive excursion, but then transitions to a negative phase shift, indicating an overall repulsive interaction between the tip and sample. The free amplitude of the first eigenmode is identical in both cases, the only difference in the measurement being the addition of energy exciting the higher oscillatory eigenmode. This excitation is sufficient to drive the fundamental eigenmode into repulsive interactions with the sample surface. Furthermore, the phase curve of the second eigenmode indicates that it is also interacting overall repulsively with the sample surface.

More complicated feedback schemes can also be envisioned. For example, one of the eigenmode signals can be used for topographical feedback while the other signals could be used in other feedback loops. An example would be that A1 is used to control the tip-sample separation while a separate feedback loop was used to keep A2 at an essentially constant value rather than allowing it to range freely over many values. A similar feedback loop could be used to keep the phase of the second frequency drive p2 at a predetermined value with or without the feedback loop on A2 being implemented.

As another example of yet another type of feedback that could be used, Q-control can also be used in connection with any of the techniques for using the first method of using the FIG. 1 apparatus. Using Q-control on any or all of the eigenmodes employed can enhance their sensitivity to the tip-sample forces and therefore mechanical or other properties of the sample. It can also be used to change the response time of the eigenmodes employed which may be advantageous for more rapidly imaging a sample. For example, the value of Q for one eigenmode could be increased and the value for another decreased. This may enhance the result of mixed attractive/repulsive mode imaging because it is generally easier to keep one eigenmode interacting with the sample in repulsive mode with a reduced Q-value or, conversely, in attractive mode with an enhanced Q-value. By reducing the Q-value of the lowest eigenmode and enhancing the Q-value of the next eigenmode, it is possible to encourage the mixed mode operation of the cantilever; the zeroth eigenmode will be in repulsive mode while the first eigenmode will more likely remain in attractive mode. Q-control can be implemented using analog, digital or hybrid analog-digital electronics. It can be accomplished using an integrated control system such as that in the Asylum Research Corporation MFP-3D Controller or by after-market modules such as the nanoAnalytics Q-box.

In addition to driving the cantilever at or near more than one eigenmode, it is possible to also excite the cantilever at or near one or more harmonics and/or one or more eigenmodes. It has been known for some time that nonlinear interactions between the tip and the sample can transfer energy into cantilever harmonics. In some cases this energy transfer can be large but it is usually quite small, on the order of a percent of less of the energy in the eigenmode. Because of this, the amplitude of motion at a harmonic, even in the presence of significant nonlinear coupling is usually quite small. Using the methods described here, it is possible to enhance the contrast of these harmonics by directly driving the cantilever at the frequency of the harmonic. To further enhance the contrast of this imaging technique it is useful to adjust the phase of the higher frequency drive relative to that of the lower. This method improves the contrast of both conventional cantilevers and the specially engineered "harmonic" cantilevers described by Sahin et al and other researchers.

On many samples, the results of imaging with the present invention are similar to, and in some cases superior to, the results of conventional phase imaging. However, while phase imaging often requires a judicious choice of setpoint and drive amplitude to maximize the phase contrast, the method of the present invention exhibits high contrast over a much wider range of imaging parameters. Moreover, the method also works in fluid and vacuum, as well as air and the higher flexural modes show unexpected and intriguing contrast in those environments, even on samples such as DNA and cells that have been imaged numerous times before using more conventional techniques.

Although there is a wide range of operating parameters that yield interesting and useful data, there are situations where more careful tuning of the operational parameters will yield enhanced results. Some of these are discussed below. Of particular interest can be regions in set point and drive amplitude space where there is a transition from attractive to repulsive (or vice versa) interactions in one or more of the cantilever eigenmodes or harmonics.

The superior results of imaging with the present invention may be seen from an inspection of the images. An example is shown in FIG. 5. For this example, the FIG. 1 apparatus was operated using the fundamental eigenmode amplitude as the error signal and the second eigenmode as a carry-along signal. The topography image 5010 in FIG. 5 shows collagen fibers on a glass surface, an image typical of results with conventional AC mode from similar samples. The fundamental eigenmode amplitude image 5020 is relatively similar, consistent with the fundamental eigenmode amplitude being used in the feedback loop. The fundamental eigenmode phase channel image 5030 shows some contrast corresponding to edges in the topography image. This is consistent with the interaction being more attractive at these regions, again to be expected from surface energy considerations (larger areas in proximity will have larger long-range attractive forces). Since the fundamental eigenmode amplitude is being held relatively constant and there is a relationship between the amplitude and phase, the phase will be constrained, subject to energy balance and the feedback loop that is operating to keep the amplitude constant. The second eigenmode amplitude image 5040 shows contrast that is similar to the fundamental eigenmode phase image 5030. However, there are some differences, especially over regions thought to be contaminants 5041 and 5042. Finally, the second eigenmode phase image 5050 shows the most surprisingly large amount of contrast. The background substrate 5053 shows a bright, positive phase contrast. The putative contaminant patches, 5041, 5042 and 5051 show strikingly dark, negative phase shift contrast. Finally, regions where the collagen fibers are suspended 5052 show dark, negative phase contrast. In these last regions, the suspended collagen fibers are presumably absorbing some of the vibrational energy of the second eigenmode amplitude and thus, changing the response.

When an AFM is operated in conventional amplitude modulated (AM) AC mode with phase detection, the cantilever amplitude is maintained constant and used as a feedback signal. Accordingly, the values of the signal used in the loop are constrained not only by energy balance but also by the feedback loop itself. Furthermore, if the amplitude of the cantilever is constrained, the phase will also be constrained, subject to conditions discussed below. In conventional AC mode it is not unusual for the amplitude to vary by a very small amount, depending on the gains of the loop. This means that, even if there are mechanical properties of the sample that might lead to increased dissipation or a frequency shift of the cantilever, the z-feedback loop in part corrects for these changes and thus in this sense, avoids presenting them to the user.

If the technique for using the present invention involves a mode that is excited but not used in the feedback loop, there will be no explicit constraints on the behavior of this mode. Instead it will range freely over many values of the amplitude and phase, constrained only by energy balance. That is to say, the energy that is used to excite the cantilever motion must be balanced by the energy lost to the tip-sample interactions and the intrinsic dissipation of the cantilever. This may explain the enhanced contrast we observe in images generated with the techniques of the present invention.

Figure 6:
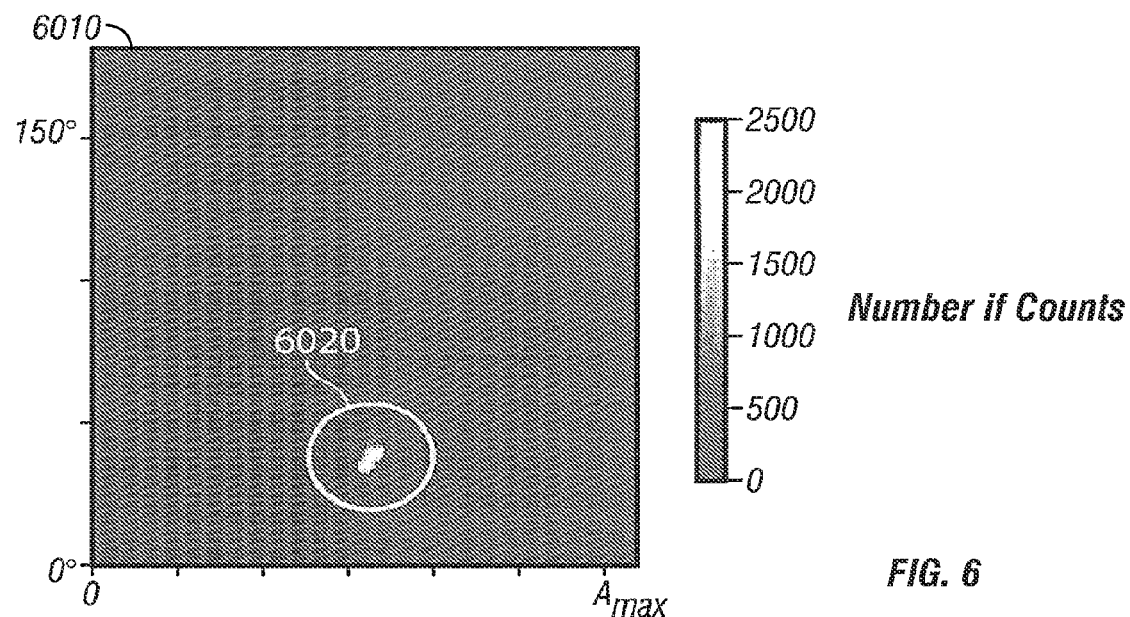
FIGS. 6 and 7 Two dimensional histogram plots of the amplitude and phase for the first and second eigenmodes.
Figure 7:
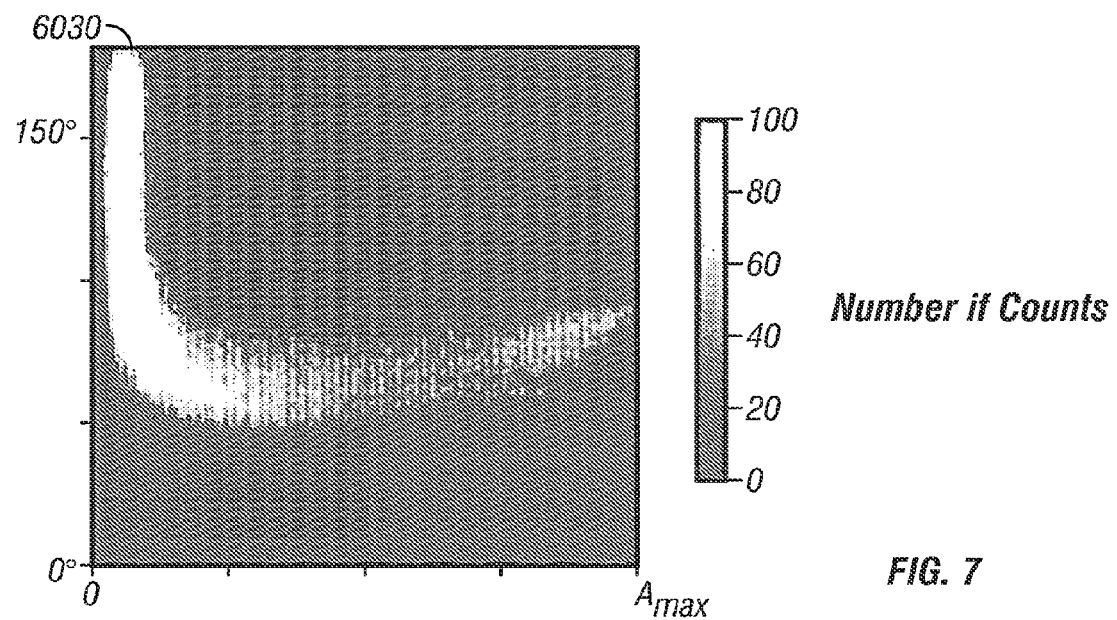

FIG. 6 demonstrates this idea more explicitly. The first image 6010 is an image of the number of pixels at different amplitudes (horizontal axis) and phases (vertical axis) in the fundamental eigenmode data for the collagen sample of FIG. 5. As expected, the amplitude values are constrained to a narrow range around ~0.6 Amax by the z-feedback loop. Constraining the amplitude values in turn, limits the values that the phase can take to the narrow range around 25°. Thus, when the pixel counts are plotted, there is a bright spot 6020 with only small variations. Small variations in turn imply limited contrast. The second image 6030 plots the number of pixels at different amplitudes and phases in the second eigenmode data for the collagen sample. Since the amplitude of this eigenmode was not constrained by a feedback loop, it varies from ~Amax to close to zero. Similarly, the phase ranges over many values. This freedom allows greatly increased contrast in the second eigenmode images.

The present invention may also be used in apparatus that induce motion in the cantilever other than through a piezoelectric actuator. These could include direct electric driving of the cantilever ("active cantilevers"), magnetic actuation schemes, ultrasonic excitations, scanning Kelvin probe and electrostatic actuation schemes.

Direct electric driving of the cantilever ("active cantilevers") using the present invention has several advantages over conventional piezo force microscopy (PFM) where the cantilever is generally scanned over the sample in contact mode and the cantilever voltage is modulated in a manner to excite motion in the sample which in turn causes the cantilever to oscillate.

Figure 2:
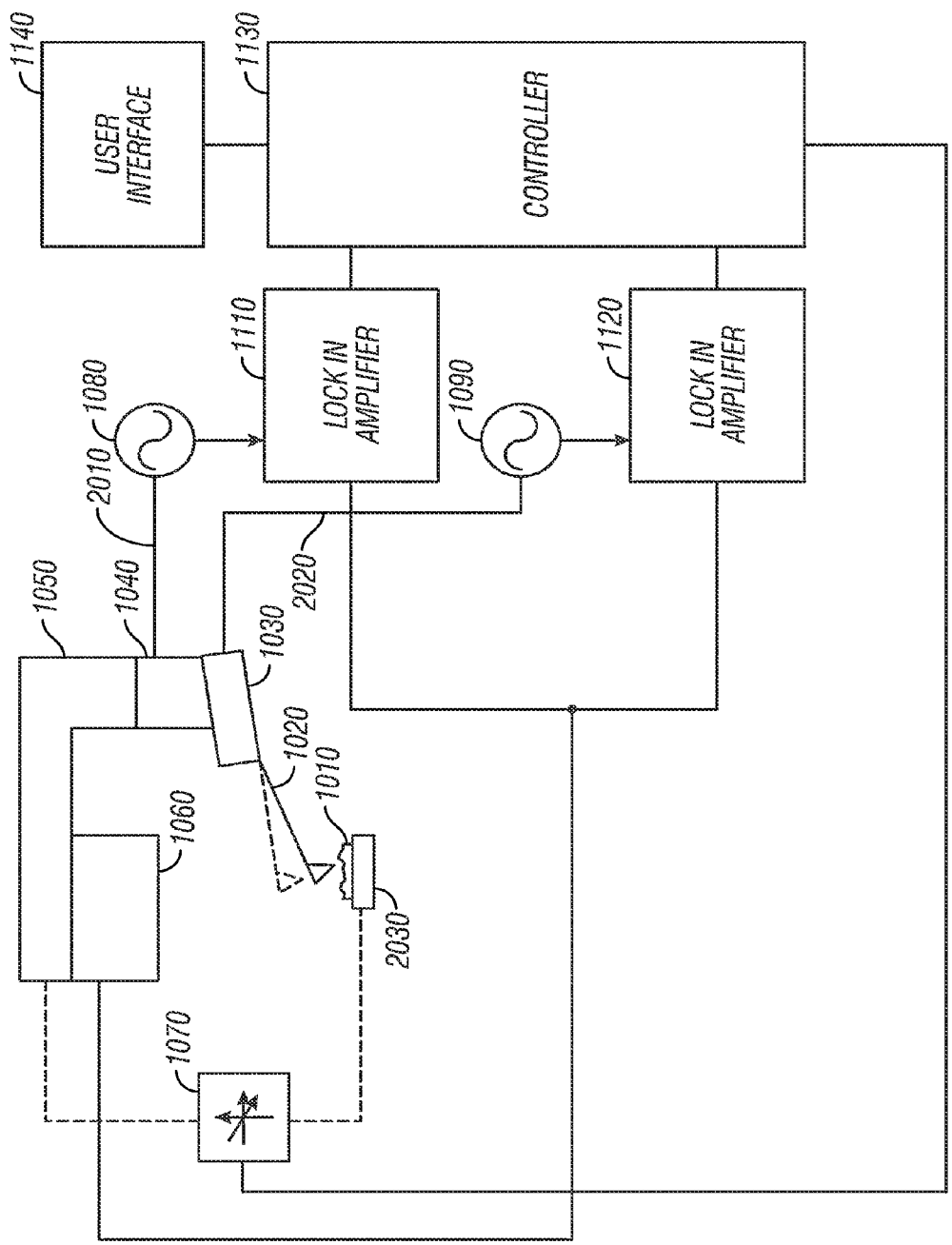
FIG. 2 Preferred embodiment for exciting voltage-dependent motion in the cantilever probe.

FIG. 2 is a block diagram of a preferred embodiment of an apparatus for using the present invention with an active cantilever. This apparatus has similarities to that shown in FIG. 1, as well as differences. In the FIG. 2 apparatus, like the FIG. 1 apparatus, one of the frequency sources 1080 is used to excite motion of the cantilever probe 1020 through a mechanical actuator 1040, preferably a piezoelectric actuator, but other methods to induce cantilever motion known to those versed in the art could also be used, which drives the chip 1030 of the cantilever probe 1020, However, in the FIG. 2 apparatus, the frequency source 1080 communicates directly 2010 with the actuator 1040 instead of being summed together with the second frequency source 1090, as in the FIG. 1 apparatus. The second frequency source 1090 in the FIG. 2 apparatus is used to vary the potential of the cantilever probe 1020 which in turn causes the sample 1010 to excite motion in the cantilever probe 1020 at a different eigenmode than that excited by the first frequency source 1080. The resulting motion of the cantilever probe 1020 interacting with the sample 1010 will contain information on the sample topography and other properties at the eigenmode excited by the first frequency source 1080 and information regarding the voltage dependent properties of the sample at the eigenmode excited by the second frequency source 1090. The sample holder 2030 can optionally be held at a potential, or at ground, to enhance the effect.

In one method of using the FIG. 2 apparatus, the amplitude of the cantilever at the frequency of the first source 1080 is used as the error signal. The amplitude and phase (or in-phase and quadrature components) at the frequency of the second source 1090 or a harmonic thereof will contain information about the motion of the sample and therefore the voltage dependent properties of the sample. One example of these properties is the piezo-response of the sample. Another is the electrical conductivity, charge or other properties that can result in long range electrostatic forces between the tip and the sample.

Figure 3:
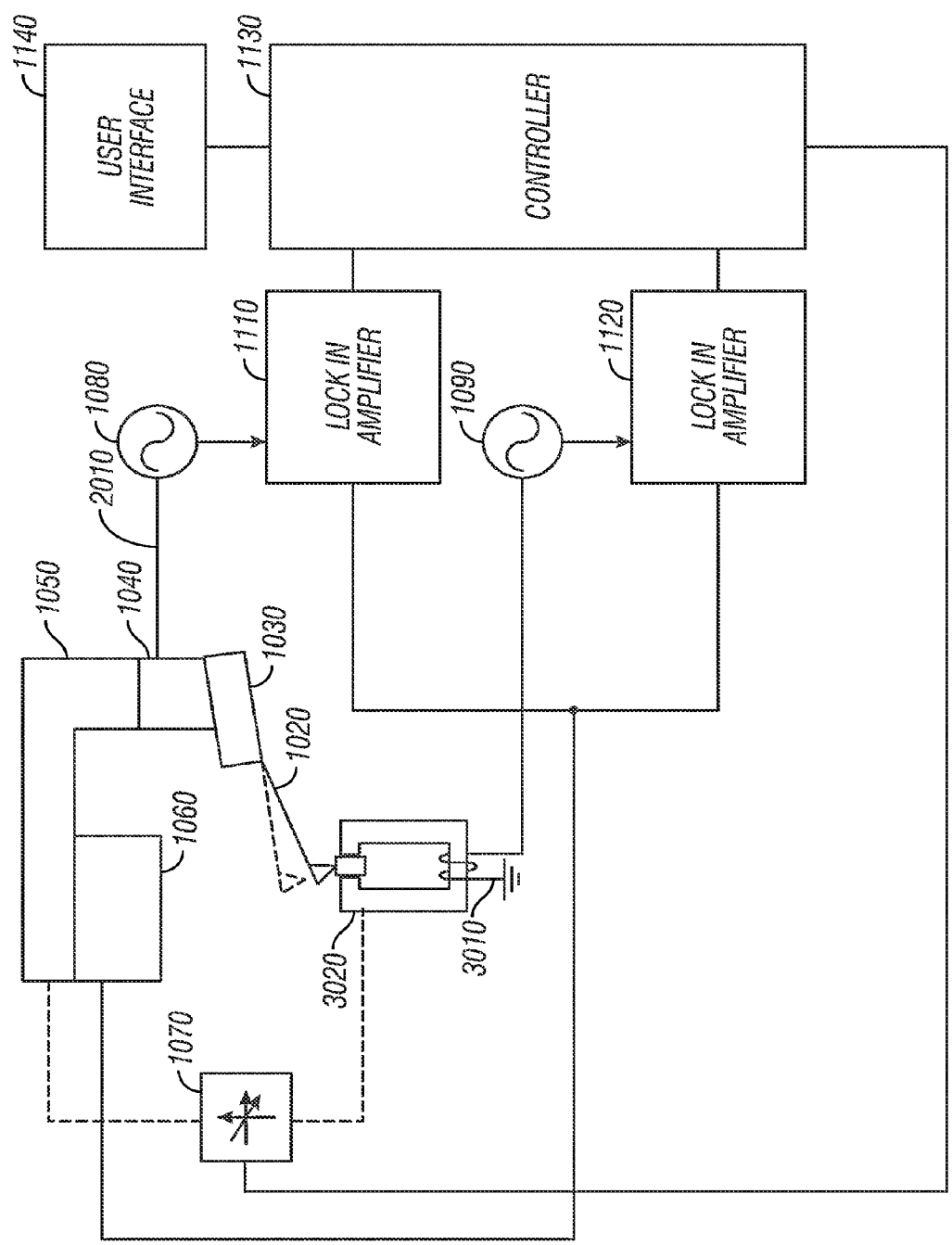
FIG. 3 Preferred embodiment for probing an active device.

FIG. 3 is a block diagram of a preferred embodiment of an apparatus for using the present invention with the second frequency source modulating a magnetic field that changes a property of the sample. In the FIG. 3 apparatus, the situation with the first frequency source 1080 is identical to the situation in the FIG. 2 apparatus. However, instead of the second frequency source 1090 being used to vary the potential of the cantilever probe 1020, as with the FIG. 2 apparatus, in the FIG. 3 apparatus the second frequency source 1090 modulates the current through an excitation coil 3010 which in turn modulates the magnetic state of a magnetic circuit element 3020. Magnetic circuit element 3020 could be used to modulate the field near an active sample or the excitation coil 3010. Alternatively, magnetic circuit element 3020 could comprise the sample, as in the case of a magnetic recording head.

The FIG. 3 apparatus can be used with any other sort of 'active' sample where the interaction between the cantilever and the sample can be modulated at or near one or more of the cantilever flexural resonances by one of the frequency sources 1080 or 1090. This could also be extended to high frequency measurements such as described in Proksch et al., Appl. Phys. Lett., vol. (1999). Instead of the modulation described in that paper, the envelope of the high frequency carrier could be driven with a harmonic of one or more flexural resonances. This method of measuring signals other than topographic has the advantage of requiring only one pass to complete as opposed to "LiftMode" or Nap mode that require temporally separated measurements of the topographic and other signals.

Another example of a preferred embodiment of an apparatus and method for using the present invention is from the field of ultrasonic force microscopy. In this embodiment, one or more eigenmodes are used for the z-feedback loop and one or more additional eigenmodes can be used to measure the high frequency properties of the sample. The high frequency carrier is amplitude modulated and either used to drive the sample directly or to drive it using the cantilever as a waveguide. The cantilever deflection provides a rectified measure of the sample response at the carrier frequency.

Another group of embodiments for the present invention has similarities to the conventional force modulation technique described in the Background to the Invention and conventional PFM where the cantilever is scanned over the sample in contact mode and a varying voltage is applied to the cantilever. In general this group may be described as contact resonance embodiments. However, these embodiments, like the other embodiments already described, make use of multiple excitation signals.

Figure 8:
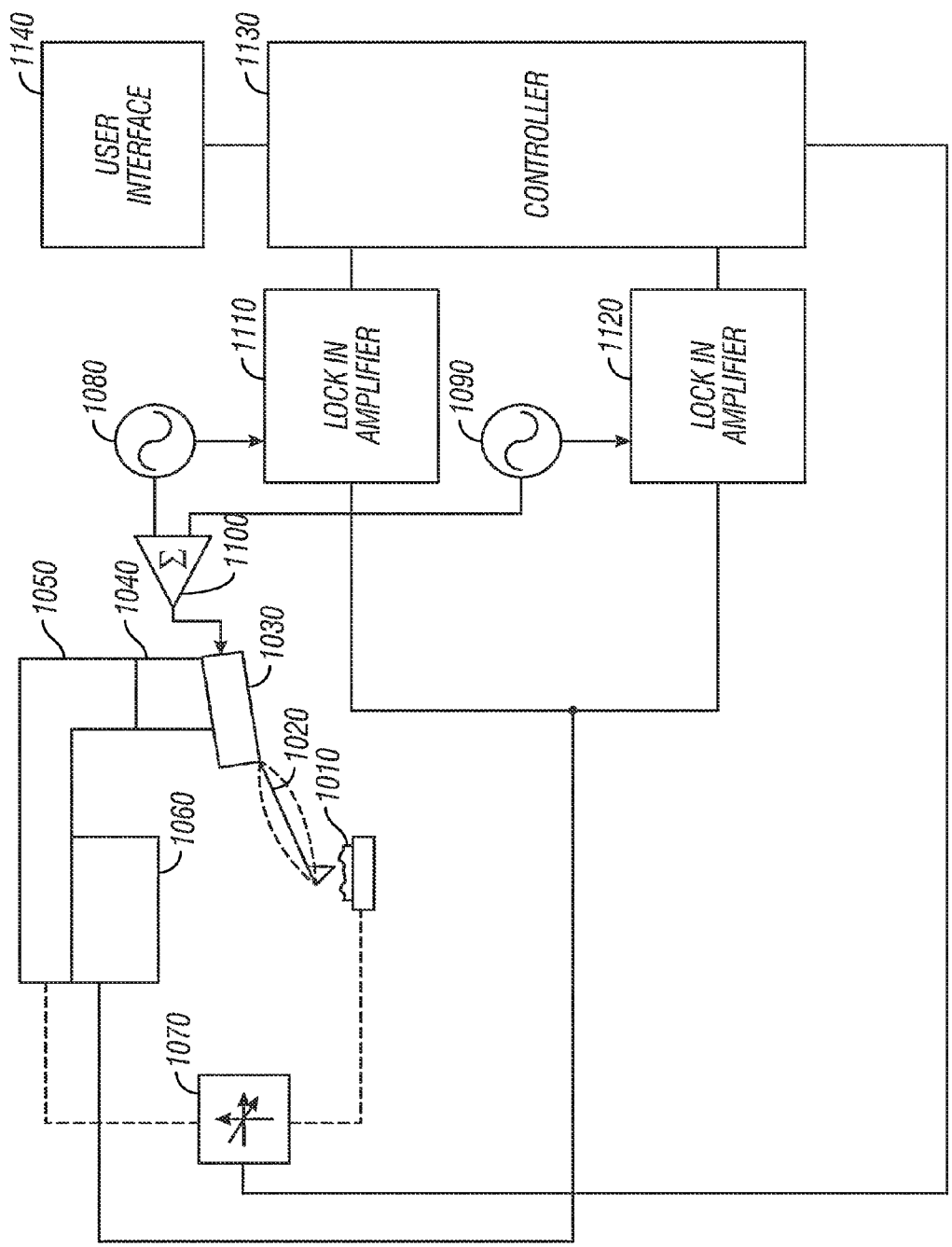
FIG. 8 Preferred embodiment for probing an active sample in contact while measuring dynamic contact properties (Dual Frequency Resonance Tracking Piezo Force Microscopy (DFRT PFM)).

FIG. 8 is a block diagram of the first of these embodiments, which may be referred to as Dual Frequency Resonance Tracking Piezo Force Microscopy (DFRT PFM). In the DFRT PFM apparatus of FIG. 8 the cantilever probe 1020 is positioned above a sample 1010 with piezoelectric properties and scanned relative to the sample 1010 by a scanning apparatus 1070 using contact mode. Unlike conventional contact mode however the chip 1030 of the cantilever probe 1020, or the cantilever probe 1020 itself (alternative not shown), is driven by excitation electronics that include at least two frequency synthesizers 1080 and 1090. The cantilever probe 1020 responds to this excitation by buckling up and down much as a plucked guitar string. The signals from these frequency synthesizers could be summed together by an analog circuit element 1100 or, preferably, a digital circuit element that performs the same function. The two frequency synthesizers 1080 and 1090 provide reference signals to lockin amplifiers 1110 and 1120, respectively. The motion of the cantilever probe 1020 relative to the frame of the microscope 1050 is measured with a detector 1060, which could be an optical lever or another method known to those versed in the art. The cantilever chip 1030 is moved vertically relative to the sample 1010, in order to maintain constant force, by a scanning apparatus 1070, preferably a piezo/flexure combination, but other methods known to those versed in the art could also be used. The amplitude and phase of each frequency at which the cantilever probe 1020 is excited can be measured and used in a feedback loop calculated by the controller 1130 or simply reported to the user interface 1140 where it is displayed, stored and/or processed further in an off-line manner. Instead of, or in addition to, the amplitude and phase of the cantilever motion, the quadrature pairs, usually designated x and y, can be calculated and used in a manner similar to the amplitude and phase.

In one method of using the FIG. 8 apparatus, the topography of the sample would be measured in contact mode while the amplitude and phase of the cantilever probe 1020 response to the applied potential at the lowest contact resonance and at the next highest contact resonance is simultaneously measured. The responses can be analyzed to determine whether they originate from the actual piezoelectric response of the sample or from crosstalk between the topography and any electric forces between the tip of the cantilever probe 1020 and the sample. Even more information can be obtained if more frequencies are utilized.

FIG. 12 shows three examples of the changes in the native phase 12015 and amplitude 12010 of a cantilever with a resonant frequency f0 caused by interactions between the tip and the sample using DFRT PFM methods. These examples are a subset of changes that can be observed. In the first example, the resonant frequency is significantly lowered to f0' but not damped. The phase 12085 and amplitude 12080 change but little relative to the native phase 12015 and amplitude 12010. In the second example the resonant frequency is again lowered to f0', this time with damping of the amplitude. Here the phase 12095 is widened and the amplitude 12090 is appreciably flattened. Finally, in the third example, the resonant frequency is again dropped to f0', this time with a reduction in the response amplitude. This yields a phase curve with an offset 12105 but with the same width as the second case 12095 and a reduced amplitude curve 12100 with the damping equivalent to that of the second example. If there is an offset in the phase versus frequency curve as there is in this third example, prior art phase locked-loop electronics will not maintain stable operation. For example, if the phase set-point was made to be 90 degrees, it would never be possible to find a frequency in curve 12105 where this condition was met. One example of these things occurring in a practical situation is in DRFT PFM when the tip crosses from an electric domain with one orientation to a second domain with another orientation. The response induced by the second domain will typically have a phase offset with respect to the first. This is, in fact where the large contrast in DFRT PFM phase signals originates.

Figure 9:
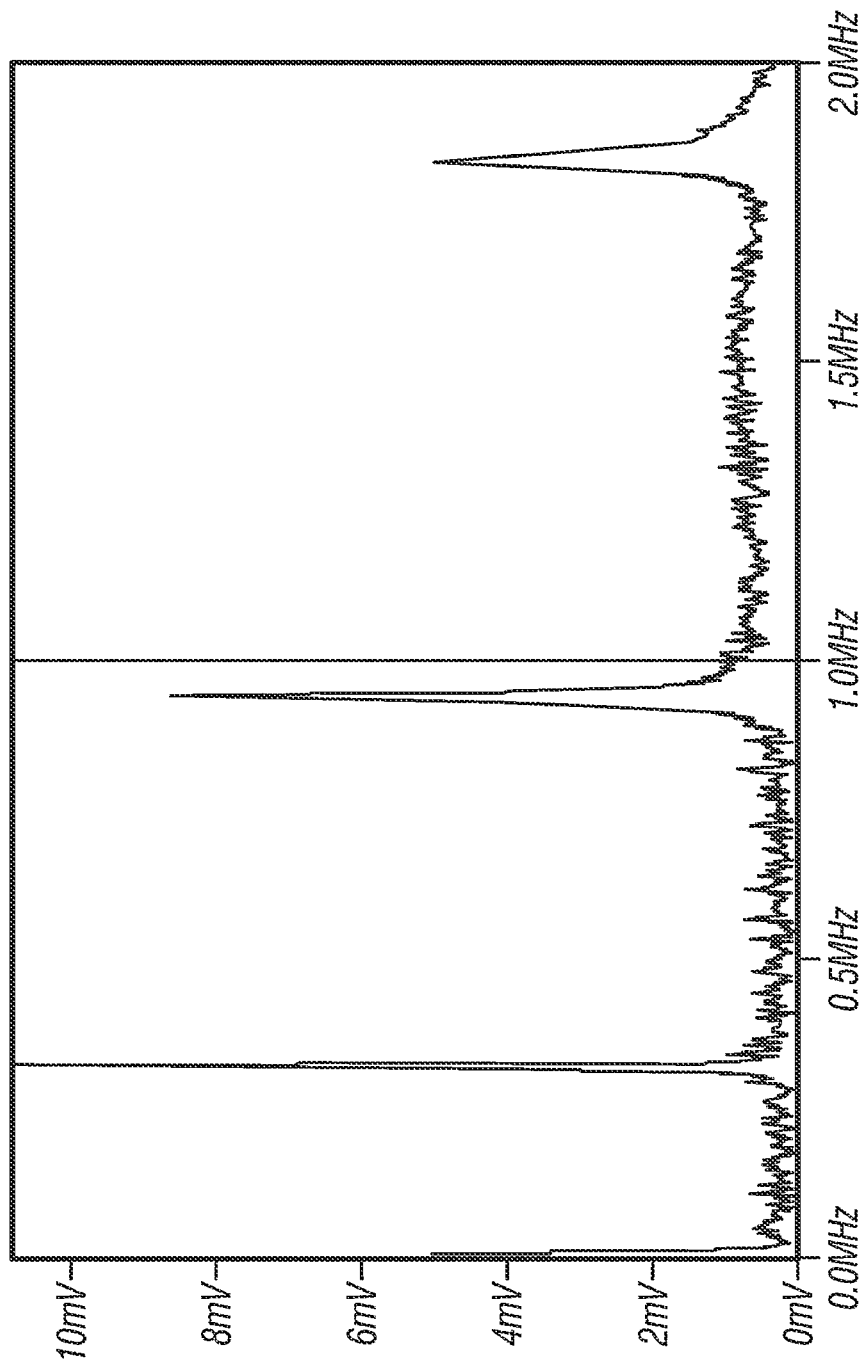
FIG. 9 Resonance peaks in sweep of applied potential from dc to 2 MHz.
Figure 11:
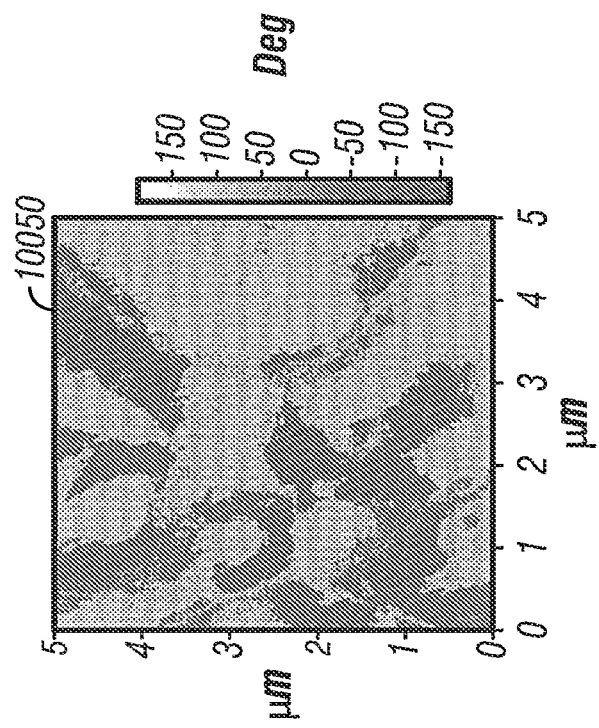

FIG. 9 shows the cantilever response when the applied potential is swept from dc to 2 MHz using the DFRT PFM apparatus. Three resonance peaks are visible. Depending on the cantilever probe and the details of the tip-sample contact mechanics, the number, magnitude, breadth and frequency of the peaks is subject to change. Sweeps such as these are useful in choosing the operating points for imaging and other measurements. In a practical experiment, any or all of these resonance peaks or the frequencies in between could be exploited by the methods suggested above.

Figure 19:
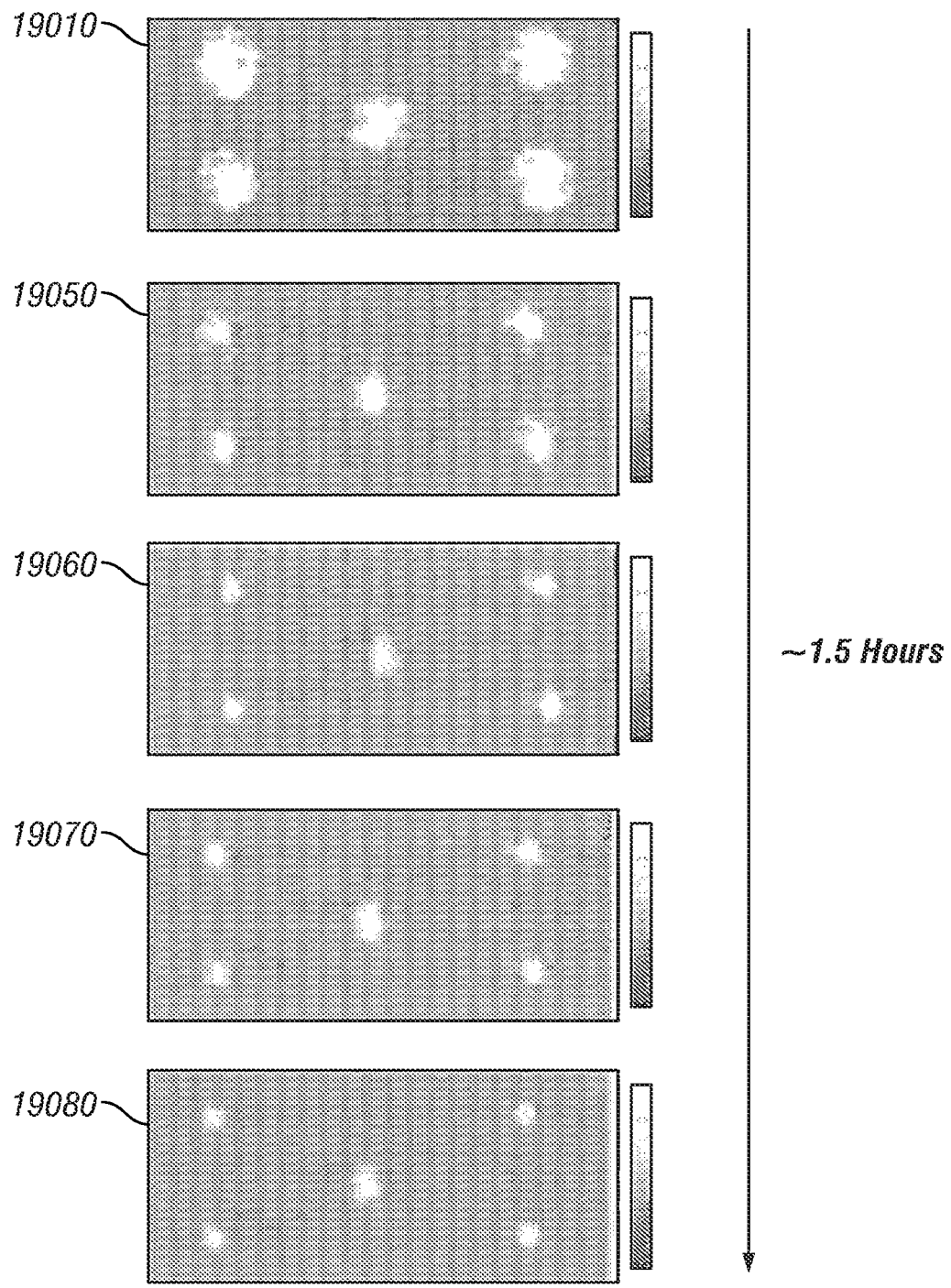

FIG. 19 shows a measurement that can be made using DFRT PFM techniques. A phase image 19010 shows ferroelectric domains written onto a sol-gel PZT surface. Because of the excellent separation between topography and PFM response possible with DFRT PFM, the phase image shows only piezo response, there is no topographic roughness coupling into the phase. The written domains appear as bright regions. The writing was accomplished by locally performing and measuring hysteresis loops by applying a dc bias to the tip during normal DFRT PFM operation. This allows the local switching fields to be measured. The piezo phase 19030 and the amplitude 19040 during a measurement made at location 19020 are plotted as a function of the applied dc bias voltage. The loops were made following Stephen Jesse et al, Rev. Sci. Inst. 77, 073702 (2006). Other loops were taken at the bright locations in image 19010, but are not shown in the Figure.

DFRT PFM is very stable over time in contrast to single frequency techniques. This allows time dependent processes to be studied as is demonstrated by the sequence of images, 19010, 19050, 19060, 19070 and 19080 taken over the span of about 1.5 hours. In these images, the written domains are clearly shrinking over time.

In AC mode atomic force microscopy, relatively tiny tip-sample interactions can cause the motion of a cantilever probe oscillating at resonance to change, and with it the resonant frequency, phase, amplitude and deflection of the probe. Those changes of course are the basis of the inferences that make AC mode so useful. With contact resonance techniques the contact between the tip and the sample also can cause the resonant frequency, phase and amplitude of the cantilever probe to change dramatically.

The resonant frequency of the cantilever probe using contact resonance techniques depends on the properties of the contact, particularly the contact stiffness. Contact stiffness in turn is a function of the local mechanical properties of the tip and sample and the contact area. In general, all other mechanical properties being equal, increasing the contact stiffness by increasing the contact area, will increase the resonant frequency of the oscillating cantilever probe. This interdependence of the resonant properties of the oscillating cantilever probe and the contact area represents a significant shortcoming of contact resonance techniques. It results in "topographical crosstalk" that leads to significant interpretational issues. For example, it is difficult to know whether or not a phase or amplitude change of the probe is due to some sample property of interest or simply to a change in the contact area.

The apparatus used in contact resonance techniques can also cause the resonant frequency, phase and amplitude of the cantilever probe to change unpredictably. Examples are discussed by Rabe et al., Rev. Sci. Instr. 67, 3281 (1996) and others since then. One of the most difficult issues is that the means for holding the sample and the cantilever probe involve mechanical devices with complicated, frequency dependent responses. Since these devices have their own resonances and damping, which are only rarely associated with the sample and tip interaction, they may cause artifacts in the data produced by the apparatus. For example, phase and amplitude shifts caused by the spurious instrumental resonances may freely mix with the resonance and amplitude shifts that originate with tip-sample interactions.

It is advantageous to track more than two resonant frequencies as the probe scans over the surface when using contact resonance techniques. Increasing the number of frequencies tracked provides more information and makes it possible to over-constrain the determination of various physical properties. As is well known in the art, this is advantageous since multiple measurements will allow better determination of parameter values and provide an estimation of errors.

Figure 15:
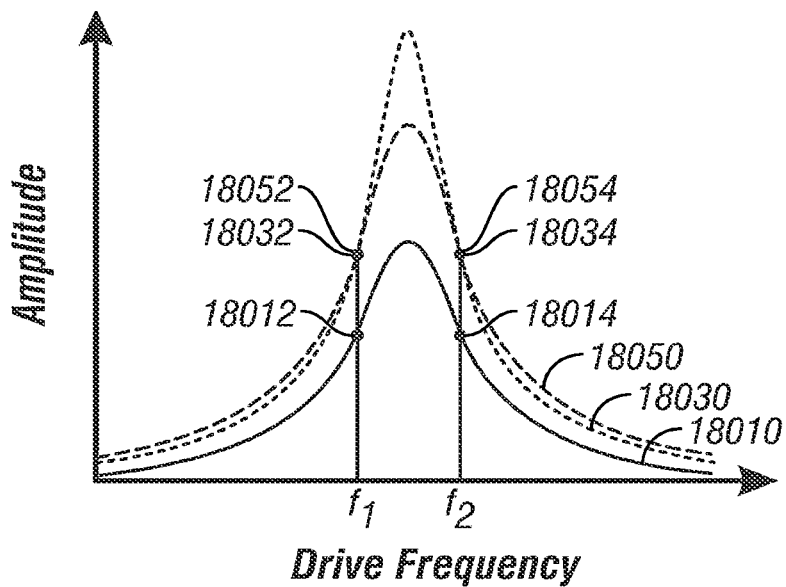
FIG. 15-16 Amplitude versus frequency and phase versus frequency curves simultaneous measured at different frequencies.

Since the phase of the cantilever response is not a well behaved quantity for feedback purposes in PFM, we have developed other methods for measuring and/or tracking shifts in the resonant frequency of the probe. One method is based on making amplitude measurements at more than one frequency, both of which are at or near a resonant frequency. FIG. 15 illustrates the idea. The original resonant frequency curve 14010 has amplitudes A1 14030 and A2 14020, respectively, at the two drive frequencies f1 and f2. However, if the resonant frequency shifted to a lower value, the curve shifts to 14050 and the amplitudes at the measurement frequencies change, A'1 14035 increasing and A'2 14025 decreasing. If the resonant frequency were higher, the situation would reverse, that is the amplitude A'1 at drive frequency f1 would decrease and A'2 at f2 would increase.

There are many methods to track the resonant frequency with information on the response at more than one frequency. One method with DFRT PFM is to define an error signal that is the difference between the amplitude at f1 and the amplitude at f2, that is A1 minus A2. A simpler example would be to run the feedback loop such that A1 minus A2=0, although other values could equally well be chosen. Alternatively both f1 and f2 could be adjusted so that the error signal, the difference in the amplitudes, is maintained. The average of these frequencies (or even simply one of them) provides the user with a measure of the contact resonant frequency and therefore the local contact stiffness. It is also possible to measure the damping and drive with the two values of amplitude. When the resonant frequency has been tracked properly, the peak amplitude is directly related to the amplitude on either side of resonance. One convenient way to monitor this is to simply look at the sum of the two amplitudes. This provides a better signal to noise measurement than does only one of the amplitude measurements. Other, more complicated feedback loops could also be used to track the resonant frequency. Examples include more complex functions of the measured amplitudes, phases (or equivalently, the in-phase and quadrature components), cantilever deflection or lateral and/or torsional motion.

The values of the two amplitudes also allow conclusions to be drawn about damping and drive amplitudes. For example, in the case of constant damping, an increase in the sum of the two amplitudes indicates an increase in the drive amplitude while the difference indicates a shift in the resonant frequency.

Finally, it is possible to modulate the drive amplitude and/or frequencies and/or phases of one or more of the frequencies. The response is used to decode the resonant frequency and, optionally, adjust it to follow changes induced by the tip-sample interactions.

Figure 10D:
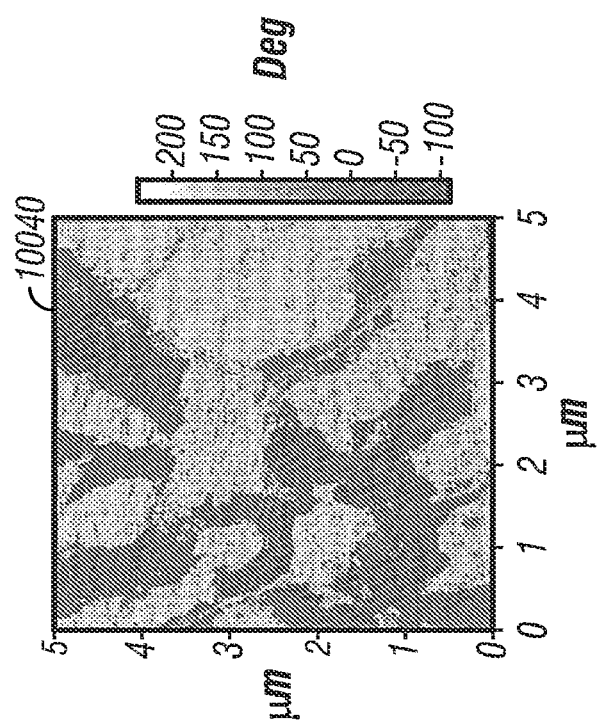
Figure 13:
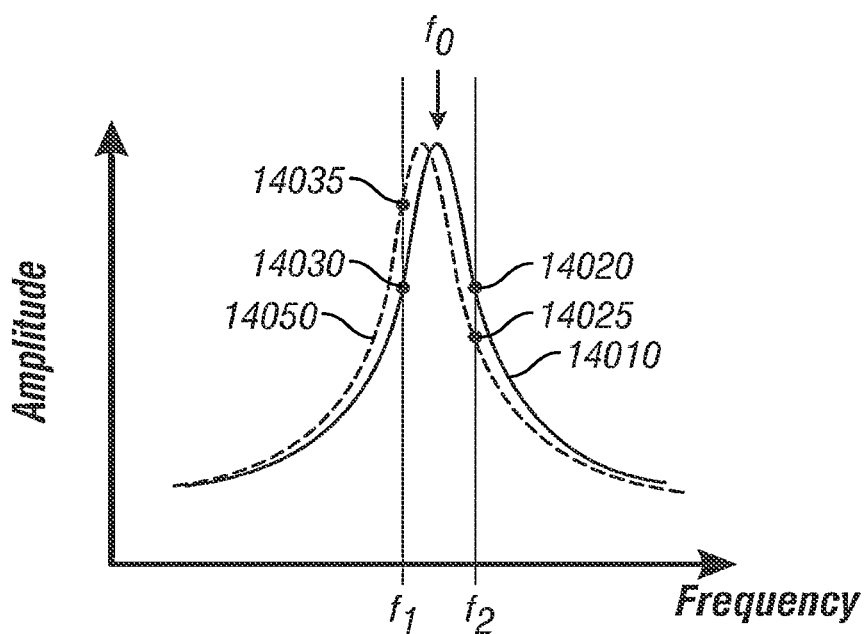
FIG. 13 Amplitude and phase curves changing in response to varying tip-sample interactions being driven first at two different frequencies and then at a single frequency.
Figure 14:
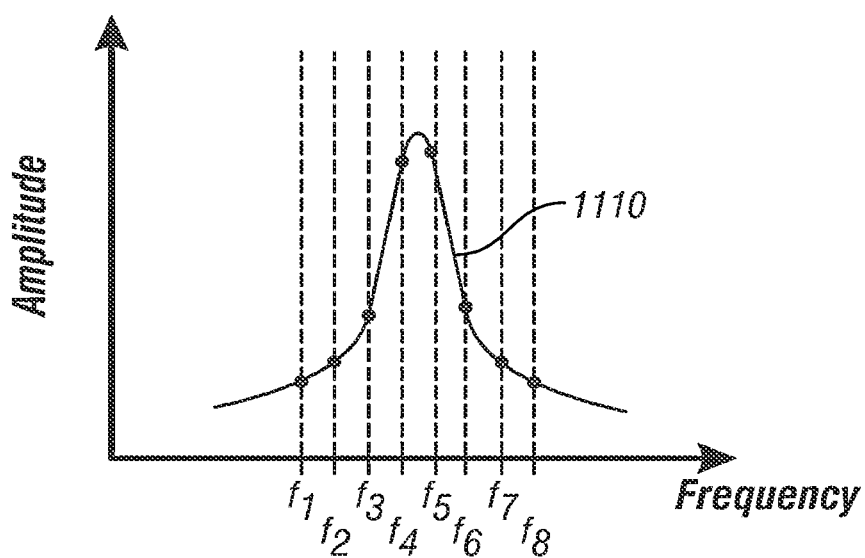
FIG. 14 Amplitude versus frequency sweeps around the second resonance made while feeding back on the first mode amplitude.

FIG. 10 shows the results of a measurement of a piezoelectric material using DFRT PFM methods. Contact mode is used to image the sample topography 10010 and contact resonance techniques used to image the first frequency amplitude 10020, the second frequency amplitude 10030, the first frequency phase 10040 and the second frequency phase 10050. In this experiment, the two frequencies were chosen to be close to the first contact resonance, at roughly the half-maximum point, with the first frequency on the lower side of the resonance curve and the second on the upper side. This arrangement allowed some of the effects of crosstalk to be examined and potentially eliminated in subsequent imaging.

Another multiple frequency technique is depicted in FIG. 2, an apparatus for using the present invention with a conductive (or active) cantilever, and the methods for its use may also be advantageous in examining the effects of crosstalk with a view to potentially eliminating them in subsequent imaging. For this purpose the inventors refer to this apparatus and method as Dual Frequency Piezo Force Microscopy (DF PFM). In the DF PFM apparatus of FIG. 2 the response to driving the tip voltage of the cantilever probe, due to the piezoelectric action acting through the contact mechanics, will typically change as the probe is scanned over the surface. The first signal will then be representative of changes in the contact mechanics between the tip and sample. The second signal will depend both on contact mechanics and on the piezo electrical forces induced by the second excitation signal between the tip and sample. Differences between the response to the first excitation and the response to the second are thus indicative of piezoelectric properties of the sample and allow the contact mechanics to be separated from such properties.

As noted, the user often does not have independent knowledge about the drive or damping in contact resonance. Furthermore, models may be of limited help because they too require information not readily available. In the simple harmonic oscillator model for example, the drive amplitude $A_{drive}$, drive phase $\phi_{drive}$, resonant frequency $\omega_0$ and quality factor Q (representative of the damping) will all vary as a function of the lateral tip position over the sample and may also vary in time depending on cantilever mounting schemes or other instrumental factors. In conventional PFM, only two time averaged quantities are measured, the amplitude and the phase of the cantilever (or equivalently, the in-phase and quadrature components). However, in dual or multiple frequency excitations, more measurements may be made, and this will allow additional parameters to be extracted. In the context of the SHO model, by measuring the response at two frequencies at or near a particular resonance, it is possible to extract four model parameters. When the two frequencies are on either side of resonance, as in the case of DFRT PFM for example, the difference in the amplitudes provides a measure of the resonant frequency, the sum of the amplitudes provides a measure of the drive amplitude and damping of the tip-sample interaction (or quality factor), the difference in the phase values provides a measure of the quality factor and the sum of the phases provides a measure of the tip-sample drive phase.

Simply put, with measurements at two different frequencies, we measure four time averaged quantities, $A_1$, $A_2$, $\phi_1$, $\phi_2$ that allow us to solve for the four unknown parameters $A_{drive}$, $\phi_{drive}$, $f_0$ and Q.

FIG. 18 illustrates the usefulness of measuring the phase as a means of separating changes in the quality factor Q from changes in the drive amplitude $A_{drive}$. Curve 18010 shows the amplitude response of an oscillator with a resonance frequency of $f_0$=320 kHz, a quality factor Q=110 and a drive amplitude $A_{drive}$=0.06 nm. Using DFRT PFM techniques, the amplitude $A_1$ 18012 is measured at a drive frequency $f_1$ and the amplitude $A_2$ 18014 is measured at a drive frequency $f_2$. Curve 18030 shows what happens when the Q value increases to 150. The first amplitude $A_1$ 18032 increases because of this increase in Q, as does the second amplitude $A_2$ 18034. Curve 18050 shows what happens when the quality factor Q, remains at 110 and the drive amplitude $A_{drive}$ increases from 0.06 nm to 0.09 nm. Now, the amplitude measurements made at $f_1$ 18052 and $f_2$ 18054 are exactly the same as in the case where the Q value increased to 150, 18032 and 18034, respectively. The amplitude response does not separate the difference between increasing the Q value or increasing the drive amplitude $A_{drive}$.

This difficulty is surmounted by measuring the phase. Curves 18020, 18040 and 18060 are the phase curves corresponding to the amplitude curves 18010, 18030 and 18050 respectively. As with the amplitude measurements, the phase is measured at discrete frequency values, $f_1$ and $f_2$. The phase curve 18020 remains unchanged 18060 when the drive amplitude Adrive increases from 0.06 nm to 0.09 nm. Note that the phase measurements 18022 and 18062 at $f_1$ for the curves reflecting an increase in drive amplitude but with the same quality factor are the same, as are the phase measurements 18024 and 18064 at $f_2$. However, when the quality factor Q increases, the $f_1$ phase 18042 decreases and the $f_2$ phase 18044 increases. These changes clearly separate drive amplitude changes from Q value changes.

In the case where the phase baseline does not change, it is possible to obtain the Q value from one of the phase measurements. However, as in the case of PFM and thermal modulated microscopy, the phase baseline may well change. In this case, it is advantageous to look at the difference in the two phase values. When the Q increases, this difference 18080 will also increase. When the Q is unchanged, this difference 18070 is also unchanged.

If we increase the number of frequencies beyond two, other parameters can be evaluated such as the linearity of the response or the validity of the simple harmonic oscillator model Once the amplitude, phase, quadrature or in-phase component is measured at more than one frequency, there are numerous deductions that can be made about the mechanical response of the cantilever to various forces. These deductions can be based around a model, such as the simple harmonic oscillator model or extended, continuous models of the cantilever or other sensor. The deductions can also be made using a purely phenomenological approach. One simple example in measuring passive mechanical properties is that an overall change in the integrated amplitude of the cantilever response, the response of the relevant sensor, implies a change in the damping of the sensor. In contrast, a shift in the "center" of the amplitude in amplitude versus frequency measurements implies that the conservative interactions between the sensor and the sample have changed.

This idea can be extended to more and more frequencies for a better estimate of the resonant behavior. It will be apparent to those skilled in the art that this represents one manner of providing a spectrum of the sensor response over a certain frequency range. The spectral analysis can be either scalar or vector. This analysis has the advantage that the speed of these measurements is quite high with respect to other frequency dependent excitations.

In measuring the frequency response of a sensor, it is not required to excite the sensor with a constant, continuous signal. Other alternatives such as so-called band excitation, pulsed excitations and others could be used. The only requirement is that the appropriate reference signal be supplied to the detection means.

Figure 16:
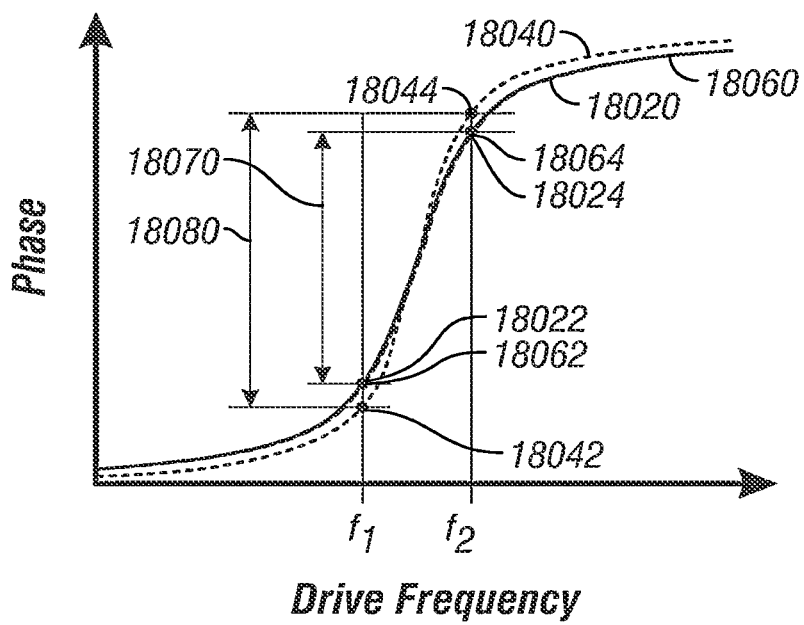

FIG. 16 shows one embodiment of a multi-frequency approach, with eight frequencies $f_1$ through $f_8$ being driven. As the resonance curve changes in response to tip-surface interactions, a more complete map of the frequency response is traced out. This may be particularly useful when measuring non-linear interactions between the tip and the sample because in that case the simple harmonic oscillator model no longer applies. The amplitude and phase characteristics of the sensor may be significantly more complex. As an example of this sort of measurement, one can drive the cantilever at one or more frequencies near resonance and measure the response at nearby frequencies.

Scanning ion conductance microscopy, scanning electrochemical microscopy, scanning tunneling microscopy, scanning spreading resistance microscopy and current sensitive atomic force microscopy are all examples of localized transport measurements that make use of alternating signals, again sometimes with an applied dc bias. Electrical force microscopy, Kelvin probe microscopy and scanning capacitance microscopy are other examples of measurement modes that make use of alternating signals, sometimes with an applied dc bias. These and other techniques known in the art can benefit greatly from excitation at more than one frequency. Furthermore, it can also be beneficial if excitation of a mechanical parameter at one or more frequencies is combined with electrical excitation at the same or other frequencies. The responses due to these various excitations can also be used in feedback loops, as is the case with Kelvin force microscopy where there is typically a feedback loop operating between a mechanical parameter of the cantilever dynamics and the tip-sample potential.

Perhaps the most popular of the AC modes is amplitude-modulated (AM) Atomic Force Microscopy (AFM), sometimes called (by Bruker Instruments) tapping mode or intermittent contact mode. Under the name "tapping mode" this AC mode was first coined by Finlan, independently discovered by Gleyzes, and later commercialized by Digital Instruments.

AM AFM imaging combined with imaging of the phase, that is comparing the signal from the cantilever oscillation to the signal from the actuator driving the cantilever and using the difference to generate an image, is a proven, reliable and gentle imaging/measurement method with widespread applications. The first phase images (of a wood pulp sample) were presented at a meeting of Microscopy and Microanalysis. Since then, phase imaging has become a mainstay in a number of AFM application areas, most notably in polymers where the phase channel is often capable of resolving fine structural details.

The phase response has been interpreted in terms of the mechanical and chemical properties of the sample surface. Progress has been made in quantifying energy dissipation and storage between the tip and sample which can be linked to specific material properties. Even with these advances, obtaining quantitative material or chemical properties remains problematic. Furthermore, with the exception of relatively soft metals such as In-Tn solder, phase contrast imaging has been generally limited to softer polymeric materials, rubbers, fibrous natural materials. On the face of it this is somewhat puzzling since the elastic and loss moduli of harder materials can vary over many orders of magnitude.

The present invention adapts techniques used recently in research on polymers, referred to there as loss tangent imaging, to overcome some of these difficulties. Loss tangent imaging recasts our understanding of phase imaging by linking energy dissipation and energy storage into one term that includes both the dissipated and the stored energy of the interaction between the tip and the sample. The linkage becomes a fundamental material property—if for example the dissipation increases because of an increase in the indentation depth, the stored elastic energy will also increase. In the case of linear viscoelastic materials, the ratio between the dissipated energy and elastically stored energy is the loss tangent. This is similar to other dimensionless approaches to characterizing loss and storage in materials such as the coefficient of restitution. The loss tangent approach to materials has very early roots, dating back at least to the work of Zener in 1941. One should note however that many materials are not linear viscoelastic materials, especially in the presence of large strains (>1%). The degree of deviation from the behavior of linear viscoelastic materials exhibited by other materials is in itself useful and interesting to measure.

In addition to loss tangent imaging, the present invention includes the quantitative and high sensitivity of simultaneous operation in a frequency modulated (FM) mode. For this purpose the AFM is set up for bimodal imaging with two feedback loops, the first using the first resonance of the cantilever and the second another higher resonance. The first loop is an AM mode feedback loop that controls the tip-sample separation by keeping the amplitude of the cantilever constant (and produces a topographic image from the feedback signals) and at the same time compares the signal from the cantilever oscillation to the signal from the actuator driving the cantilever to measure changes in phase as the tip-sample separation is maintained constant. The second feedback loop is a FM mode feedback loop that controls the tip-sample separation by varying the drive frequency of the cantilever. The frequency is varied in FM mode through a phase-locked loop (PLL) that keeps the phase—a comparison of the signal from the cantilever oscillation to the signal from the actuator driving the cantilever at the second resonance—at 90 degrees by adjusting the frequency. It is also possible to implement another feedback loop to keep the amplitude of the cantilever constant through the use of automatic gain control (AGC). If the AGC is implemented, output amplitude is constant. Otherwise, if the amplitude is allowed to vary, it is termed constant excitation mode.

Much of the initial work with FM mode was in air and it has a long tradition of being applied to vacuum AFM studies (including UHV), routinely attaining atomic resolution and even atomic scale chemical identification. Recently there has been increasing interest in the application of this technique to various samples in liquid environments, particularly biological samples. Furthermore, FM AFM has demonstrated true atomic resolution imaging in liquid where the low Q results in a reduction in force sensitivity. One significant challenge of FM AFM has been with stabilizing feedback loops.

Briefly, when AM mode imaging with phase is combined with FM mode imaging using bimodal imaging techniques, the topographic feedback operates in AM mode while the second resonant mode drive frequency is adjusted to keep the phase at 90 degrees. With this approach, frequency feedback on the second resonant mode and topographic feedback on the first are decoupled, allowing much more stable, robust operation. The FM image returns a quantitative value of the frequency shift that in turn depends on the sample stiffness and can be applied to a variety of physical models.

Bimodal imaging involves using more than one resonant vibrational mode of the cantilever simultaneously. A number of multifrequency AFM schemes have been proposed to improve high resolution imaging, contrast and quantitative mapping of material properties, some of which have already been discussed above.

Figure 20:
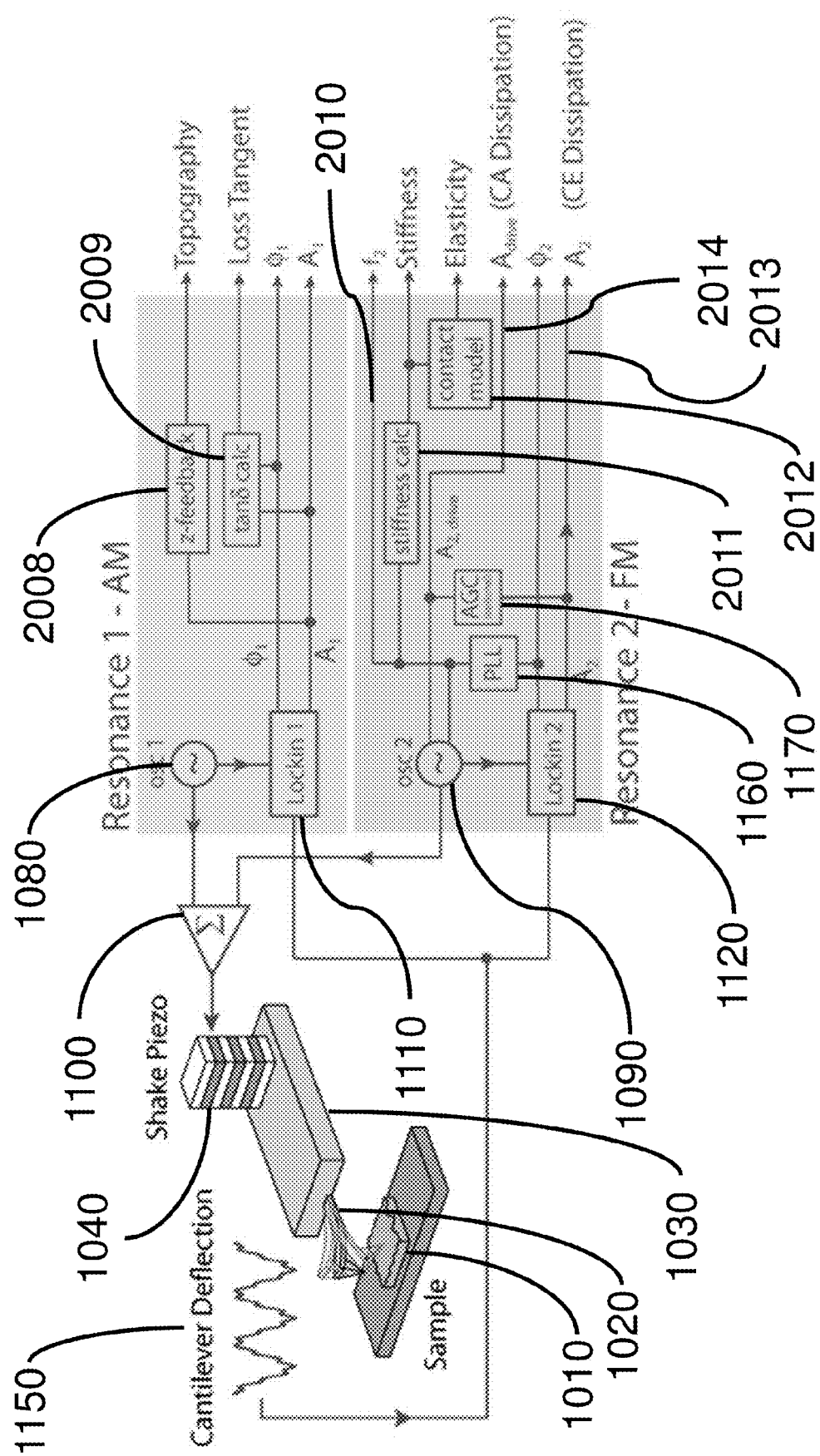
FIG. 20 Preferred embodiment of an apparatus for probing the first two flexural resonances of a cantilever and imaging in AM mode with phase is and FM mode in accordance with the present invention.

With bimodal imaging the resonant modes can be treated as independent channels, with each channel having separate observables, generally the amplitude and phase. The cantilever is driven at two flexural resonances, typically the first two, as has been described above. The response of the cantilever at the two resonances is measured and used in different ways as shown in FIG. 20. It will be noted that the FIG. 20 apparatus bear some resemblance to the apparatus shown in FIG. 1.

FIG. 20 is a block diagram of a preferred embodiment of an apparatus for probing two flexural resonances of a cantilever in accordance with the present invention. The sample 1010 is positioned below the cantilever probe 1020. The chip of the cantilever probe 1030 is driven by a mechanical actuator 1040, preferably a piezoelectric actuator, but other methods to induce cantilever motion known to those versed in the art could also be used. The motion 1150 of the cantilever 1020 relative to the frame of the microscope (not shown) is measured with a detector (not shown), which could be an optical lever or another method known to those versed in the art. The cantilever chip 1030 is moved relative to the sample 1010 by a scanning apparatus (not shown), preferably a piezo/flexure combination, but other methods known to those versed in the art could also be used.

The motion imparted to the cantilever chip 1030 by actuator 1040 is controlled by excitation electronics that include at least two frequency synthesizers 1080 and 1090. The signals from these frequency synthesizers could be summed together by an analog circuit element 1100 or, preferably, a digital circuit element that performs the same function. The two frequency synthesizers 1080 and 1090 provide reference signals to lockin amplifiers 1110 and 1120, respectively. As with other electronic components in this apparatus, the lockin amplifiers 1110 and 1120 can be made with analog circuitry or with digital circuitry or a hybrid of both. For a digital lockin amplifier, one interesting and attractive feature is that the lockin analysis can be performed on the same data stream for both flexural resonances. This implies that the same position sensitive detector and analog to digital converter can be used to extract information at the two distinct resonances.

Resonance 1: As shown in the upper shaded area of FIG. 20, the flexural resonance signal from frequency synthesizer 1080 is compared to the cantilever deflection signal 1150 through lockin amplifier 1110. This feedback loop controls the z actuator (not shown) which moves the cantilever chip 1030 relative to the sample 1010 and thus controls the amplitude of the cantilever 1020 and the tip-sample separation. The amplitude signal resulting from this feedback is used to create a topographic image of the sample 1010. Simultaneously, the phase of the cantilever 1020 is calculated from this comparison and together with the amplitude signal is used to generate the tip-sample loss tangent image.

Resonance 2: As shown in the lower shaded area of FIG. 20, the flexural resonance signal from frequency synthesizer 1090 is compared to the cantilever deflection signal 1150 through lockin amplifier 1120 and a second phase of the cantilever 1020 is calculated from this comparison. The PLL device 1160 in turn maintains this phase at 90 degrees by making appropriate adjustments in the flexural resonance signal from frequency synthesizer 1090. The required adjustment provides a FM based measure of tip-sample stiffness and dissipation. Tip-sample stiffness and dissipation can also be measured from the amplitude and phase of the flexural resonance signal from frequency synthesizer 1090. FM mode may also employ an AGC device to maintain the amplitude of the cantilever probe 1020 at a constant value.

The foregoing bimodal imaging approach to quantitative measurements has the great advantage of stability when used with Loss Tangent and AM/FM imaging techniques. With topographic feedback confined to the first resonant mode and FM control to the second resonant mode, even if the PLL or AGC control loops become unstable and oscillate, there is little or no effect on the ability of the first mode to stably track the surface topography. As is well known in the art, AM mode AFM imaging, where the topographic feedback is controlled by the oscillations of the first mode is extremely robust and stable. Thus, the overall imaging performance, where topographic and other information are gathered simultaneously, is very stable and robust.

In order to highlight some important limitations it is useful to take a mathematical approach to Loss Tangent imaging. As already noted in the discussion of AM AFM operation, the amplitude of the first resonant mode is used to maintain the tip-sample distance. The control voltage, typically applied to a z-actuator, results in a topographic image of the sample surface. At the same time, the phase of the first resonant mode will vary in response to the tip-sample interaction. This phase reflects both dissipative and conservative interactions. A tip which indents a surface will both dissipate viscous energy and store elastic energy—the two are inextricably linked. The loss tangent can be employed to measure the tip-sample interaction. As mentioned, the loss tangent is a dimensionless parameter which measures the ratio of energy dissipated to energy stored in a cycle of a periodic deformation. The following relation involving the measured cantilever amplitude V and phase $\phi$ defines the loss tangent for tip-sample interaction:

$$\tan\delta = \frac{G''}{G'} = \frac{\langle F_{ts} \cdot \dot{z}\rangle}{\omega\langle F_{ts} \cdot z\rangle} \approx \frac{\frac{V}{V_{free}}\frac{\omega}{\omega_{free}} - \sin\phi}{\cos\phi - Q\frac{V}{V_{free}}\left(1 - \frac{\omega^1}{\omega_{free}^2}\right)} = \frac{\Omega\alpha - \sin\phi}{Q\alpha(1 - \Omega^2) - \cos\phi}. \quad \text{(FullTand)}$$

In this expression, $F_{ts}$ is the tip-sample interaction force, z is the tip motion, $\dot{z}$ is the tip velocity, $\omega$ is the angular frequency at which the cantilever is driven and $\langle\ \rangle$ represents a time-average. The parameter $V_{free}$ is the "free" resonant amplitude of the first mode, measured at a reference position. Note that because the amplitudes appear as ratios in Equation (1), they can be either calibrated or uncalibrated in terms of optical detector sensitivity. In the final expression in (FullTand) we have defined the ratios $\Omega \equiv \omega/\omega_{free}$ and $\alpha \equiv A/A_{free} = V/V_{free}$. If we operate on resonance ($\Omega = 1$), the expression can be simplified to:

$$\tan\delta = \frac{\langle F_{ts} \cdot \dot{z}\rangle}{\omega\langle F_{ts} \cdot z\rangle} \approx \frac{\sin\phi - \alpha}{\cos\phi}. \quad \text{(SimpleTand)}$$

Equation FullTand differs by a factor of $-1$ from an earlier version, because it is assumed here that the virial ($F_{ts} \cdot z$) is positive for repulsive mode operation, which means $\tan\delta > 0$ in repulsive mode.

There are some important implications of these equations:

1. Attractive interactions between the tip and the sample will in general make the elastic denominator ($F_{ts} \cdot z$) of equations FullTand and SimpleTand smaller. This will increase the cantilever loss tangent and therefore overestimate the sample loss tangent.

2. Tip-sample damping with origins other than the sample loss modulus, originating from interactions between, for example, a water layer on either the tip or the sample will increase the denominator in equations FullTand and SimpleTand.

These implications point out an important limitation of loss tangent imaging. Equations (FullTand) and (SimpleTand) really represent the loss tangent of the cantilever, but not necessarily the loss tangent originating from the linear viscoelastic behavior of the sample mechanics: G" and G'.

Loss tangent analysis has been under-utilized. In the past twenty plus years of tapping mode imaging, there are many examples of phase imaging of polymeric materials and very few of metals and ceramics with a loss tangent less than 0.01, that is, $\tan\delta \lesssim 10^{-2}$. There appears to be an impression that less elastic materials are more lossy. However, there are many examples where a stiffer material might also exhibit higher dissipation. This underscores the danger in simply interpreting phase contrast only in terms of sample elasticity.

Furthermore experimentalists bear the burden of setting up the AFM and its control algorithms such that the loss tangent of interest is being measured. As mentioned above, a number of conservative and dissipative interactions contribute to loss tangent estimation in addition to the linear viscoelastic interactions between the tip and the sample. In fact, depending on the experimental parameters and settings, the sample loss and storage moduli may contribute only a small portion of the signal in the loss tangent estimation. For example, when imaging the mechanical loss tangent of a polymer surface it is important to operate in repulsive mode, so that the cantilever interacts with the short-range repulsive forces controlled by the sample's elastic and loss moduli properties. In this section we consider some of these contributions, including experimental factors such as air damping and surface hydration layers and material effects such as viscoelastic nonlinearity.

Proper choice of the zero-dissipation point is critical for proper calibration of the tip-sample dissipation. In particular, squeeze film damping, C. P. Green and J. E. Sader, *Frequency response of cantilever beams immersed in vis-* cous fluids near a solid surface with applications to the atomic force microscope, J. Appl. Phys. 98, 114913 (2005); M. Bao and H. Yang, Squeeze film air damping in MEMS, Sens. Actuators, A 136, 3 (2007), can have a strong effect on the measured dissipation. Squeeze film damping causes the cantilever damping to increase as the body of the cantilever moves closer to the sample surface. For rough or uneven surfaces, this can mean that the cantilever body height changes with respect to the average sample position enough to cause crosstalk artifacts in the measured dissipation and therefore the measured loss tangent.

Figure 21:
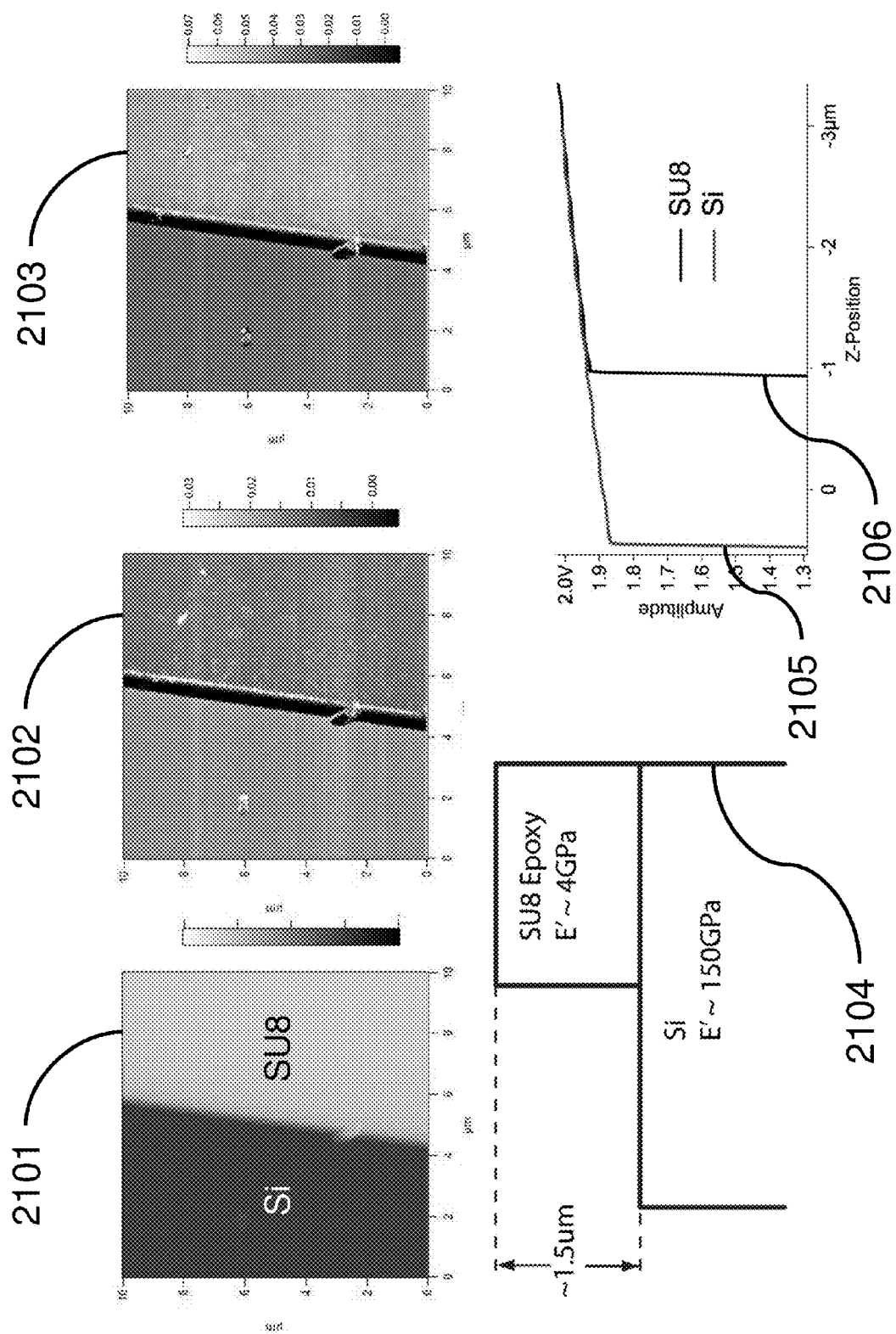
FIG. 21 Topography of a Si-epoxy (SU8) patterned wafer imaged using the Loss Tangent technique of the present invention.

An example of squeeze film damping effects is shown in FIG. 21. The sample there was a silicon (Si) wafer patterned with a film of SU-8, an epoxy resin commonly used for photolithography. The elastic modulus of silicon is relatively high (~150-160 GPa), while that of SU-8 is much lower (~2-4 GPa), H. Lorenz, M. Despont, M. Fahrni, N. LaBianca, P. Vettiger and P. Renaud, SU-8: a low-cost negative resist for MEMS, J. Micromech. Microeng. 7, 121 (1997). However, because SU-8 is a polymer, its viscoelastic modulus is expected to be much greater than that of Si. An Olympus AC240 cantilever was used to acquire topography and loss tangent images. As the topography image 2101 in FIG. 21 shows, the SU-8 film was >1.5 µm thick.

The loss tangent image 2102 in FIG. 21 has a large overall loss tangent value of ~0.3. However, contrary to the expectation, the loss tangent measured on the Si is larger than that measured on the SU-8: $\tan \delta_{Si} > \tan \delta_{SU8}$. As we will show below, these issues are explained by considering another source of energy dissipation—squeeze film damping. Because the Si substrate is ~1.5 µm lower than the SU-8 film, the cantilever experiences greatly increased squeeze film damping when measuring the Si regions. This is interpreted as a larger loss tangent over the Si regions. Images 2105 and 2106 of FIG. 21 show that the reference free air amplitudes for the cantilever are different over the two regions, presumably due to the large difference in height between the two materials. As mentioned above, these reference values are critical for correctly calculating the loss tangent.

Figure 22:
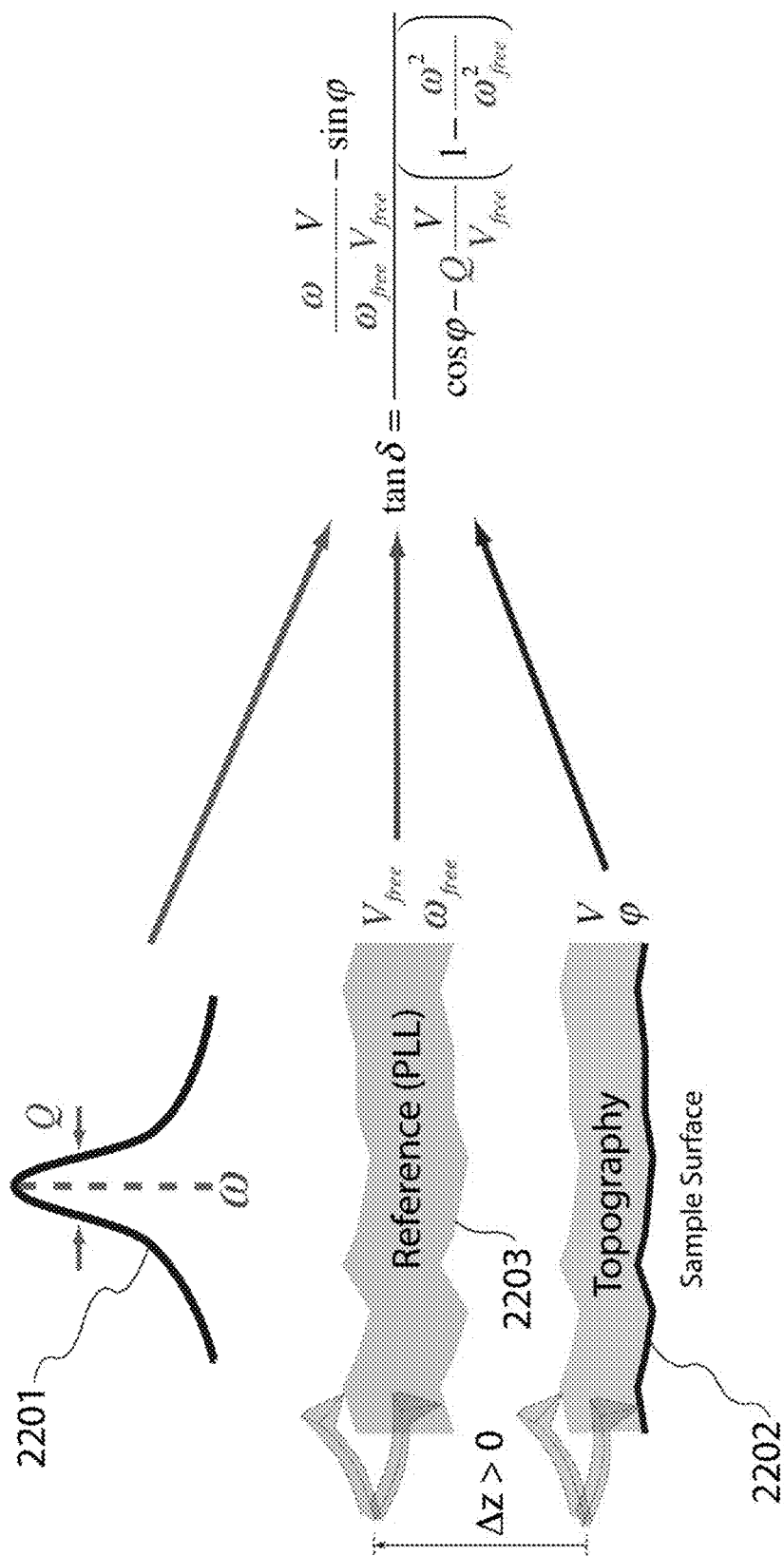
FIG. 22 Steps in calculating the corrected Loss Tangent.

To correct for squeeze film damping effects in loss tangent measurements, we use the two-pass imaging technique depicted in FIG. 22. As shown image 2202 of FIG. 22, the first pass of this technique is the normal AM mode imaging pass, shown in blue. The second pass 2203 of the technique is a phase-locked loop (PLL) reference calibration pass, or "nap pass," shown in red. The cantilever is raised a fixed relative height parameter ($\Delta z$) above each (x,y) pixel location of the sample and the same x-y scan as with the first pass is repeated. The color-coded loss tangent equation on the right side of FIG. 22 explains how the two-pass procedure is used to make the corrected calibration. The cantilever drive frequency $\omega$ and quality factor Q, both colored green in the color-coded loss tangent equation on the right side of FIG. 22, are measured far away from the surface of the sample in the initial cantilever tune as shown in image 2201 of FIG. 22. The reference frequency $\omega_{free}$ and reference amplitude $A_{free}$ or $V_{free}$ are measured by operating the cantilever in a PLL for the first pass. As already noted the PLL keeps the frequency and amplitude at reference during the second pass.

In order to provide a concrete demonstration of the result of two-pass imaging technique, we applied the technique to the Si/SU-8 sample described above. Image 2103 of FIG. 21 shows the resulting loss tangent image corrected for squeeze film damping effects. After applying the correction shown in image 2103, the loss tangent over the Si is on the order of 0.01 and over the SU-8 on the order of 0.05. Thus the order is now correct for the two materials, namely $\tan \delta_{Si} < \tan \delta_{SU8}$.

Another improvement in loss tangent imaging is to include energy being transferred to higher harmonics of the cantilever. This can be a significant effect at low Q values. Energy losses to higher harmonics of the cantilever are more significant at lower Q than at higher Q. J. Tamayo, et al., High-Q dynamic force microscopy in liquid and its application to living cells, Biophysical J., 81, 526-37 (2001), has accounted for this energy dissipation by including the harmonic response of the cantilever. By extending this analysis to storage, we derived an extension of the SimpleTand expression of the loss tangent that now includes harmonic correction terms:

$$\tan\delta = \frac{\sin\phi_1 - \sum_{n\geq1}^{N} n^2 \frac{A_n^2}{A_1 A_{free}}}{\cos\phi_1 - Q\sum_{n\geq1}^{N} (n^2-1)\frac{A_n^2}{A_1 A_{free}}}. \qquad \text{(HarmTand)}$$

In equation HarmTand, n is the order of the harmonic (ranging from the fundamental at n=1 up to the limit N) and $A_n$ the amplitude at the nth harmonic. In the case of the dissipation term (the numerator), the harmonics behave as a "channel" for increased damping. Specifically, if energy goes into the harmonics at the fundamental mode, damping will appear to increase. In the case of the storage term (the denominator), energy going into the harmonics looks like a reduction in the kinetic energy of the cantilever. This also has the effect of reducing the apparent storage power in equations FullTand and SimpleTand. The two effects act in concert to increase the measured loss tangent.

In addition to measuring many of the harmonics of the loss tangent, the error associated with energy losses can be estimated and improved upon by simply measuring the response of the cantilever at a harmonic, for example the 6th or 4th harmonic, that is close to the next highest resonant mode.

Here we discuss two aspects of the behavior of materials that affect loss tangent estimates. The first concerns the viscoelastic response of a material. Implicit in our definition and use of the loss tangent expression is the assumption that a sample measured with an AFM indenting tip is a linear viscoelastic material. In this limit, the strains would remain small and follow a linear stress-strain relationship, so that an increase in stress would increase strain by the same factor. However, the assumption of linear viscoelasticity may not always hold. For instance, the experimental settings may apply sufficiently large stresses to cause a nonlinear response. In such cases, loss tangent measurements will not accurately represent the $\tan \delta$ of the material. One test for the linearity of the response, or improper experimental parameters in general, is to try to measure the loss tangent as a function of indentation depth. In the limit that the interaction is governed by linear viscoelastic theory, there should not be a depth dependence in the estimated mechanical parameters such as loss tangent or modulus.

Figure 29:
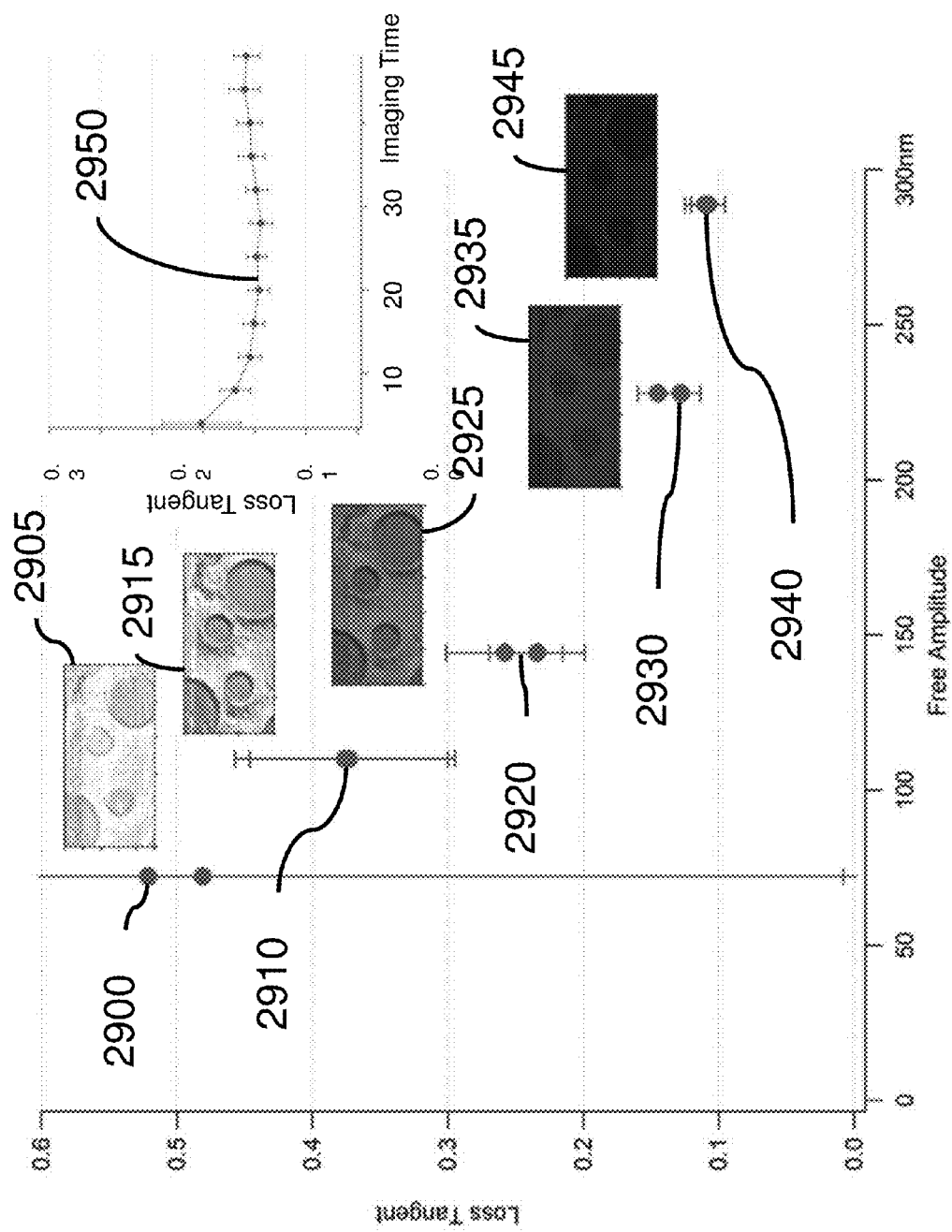
FIG. 29 Loss tangent measurements of a polystyrene-polypropylene spin cast film as a function of the free air amplitude.

FIG. 29 shows how a loss tangent estimate improves with cantilever oscillation amplitude on a spin-coated film of polypropylene and polystyrene. In the results described in this figure, the free amplitude $A_{free}$ was varied while the setpoint ratio $\alpha \equiv A/A_{free}$ was held constant at $\alpha=0.5$. For a series of $A_{free}$ values two points are plotted against the loss tangent that represents the average of the polypropylene and polystyrene regions of the corresponding inset images. It can be seen that as $A_{free}$ increases from 70 nm to 290 nm, (points 2900, 2910, 2920, 2930 and 2940 in FIG. 29) tan δ decreases and approaches the expected values of tan δ≈0.1-0.2 for polypropylene and polystyrene. The inset images 2905, 2915, 2925, 2935 and 2945 corresponding to points 2900, 2910, 2920, 2930 and 2940, respectively, display with the same absolute grayscale the values of tan δ, which range from tan δ=0 (black) to tan δ=0.5 (white).

The results of FIG. 29 are consistent with the simple idea that as the free amplitude increases, the tip spends more time interacting with viscoelastic contact forces. Thus, the relative contribution of these forces to the value of the loss tangent increases, and that value approaches the ideal limit. In addition, the measurement uncertainty (indicated in FIG. 29 by error bars of one standard deviation) decreases dramatically.

Finally, the graph 2950 inserted at the upper right of FIG. 29 shows a typical time evolution of the loss tangent measurement for the largest value of $A_{free}$.

The other aspect of the behavior of materials which affects loss tangent estimates that we will discuss concerns the potential for plastic deformation of the tip of the cantilever or the sample. At the extreme limit of nonlinear viscoelasticity, plastic deformation of the sample represents irreversible work that will appear in the numerator of the loss tangent. If the tip does plastic work on the sample, or vice versa in the case of hard samples, this will be indistinguishable from sample dissipation (i.e. G"). Thus, plasticity should lead to an overestimation of the loss tangent. The complex theory of indentation-induced plasticity in materials is strongly dependent on indenter shape and is beyond the scope of this work. K. L. Johnson, *Contact Mechanics* (Cambridge University Press, Cambridge, UK, 1985); C. M. Mate, *Tribology on the Small Scale* (Oxford University Press, Oxford, UK, 2008) However, we can estimate the yield stress Y from its relation to the force $F_{plastic}$ needed for plastic deformation:

$$F_{plastic} = \frac{(16\pi)^2}{6}\left(\frac{R}{E_c}\right)^2 Y^3, \qquad \text{(FPlastic)}$$

where R is the radius of curvature of the hemispherical indenter tip and $E_c$ is the elastic modulus.

We can use the equation Fplastic to explore the relationship between Young's modulus and strength for a range of common materials. Here, the term "strength" corresponds to yield strength for metals and polymers, compressive crushing strength for ceramics, tear strength for elastomers and tensile strength for composites and woods. With R=10 nm and $F_{plastic}$=1 pN, 1 nN and 1 μN in Fplastic, we find that a significant fraction of materials is expected to plastically yield for loading forces between 1 and 10 nN, a range typical in AM mode AFM experiments. This illustrates the importance of using the appropriate operating forces when performing experiments.

Furthermore, plastic deformation can lead to the formation of surface debris, which may also result in contamination of the AFM tip. In this case, dissipation at the debris-sample and debris-tip interfaces may provide additional unwanted contributions to the loss tangent measurement. It is therefore important to understand and minimize contaminants on the surface.

We now consider another method of estimating loss tangent which we refer to as the differential loss tangent method.

The impedance of a freely vibrating cantilever $\mathcal{C}^{-1}(\omega)$ with effective stiffness $k_c$, mass $m_c$, and damping $b_c$ which is driven at some angular frequency ω is $\mathcal{C}^{-1}(\omega)=k_c-m_c\omega^2+i\omega b_c$ (where $i=\sqrt{-1}$) with a corresponding resonant frequency $\omega_c=\sqrt{k_c/m_c}$ and a quality factor $Q_c=k_c/\omega_c b_c$. The impedance describes the complex-valued driving force $F_d$ necessary to excite the cantilever with some oscillation amplitude A. The impedance has units of N/m. The magnitude spectrum of the cantilever $|\mathcal{C}(\omega)|$ can be expressed as $$|C(\omega)| = \frac{A}{F_d} = -\frac{\sin\theta_C(\omega)}{\omega b_c} = \frac{\omega_c}{\omega}\frac{Q_c\sin\theta_C}{k_c},$$

where $\theta\mathcal{C}(\omega)$ is the phase spectrum given by $$\theta_C(\omega) = \tan^{-1}\left\{\frac{\omega b_c}{k_c - m_c\omega^2}\right\} = \tan^{-1}\left\{\frac{\omega b_c}{k_c(-(\omega/\omega_c)^2)}\right\}.$$

It is also convenient to express the magnitude spectrum as:

$$|C(\omega)| = \frac{A}{F_d} = \frac{1}{\sqrt{(k_c - m_c\omega^2)^2 + (\omega b_c)^2}}.$$

The impedance $\mathcal{C}^{-1}(\omega)$ is measured experimentally by exciting the cantilever with a driving force $F_d$ through a variety of means known to those skilled in the art at a range of frequencies and fitting the observed amplitude A(ω) and phase φ(ω) to the equation $$C^{-1}(\omega) = \frac{F_d}{A(\omega)}e^{i\phi(\omega)}.$$

This fit (or only fitting A(ω)) allows the extraction of the cantilever parameters $k_c$, $m_c$, and $b_c$. Note that $\mathcal{C}^{-1}(\omega)=|\mathcal{C}(\omega)|^{-1}\cdot e^{i\theta_c(\omega)}$ is a theoretical true impedance profile which is inferred by an experimental measurement $$\frac{F_d}{A(\omega)}\cdot e^{i\phi(\omega)}.$$

In the presence of an actual tip-sample impedance interaction profile, $\mathcal{I}^{-1}(\omega,z)$, defined as $$\mathcal{I}^{-1}(\omega,z) = k_i(z) + i\omega b_i(z),$$

where z is a generalized position coordinate, this profile can be assumed to be the true impedance interaction profile that has not yet been subject to convolution due to cantilever amplitude. The impedance of this interacting cantilever is $$\mathcal{C}_i^{-1}(\omega,z_c) = \mathcal{C}^{-1}(\omega) + \mathcal{I}^{-1}(\omega,z) = k_c + k_i(z_c) - m_c\omega^2 + i\omega[b_c + b_i(z_c)],$$

where $z_c$ is the instantaneous position of the cantilever tip. Panel 3610 of FIG. 36 depicts the complex-valued characterization of tip-sample interaction in this situation[1].

Figure 36:
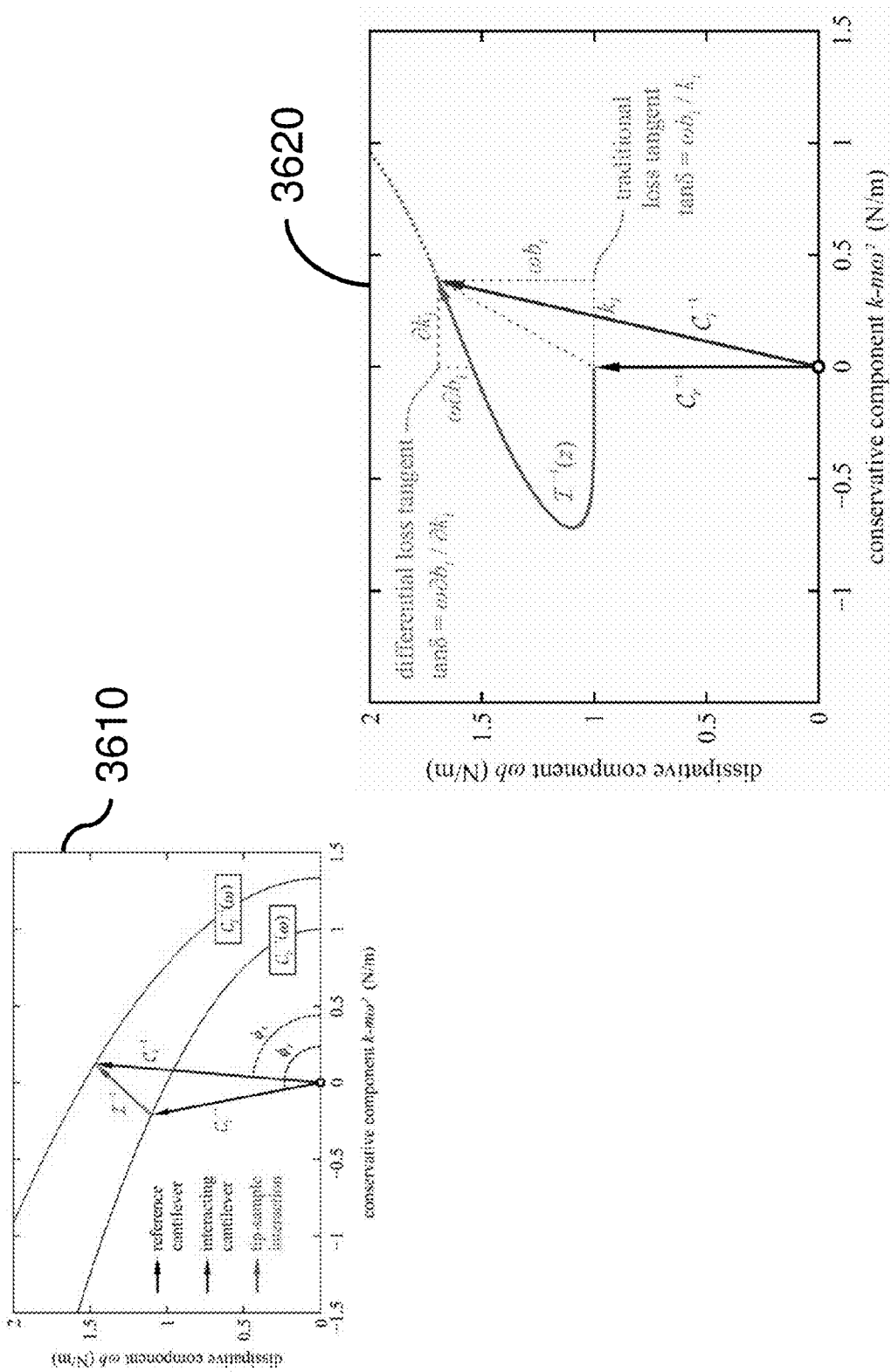
FIG. 36 Phasor interpretation of loss tangent and differential loss tangent estimations.

---
[1] Note that Q=1 was used in Panel 3610 of FIG. 36 so that the axes can be scaled 1:1. However, the same mathematical formulism applies to all Q values.

The impedance interaction can be extracted from a measurement by taking the difference between an interacting cantilever $\mathcal{C}_i^{-1}$, and the same cantilever at some reference position $\mathcal{C}_r^{-1}$ with no interaction $$\mathcal{I}^{-1}(\omega,z) = \mathcal{C}_i^{-1}(\omega,z_c) - \mathcal{C}_r^{-1}(\omega).$$

Experimentally, this is performed at a single drive frequency $\omega_d$ at some distance $z_c$ from the sample $$k_i(z_c) + i\omega_d b_i(z_c) = \frac{F_d}{A_i}e^{i\phi_i} - \frac{F_d}{A_r}e^{i\phi_r},$$

where the reference amplitude $A_r$ and reference phase $\phi_r$ are measured with no tip-sample interaction at some distance $z \gg z_c$, and the interaction amplitude $A_i$ and interaction phase $\phi_i$ are measured at a distance $z_c$. This complex-valued equation can be split into its real and imaginary components. Any change in the real components relates to interaction stiffness $$k_i = \frac{F_d}{A_i}\cos\phi_i - \frac{F_d}{A_i}\cos\phi_r.$$

Changes in the imaginary components relate to interaction damping $$\omega_d b_i = \frac{F_d}{A_i}\sin\phi_i - \frac{F_d}{A_r}\sin\phi_r.\text{[2]}$$

The conserved energy of an interacting cantilever averaged over one cycle is $$E_{cons} = \tfrac{1}{2}k_i A^2 + \tfrac{1}{2}k_c A^2,$$

while the dissipated energy averaged over one cycle is $$E_{diss} = \tfrac{1}{2}\omega b_i A^2 + \tfrac{1}{2}\omega b_c A^2.$$

The loss tangent isolates the energy conserved and dissipated by the interaction alone, resulting in $$\tan\delta = \frac{E_{diss,i}}{E_{cons,i}} = \frac{\omega b_i}{k_i}.$$

Assuming some arbitrary, but fixed, drive frequency $\omega = \omega_d$ and some driving force $F_d$ $$\tan\delta = \frac{\omega_d b_i}{k_i} = \frac{\frac{F_d}{A_i}\sin\phi_i - \frac{F_d}{A_r}\sin\phi_r}{\frac{F_d}{A_i}\cos\phi_i - \frac{F_d}{A_r}\cos\phi_r},$$

which simplifies to $$\tan\delta = \frac{A_r\sin\phi_i - A_i\sin\phi_r}{A_r\cos\phi_i - A_i\cos\phi_r}.\text{[3]}$$

[3] Note that the following expressions are mathematically identical $$\tan\delta = \frac{A_r\sin\phi_i - A_i\sin\phi_r}{A_r\cos\phi_i - A_i\cos\phi_r} = \frac{\alpha\Omega - \sin\phi}{\alpha Q(1 - \Omega^2) - \cos\phi}.$$

The advantage of parameterizing the tan δ expression as a function of $(A_r, A_i, \phi_r, \phi_i)$ as opposed to $(\Omega, \alpha, Q, \phi)$ is that $(A_r, \phi_r)$ can be measured from a reference image taken at a soft setpoint, far from the surface or anywhere in between.

Panel 3620 of FIG. 36 depicts how the differential loss tangent measurement can probe the local loss tangent of the interaction or the integrated loss tangent of the interaction, depending on where the reference amplitude and phase are measured.

For convenience we have summarized the steps required to calibrate an AFM for operation in AM mode and measuring loss tangent, followed by the additional steps required for measuring differential loss tangent. We assume that the AFM in question is equipped with course-positioning and fine-positioning systems for maneuvering the cantilever and the sample.

Basic AFM Calibration Protocol
1. Turn drive mechanism (e.g.: photothermal, magnetic or piezoacoustic excitation) OFF
2. Position detection laser on the cantilever tip and preferably center the photodetector to null the output.
3. Calibrate the stiffness of the cantilever from a measured thermal spectrum far from the surface (at least as far as the width of the cantilever) and record the natural frequency of the cantilever.
4. Approach the sample and tip to close proximity, as determined by optical inspection of the tip and sample locations, by using the coarse-positioning system of the AFM
5. Turn drive mechanism ON
   a. Set the drive frequency equal to the natural frequency of the cantilever as determined in the thermal (step 3)
   b. Set drive amplitude to approximate desired free oscillation amplitude
6. Approach surface until contact is established by setting the feedback set point to a desired interaction amplitude that is slightly less than the free oscillation amplitude (Alternating between the fine-positioning system and coarse-positioning system may yield optimal results)
7. Fully retract the sample from the tip of the cantilever within the range of the fine-positioning system
8. Acquire cantilever tune
   a. Set the drive frequency to the natural frequency of the cantilever far from the sample, or
   b. Set the drive frequency to a local amplitude maximum of the cantilever tune near the cantilever resonant frequency
9. Turn drive mechanism OFF and acquire an additional thermal spectrum of the cantilever that is closer to the imaging conditions (If photothermal excitation will be used for imaging, the excitation laser should be turned on during the cantilever thermal)
10. Using a simple harmonic oscillator model and the data from the thermal spectrum define the new natural frequency of the cantilever and determine the phase-to-drive-frequency relationship of the cantilever
11. Use the stiffness from the first thermal spectrum acquired in step 3 to calculate the optical lever sensitivity of the second thermal spectrum
12. Turn drive mechanism ON
13. Choose a desired drive frequency
    a. Optimal drive frequency may be equal to the cantilever natural or b. Optimal drive frequency may be equal to a local maximum of the cantilever tune 14. Choose drive amplitude
   a. Set to achieve desired cantilever free oscillation amplitude
   b. Record the amplitude as the cantilever reference amplitude $A_r$
15. Set phase from the simple harmonic fit made to the thermal spectrum in step 10.
   a. Repeat this step whenever the drive frequency is changed
   b. Repeat this step whenever the drive amplitude is changed
   c. If the phase is not within [80°,100°], consider resuming protocol at step 1
   d. Record phase as the cantilever reference phase $\phi_r$ IF the drive frequency is changed, resume at step 1
IF the drive amplitude is changed, resume at step 11
IF the detection laser spot is changed, resume at step 10
IF any parameter of the drive mechanism is changed, resume at step 9

Data Acquisition Protocol
1. Approach the sample using the preferred method of distance feedback protocol
   a. Closed-loop feedback based on a constant amplitude setpoint or any other desired setpoint, or
   b. Open-loop (no feedback) approach of the sample
2. Acquire data interaction amplitude $A_i$ and data interaction phase $\phi_i$ during data acquisition Data Processing Protocol for Sample Approach Curves
1. Thermal Reference
The foregoing Basic AFM Calibration Protocol provides the reference parameters $(A_r, \phi_r)$ and the Data Acquisition Protocol provides the data interaction variables $(A_i, \phi_i)$ that can be processed by the differential loss tangent equation to result in a loss tangent measurement tan δ.
2. Fixed Reference
The reference parameters $(A_r, \phi_r)$ may be updated by selecting a data point (or average of data points) from the data interaction variables $(A_i, \phi_i)$. In that case the differential loss tangent equation does not require recording the reference parameters $(A_r, \phi_r)$ before data acquisition. However, the phase does require recording using step 14 so that the absolute cantilever phase is recorded during the interaction. Any arbitrary phase offset causes an error in the tan δ calculation. In contrast, any systematic calibration error in the amplitude is cancelled out when computing tan δ.
3. Moving Reference
Alternatively, the reference parameters $(A_r, \phi_r)$ may be updated discretely or continuously as the data interaction variables $(A_i, \phi_i)$ are being processed. That is, every set of data interaction variables $(A_i, \phi_i)$ can be assigned different reference parameters $(A_r, \phi_r)$ when processing the data using the differential loss tangent equation.

Data Processing Protocol for 2D Images
1. Thermal Reference
A two-dimensional map of interaction variables $(A_i, \phi_i)$ can be processed using the differential loss tangent equation while using the data reference parameters $(A_r, \phi_r)$ recorded during the calibration protocol.
2. Differential Imaging
Alternatively, two images can be acquired either consecutively or simultaneously (by interleaving data acquisition at two different imaging setpoints) and one image can be used to determine the interaction variables $(A_i, \phi_i)$ and the other image can be used to determine the data reference parameters $(A_r, \phi_r)$.

Bringing the discussion of loss tangent to a close we now consider how error and noise affect estimates of loss tangent.

Thermal and other random errors set a minimum detectable threshold for the loss tangent, typically in the range of tan $\delta \approx 10^{-2}$. This random noise is typically dominated by Brownian motion of the cantilever for the Asylum Research Cypher AFM in AM mode. Other random noise such as shot noise might become significant and if it were it would have to be included as well.

Systematic errors are typically associated with choosing the appropriate point for zero dissipation. It is convenient to divide into two tasks. First, the task of correctly tuning the cantilever at the reference position, that is, defining the resonant frequency, the quality factor, the free amplitude and the phase offset to correct for ubiquitous instrumental phase shifts. In particular, the most accurate estimates of the loss tangent require higher precision in these tune parameters than commonly practiced in the art. Second, the task of accounting for non-linear viscoelastic contact mechanical forces between the tip and the sample. In particular, we describe improvements in the estimation of the loss tangent that comprise (i) a novel method for measuring the cantilever free amplitude and resonant frequency at every pixel with use of an interleaved scanning technique and (ii) methods of accounting for the presence of forces other than linear viscoelastic interactions between the tip and the sample.

Figure 30:
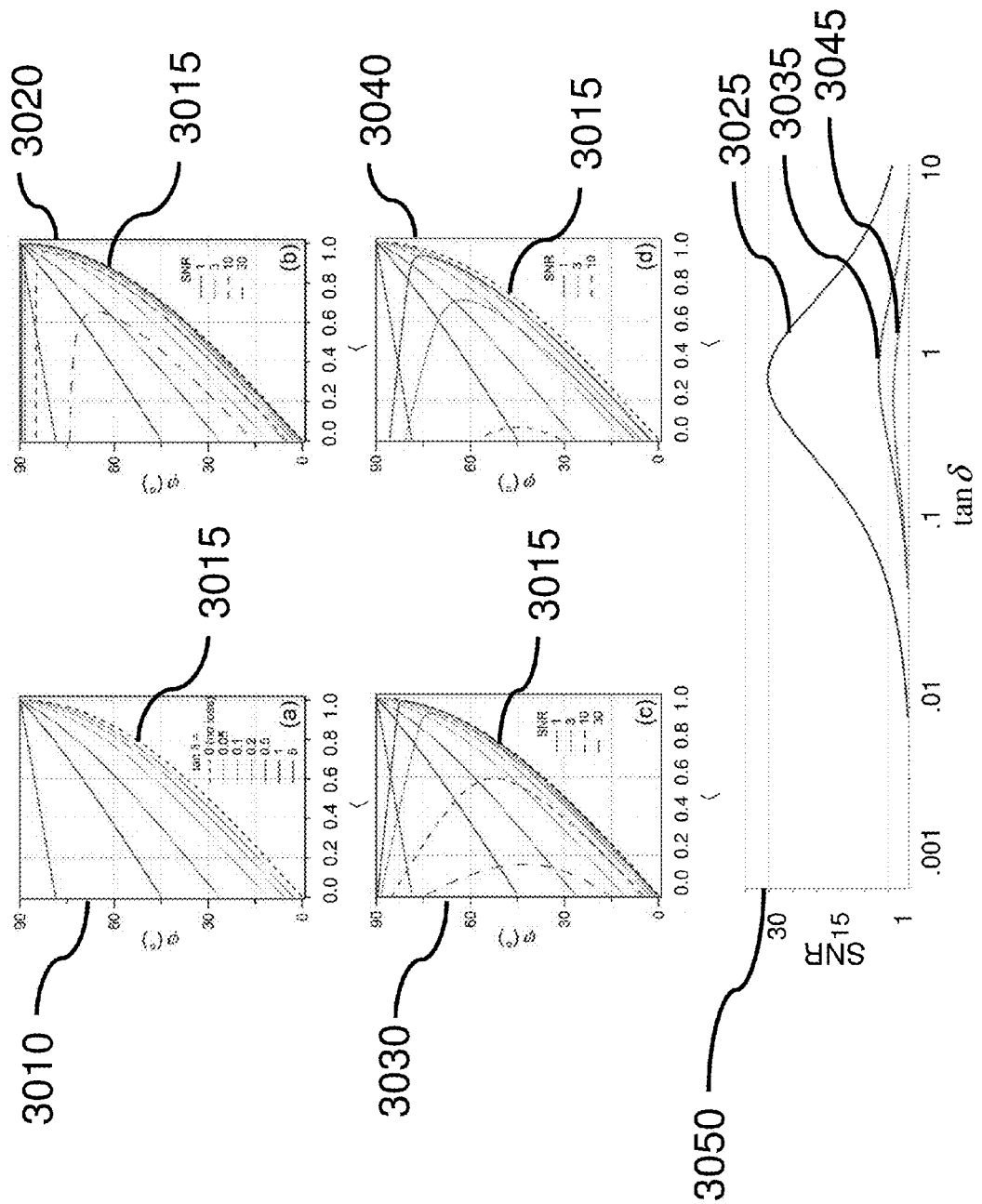
FIG. 30 Signal to noise of loss tangent estimates

To understand how noise estimates affect the loss tangent, it is useful to map amplitude and phase onto an equation for the loss tangent. FIG. 30 shows contour plots of tan δ versus phase $\phi$ and relative amplitude $\alpha \equiv A/A_{free}$ created with the SimpleTand equation discussed above. Image 3020 of FIG. 30 shows the result of this mapping: the loss tangent is constant along a particular contour, even though the relative amplitude and phase values continuously vary. The lower boundary (black dotted line) 3015 in image 3020 of FIG. 30 represents the case of zero dissipation, where the interaction between the tip and the sample is perfectly elastic. This curve is given by the zero-dissipation expression sin $\phi=\alpha$ from J. P. Cleveland, et al., *Energy dissipation in tapping mode atomic force microscopy*, Applied Physics Letters, 72, 20 (1998). Phase values near this boundary are to be expected when measuring relatively loss-free metals, ceramics and other materials with low losses and high modulus. Any experimental phase and relative amplitude values below this boundary represent a violation of energy conservation and presumably indicate improper calibration of the cantilever parameters.

Above the no-loss boundary 3015 in image 3020 of FIG. 30, the solid lines represent contours of constant loss tangent, with values denoted in the legend of the image. At a given relative amplitude $\alpha$, the phase $\phi$ moving towards $\phi=90°$ corresponds to an increasing loss tangent. As the value of tan δ increases, the contours approach the upper boundary of $\phi=90°$. This corresponds to all dissipation with no elastic storage, such as expected for a purely viscous fluid. The other images of FIGS. 30, 3010, 3030 and 3040, show SNR contours with various amounts of systematic and random noise in the observables, as labeled in Table I below.

It is useful to perform a standard error analysis to understand the importance of the parameters in the FullTand and SimpleTand and their impact on practical loss tangent imaging. As seen from the above discussion, there are two types of error to be addressed: random and systematic.

With standard error analysis, the random uncertainty in loss tangent imaging $\Delta_r(\tan\delta)$ due to uncorrelated random uncertainty $\Delta_r\phi$, is given by $\Delta_r\Omega$, $\Delta_r\alpha$ and $\Delta_r Q$ in $\phi$, $\Omega$, $\alpha$ and $Q$, respectively, from $$\Delta_r(\tan\delta) = \sqrt{\left(\frac{\partial\tan\delta}{\partial\phi}\right)^2(\Delta_r\phi)^2 + \left(\frac{\partial\tan\delta}{\partial\Omega}\right)^2(\Delta_r\Omega)^2 + \left(\frac{\partial\tan\delta}{\partial\alpha}\right)^2(\Delta_r\alpha)^2 + \left(\frac{\partial\tan\delta}{\partial Q}\right)^2(\Delta_r Q)^2}.$$

Similarly, the systematic uncertainty in loss tangent imaging $\Delta_s(\tan\delta)$ due to systematic uncertainty $\Delta_s\phi$, is given by $\Delta_s\Omega$, $\Delta_s\alpha$ and $\Delta_s Q$ respectively, for small uncertainty values from $$\Delta_s(\tan\delta) = \frac{\partial\tan\delta}{\partial\phi}\Delta_s\phi + \frac{\partial\tan\delta}{\partial\Omega}\Delta_s\Omega + \frac{\partial\tan\delta}{\partial\alpha}\Delta_s\alpha + \frac{\partial\tan\delta}{\partial Q}\Delta_s Q$$

For the case of both systematic and random uncertainty, the total uncertainty is determined by $$\Delta_{tot}(\tan\delta) = \sqrt{[\Delta_s(\tan\delta)]^2 + [\Delta_r(\tan\delta)]^2}$$

The separate derivatives in the above two equations for random and systematic uncertainty can be evaluated as $$\frac{\partial\tan\delta}{\partial\phi} = \frac{1 + \alpha Q(\Omega^2 - 1)\cos\phi - \alpha\Omega\sin\phi}{[\alpha Q(\Omega^2 - 1) + \cos\phi]^2}$$

$$\frac{\partial\tan\delta}{\partial\alpha} = \frac{\Omega\cos\phi + Q(\Omega^2 - 1)\sin\phi}{[\alpha Q(\Omega^2 - 1) + \cos\phi]^2},$$

$$\frac{\partial\tan\delta}{\partial\Omega} = \frac{\alpha Q[\alpha(\Omega^2 + 1) - 2\Omega\sin\phi] - \alpha\cos\phi}{[\alpha Q(\Omega^2 - 1) + \cos\phi]^2}$$

$$\frac{\partial\tan\delta}{\partial Q} = \frac{\alpha(\Omega^2 - 1)(\alpha\Omega - \sin\phi)}{[\alpha Q(\Omega^2 - 1) + \cos\phi]^2}.$$

As a specific example comparing the relative weights of the foregoing terms, we assume a cantilever similar to those used in the experiments discussed above, the AC240 from Olympus, with the following operating parameters: $\Omega=1$, $\alpha=0.5$, $Q=150$ and $\omega=2\pi 75$ kHz. These conditions correspond to operating on resonance with a setpoint ratio of 0.5, (i.e., AM mode amplitude is 50% of the free amplitude). The sample loss tangent is assumed to be $\tan\delta=0.1$, as expected for a polymer such as high-density polyethylene. From the FullTand equation, these values yield a cantilever phase shift of $\phi\approx36°$ (refer to image 3010 of FIG. 30 to see this graphically). With the four equations immediately above, the individual error terms can be evaluated as $$\frac{\partial\tan\delta}{\partial\phi} = 0.019/°, \quad \frac{\partial\tan\delta}{\partial\alpha} = -1.24, \quad \frac{\partial\tan\delta}{\partial\Omega} = -20.7 \text{ and}$$

$$\frac{\partial\tan\delta}{\partial Q} = 0.$$

In the experience of the inventors, typical values of random uncertainty in amplitude, phase and tuning frequency are $\Delta_s\phi=0.3°$, $\Delta_s\alpha=10^{-2}$, and $\Delta_s\Omega=10^{-3}$, respectively, for the first mode. These values yield a total loss tangent error estimate of $\Delta_s\tan\delta=0.026$. This result is surprisingly large, given that the loss tangent of many polymer materials is of similar order or smaller. Of the three contributions, the largest is from the uncertainty in tuning frequency $\Delta_s\Omega$. If that is improved to $\Delta_s\Omega=10^{-4}$, the loss tangent uncertainty is reduced to $\Delta_s\tan\delta=0.016$. This somewhat unexpected result implies that careful identification of the cantilever resonance frequency is important for quantitative loss tangent estimation. While this level of tuning uncertainty is not typical for tapping mode operation, it is reasonable. An informal survey of autotune functions on a variety of commercial AFM instruments yielded scatter as large as 1 kHz and typically on the order of several hundred hertz. In the course of these investigations, we have improved our tuning routine to bring the frequency uncertainty closer to a few tens of hertz, $\Delta_s\Omega\leq 10^{-4}$, without adding significant time to the procedure.

It is also useful to define the signal to noise ratio (SNR) to consider how SNR affects the loss tangent:

$$SNR = \frac{\tan\delta}{\Delta(\tan\delta)}. \quad (SNRDef)$$

Typically, we would like SNR$\geq 1$ so that the signal is larger than the uncertainty. For the example above with the AC240 Olympus cantilever, this corresponds to tuning the cantilever to within ~300-400 Hz of the 75 kHz resonance. To better visualize this, images 3020, 3030 and 3040 of FIG. 30 show curves of constant SNR as a function of relative amplitude $\alpha$ and phase $\phi$. The SNR curves were determined by finding the values of $\alpha$ and $\phi$ that simultaneously satisfy the SimpleTand and SNR equations for a given value of SNR. The values in Table I below for different elements of measurement uncertainty were used in the four equations immediately above the SNR equation to obtain the overall uncertainty $\Delta_{tot}(\tan\delta)$. For this purpose it is assumed that the random phase error is dominated by thermal motion with $\Delta_r\phi=0.5°$. The overall uncertainty increases from the thermal-noise-limited case in image 3020 of FIG. 30 to a case with both random and systematic errors in image 3040 of FIG. 30. As the uncertainty increases, the accessible region of $(\alpha,\phi)$ space for a given SNR decreases significantly. The highest errors occur at the boundaries of the physically meaningful phase and amplitude values. Near the no-loss boundary, the uncertainty contributions are larger than the loss tangent value itself, as discussed above. For large loss tangents, note that the tangent function diverges at 90°. Thus small errors in phase or amplitude can lead to enormous errors in the estimated loss tangent.

TABLE I

Error parameters for FIG. 30. The values used in each image of FIG. 30 for the random (subscript r) and systematic (subscript s) errors in relative frequency $\Delta\Omega$ and phase $\Delta\phi$. Other error sources are held constant as follows: $\Delta\alpha_r = \Delta\alpha_s = 0$ and $\Delta Q_r = \Delta Q_s = 0$.

| Image Number | $\Delta_r\Omega$ | $\Delta_s\Omega$ | $\Delta_r\phi[°]$ | $\Delta_s\phi[°]$ |
|---|---|---|---|---|
| 3010 | 0 | 0 | 0 | 0 |
| 3020 and 3050 (3025) | 0 | 0 | 0.5 | 0 |

TABLE I-continued

Error parameters for FIG. 30. The values used in each image of FIG. 30 for the random (subscript r) and systematic (subscript s) errors in relative frequency $\Delta\Omega$ and phase $\Delta\phi$. Other error sources are held constant as follows:
$\Delta\alpha_r = \Delta\alpha_s = 0$ and $\Delta Q_r = \Delta Q_s = 0$.

| Image Number | $\Delta_r\Omega$ | $\Delta_s\Omega$ | $\Delta_r\phi[°]$ | $\Delta_s\phi[°]$ |
|---|---|---|---|---|
| 3030 and 3050 (3035) | $10^{-5}$ | $10^{-4}$ | 0.5 | 0 |
| 3040 and 3050 (3045) | $10^{-5}$ | $10^{-4}$ | 0.5 | 2 |

The graph 3050 in FIG. 30 also shows the SNR curves from the error conditions listed in Table 1 and illustrated in images 3020, 3030 and 3040 of FIG. 30 made at a setpoint of $\alpha=0.5$. As noted in Table 1, curve 3025 shows the minimum noise limited by fundamental thermal physics of the cantilever while curves 3035 and 3045 show the effects of increasing random and systematic noise. It is clear from curve 3025 that even in the most optimistic experimental case, thermal noise still limits loss tangent measurements on materials to $\tan\delta \lesssim 10^{-2}$.

We now turn to a further discussion of Frequency Modulation (FM) AFM. With FM AFM we measure the frequency shift as the tip interacts with the surface, and we can therefore quantify tip-sample interactions.

the frequency shift of a cantilever in FM mode is given by $$\Delta f_2 = f_{0,2}\frac{\langle F_{ts}z\rangle}{k_2 A_2^2} \quad (FreqShift)$$

In this equation $\Delta f_2$ is the shift of the second resonant mode as the tip interacts with the surface, $f_{0,2}$ is the second resonant frequency measured at a "free" or reference position, $k_2$ is the stiffness of the second mode and $A_2$ is the oscillation amplitude of the second mode as it interacts with the surface. $F_{ts}$ and z have previously been defined in connection with the presentation of the FullTand equation above. The FreqShift equation, as with the expression for the loss tangent, does not directly involve optical lever sensitivity.

In the limit that the oscillation amplitude of the second mode is much smaller than the oscillation amplitude of the first mode and is also much smaller than the length scale of $F_{ts}$, the tip-sample interaction force, we can relate the measured frequency shift $\Delta f_2$ to tip-sample stiffness:

$$\Delta f_2 \approx \frac{f_{0,2}}{2}\frac{k_{ts}}{k_2}. \quad (5)$$

This can be solved for the tip-sample stiffness as $$k_{ts} \approx \frac{2\Delta f_2}{f_{0,2}}.$$

Figure 23:
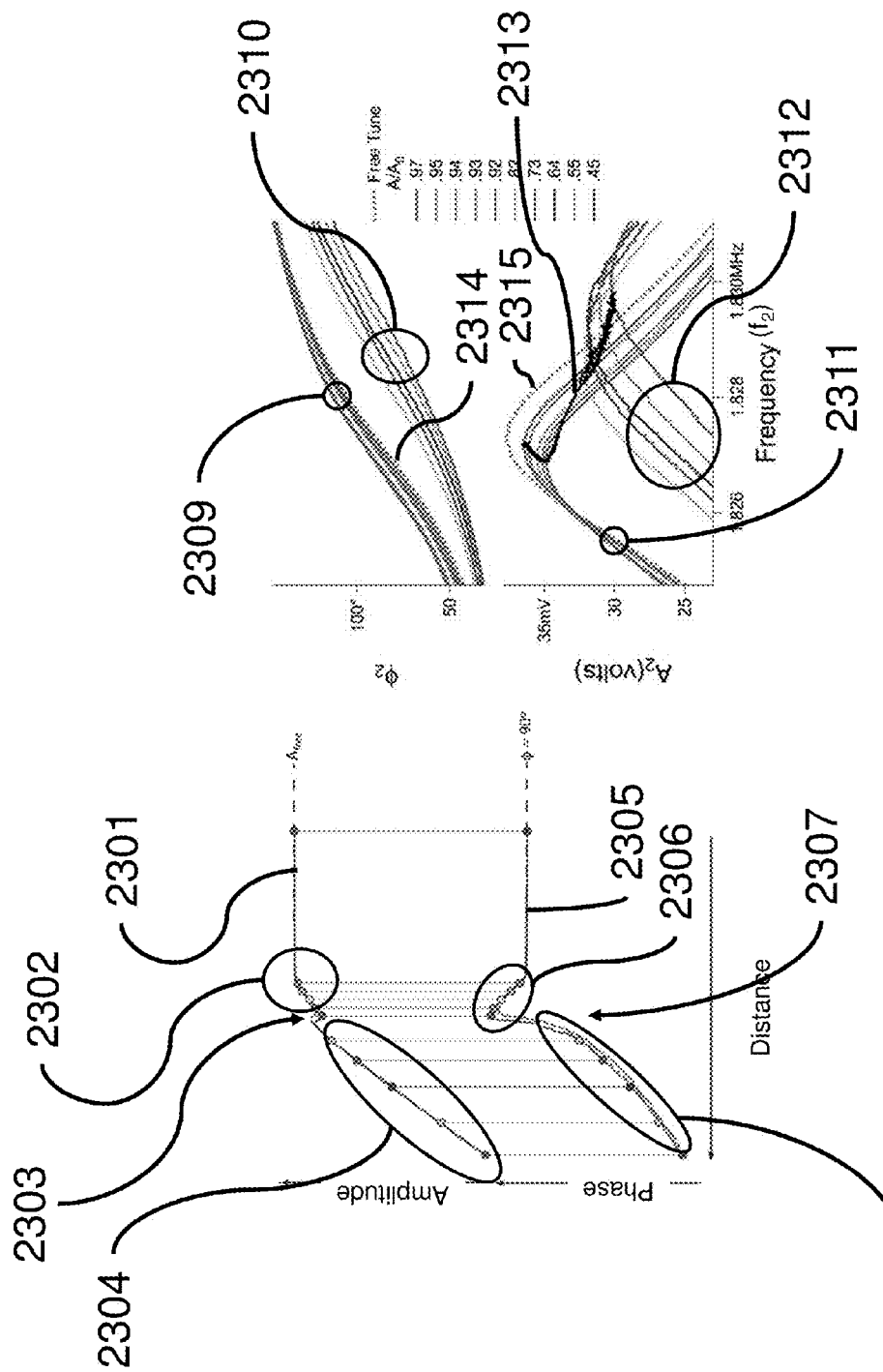
FIG. 23 Direct measurement of the second mode tip-sample interaction forces.

The second mode resonant behavior provides a direct measure of the tip-sample interaction forces as shown in FIG. 23. In the graph on the left side of FIG. 23 the amplitude 2301 of the first mode resonance measured on the y-axis is plotted versus tip-sample distance measured on the x-axis. As the cantilever approaches the surface, it first experiences net attractive forces at point 2302 which reduce the amplitude. Thereafter, there is a switch at point 2303 from net attractive to net repulsive interactions which results in a discontinuity in the amplitude curve. This effect is well-known in the literature. Beyond point 2303, the interaction is dominated by repulsive forces and the curve 2304 is somewhat different.

In a second graph on the left side of FIG. 23 the phase 2305 of the first mode resonance, which is measured simultaneously with the amplitude of the first mode resonance versus tip-sample distance curve, gives additional information. During the same interval when the amplitude versus tip-sample distance curve experiences net attractive forces which reduce its amplitude, the phase curve also experiences forces which ultimately reduce its amplitude 2306. Similarly when the amplitude versus tip-sample distance curve experiences a switch from net attractive to net repulsive interactions resulting in a discontinuity in the amplitude curve the phase curve experiences a similar discontinuity 2307. Beyond point 2307, the interaction is dominated by repulsive forces and the curve 2308 is somewhat different, just as with the amplitude curve. Note that both transitions 2303 with the amplitude versus tip-sample distance curve and 2307 with the phase curve have some hysteresis between the approach and retract portions of the curves.

In the graph on the right side of FIG. 23 the families of the amplitude curves 2311 and 2312 of the second mode resonance measured on the y-axis are plotted versus the drive frequency of the cantilever measured on the x-axis. In a second graph of FIG. 23 located above the families of amplitude graph, the families of phase curves 2309 and 2310 of the second mode resonance measured on the y-axis versus the drive frequency of the cantilever measured on the x-axis. Both the amplitude and phase families of second mode resonance were measured while the first mode was held essentially constant by adjusting the z-height of the cantilever while the second mode frequency was ramped using the 1090 drive of the apparatus for probing flexural resonances depicted in FIG. 20. Alternatively the second mode frequency tunes could be made by chirping, band-exciting, intermodulating or exciting in some other manner that explores the frequency content of the interaction. At the same time, amplitude 2315 and phase 2314 tunes far from the surface can be taken as shown in the graph on the right side of FIG. 23. During the attractive portion of the interaction, the phase curve 2309 will move to the left, indicating that the resonance has shifted to a lower frequency, as expected from an attractive interaction. During the repulsive portion of the interaction, the phase curve 2310 will move to the right, a shift to a higher frequency as expected from a stiffer interaction. The amplitude curves show corresponding behavior, with the peak of curve 2311 shifting to the left toward lower frequencies) during the attractive portion of the interaction and the peak of curve 2312 shifting to the right toward higher frequencies during the repulsive portion of the interaction. In addition, the peak values of the amplitude curves 2311 and 2312 decrease, indicating an overall increase in tip-sample damping or dissipation.

An alternative method for extracting the second mode resonance measurements just presented is to use the phase locked loop (PLL) 1160 of the apparatus for probing flexural resonances depicted in FIG. 20. Using this alternative the amplitude and phase families of second mode resonance would be measured while holding the first mode essentially constant by adjusting the z-height of the cantilever while the second mode frequency was ramped using the 1090 drive. The frequency of the second mode can be directly measured by engaging a phase locked loop (PLL) 1160 and repeating the amplitude versus distance experiment, while simultaneously recording the second mode resonant frequency output of the PLL. The result of the output from $f_2$ 2010 and $A_2$ 2013 of the FIG. 20 apparatus is the curve 2313 located between the families of amplitude curves 2311 and 2312 of the second mode resonance and the families of phase curves 2309 and 2310 of the second mode resonance. This result implies that the FIG. 20 apparatus with its PLL can be used, at least in this case, as a rapid means of interrogating the cantilever as to its second mode response. Note that other methods for extracting the second mode resonance measurements could also be used, including the DART method discussed above, the Band Excitation method developed at the Oak Ridge National Laboratory, chirping, intermodulation and other techniques that provide information about frequency response.

One situation where it is advantageous to omit the use of the PLL is when the cantilever actuation mechanism includes a frequency-dependent amplitude and phase transfer function. This prerequisite may exist with a large variety of cantilever actuation means including acoustic, ultrasonic, magnetic, electric, photothermal, photo-pressure and other means known in the art. Operation in this mode is essentially bimodal, and is variously called DualAC mode, or AM/AM. The principal inventions describing this mode are U.S. Pat. No. 7,921,466, Method of Using an Atomic Force Microscope and Microscope; and U.S. Pat. No. 7,603,891, Multiple Frequency Atomic Force Microscope.

As noted above the phase shift which occurs when the amplitude and phase of the second mode resonance were measured while the first mode was held essentially constant by adjusting the z-height of the cantilever while the second mode frequency was ramped is accompanied by a stiffer interaction during the repulsive portion of the interaction. We can exploit this relationship between the phase shift and stiffness of the sample starting with the relationship between the frequency and phase shifts for a simple harmonic oscillator:

$$\frac{\partial \phi}{\partial \Omega} = \frac{(\Omega^2 + 1)Q}{(\Omega^2 - 1)^2 Q^2 + \Omega^2},$$

where $\Omega \equiv f_{drive}/f_0$ is the ratio of the drive frequency to the resonant frequency. Using the SimpleTand equation, this relationship can be manipulated to give the tip-sample interaction stiffness in terms of the phase shift measured at a fixed drive frequency:

$$k_{ts} = \approx \frac{1}{\Omega} \frac{\Delta \phi}{Q} k_2.$$

It will be noted that this expression is only valid for small frequency shifts.

Figure 26:
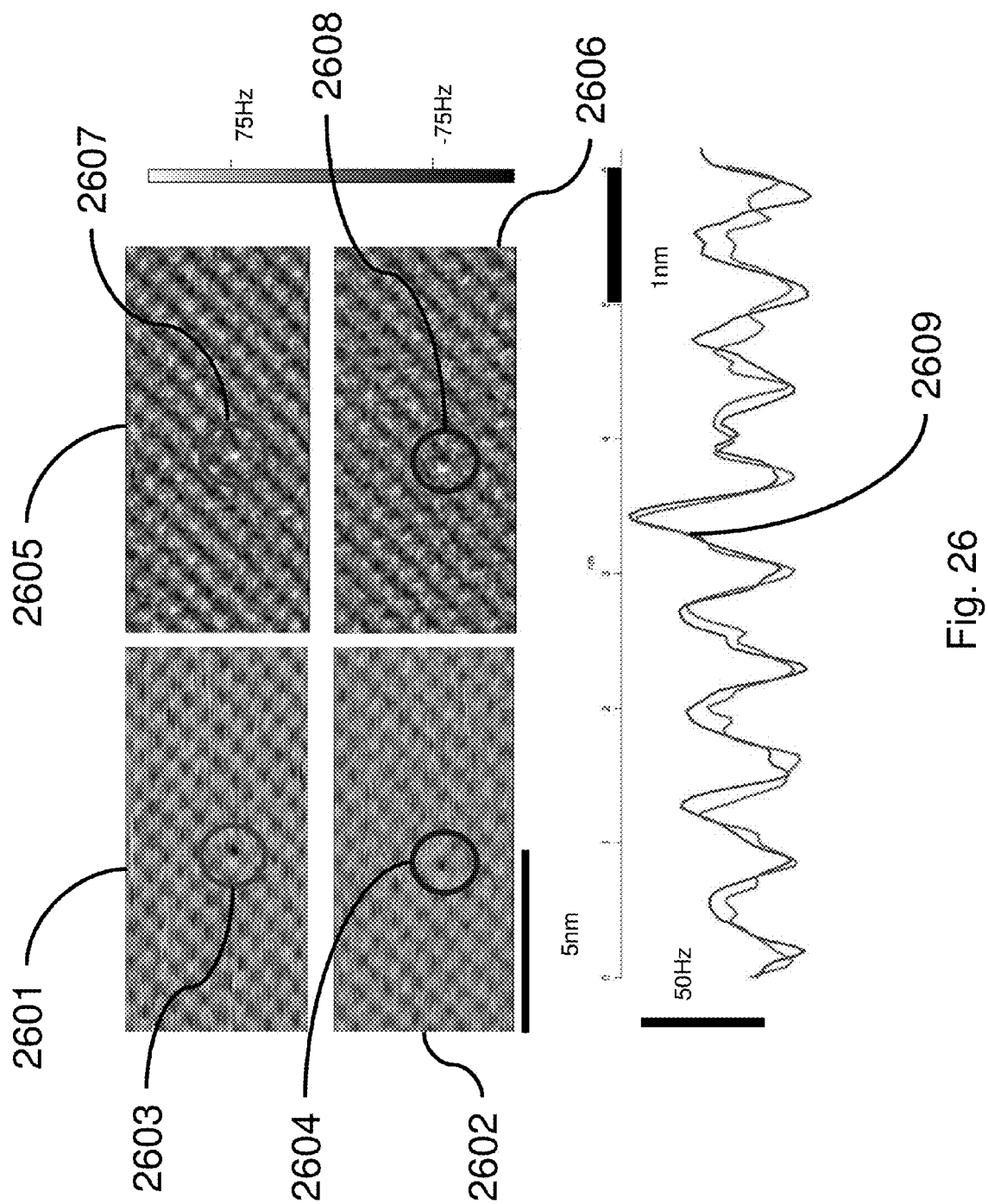
FIG. 26 Simplified measurement of the phase of the second mode for small frequency shifts.

The expression of tip-sample interaction stiffness in terms of the phase shift can be extremely sensitive, down to the level of repeating images of single atomic defects. In FIG. 26, two repeating images 2601 and 2602 of the surface of calcite in fluid are shown at the left, each with the same defect, 2603 and 2604, respectively, visible. The corresponding stiffness images, 2605 and 2606, are shown on the right, each with the single atomic stiffness defect, 2607 and 2608, respectively, visible in image. The graph under the images shows line sections 2609 taken across the images with the sub-nanometer peak in the stiffness images associated with the defect clearly visible. This very high resolution mechanical property measurement in fluid represents a very significant advance in materials properties measurements using AFM.

Since loss tangent is measurable using the first resonant mode of the cantilever and the frequency shift just described is measured using the second resonant mode, both measurements can be made simultaneously. We have found however that there are some practical experimental conditions to consider when applying this bimodal technique to nanomechanical material property measurements. To begin with, the cantilever tip is sensitive to the G' and G" factors of the FullTand equation only in repulsive mode. This means that the following conditions favoring repulsive mode should be present:

1. larger cantilever amplitudes (>1 nm),
2. stiffer cantilevers (>1 N/m),
3. sharp cantilever tips, and
4. lower setpoints.

Furthermore, in net-repulsive mode, the phase of the first mode should always be <90° and typically <50° for most materials; good feedback tracking (that is, for example, avoiding parachuting and making sure trace and retrace match) is important to assure good sampling of mechanical properties; and careful tuning of the cantilever resonances is particularly important to assure the accuracy of both techniques. Relative to this last point, the error for the resonances should be <10 Hz and the phase should be within 0.5 degrees. These are more stringent conditions than usual for AM mode but are well within the capabilities of commercial AFMs, given proper operation.

Figure 25:
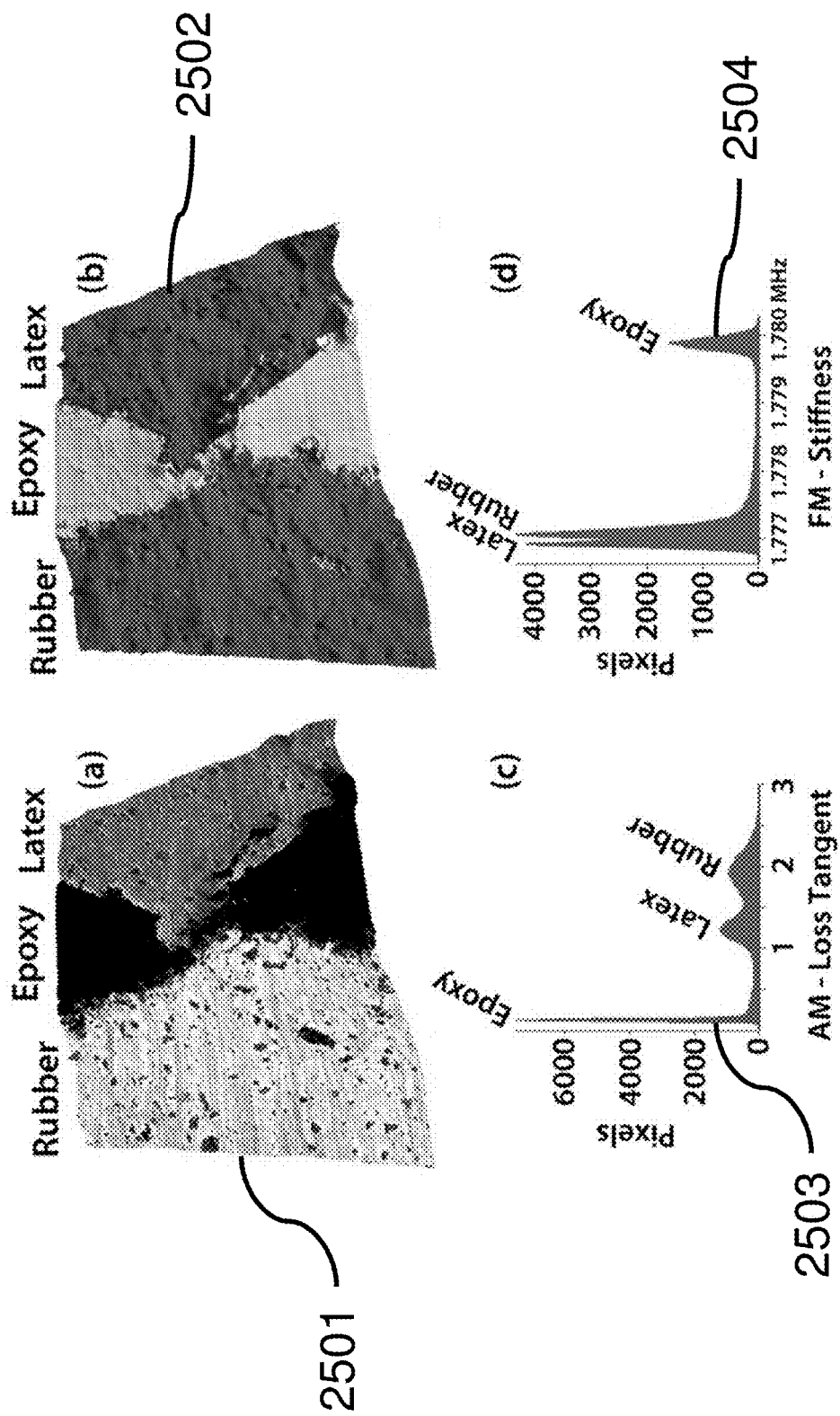
FIG. 25 Simultaneous mapping of loss tangent and stiffness of an elastomer-epoxy sandwich.

FIG. 25 shows an example of a simultaneous loss tangent measurement of an elastomer-epoxy sandwich in Panel 2501 and a stiffness measurement of this sandwich in Panel 2502. The sandwich was assembled by bonding a natural rubber sheet to a latex rubber sheet with an epoxy. The sandwich was then micro-cryotomed and imaged. From macroscopic measurements, the elasticities were estimated to be ~40 MPa for the natural rubber component; 4 GPa for the epoxy; and 43 MPa for the latex rubber, all as measured with a Shore durometer. Again with macroscopic measurements, loss tangents were estimated to be 1.5, 0.1:2 and 2, respectively, measured with a simple drop test.

The measurements shown in FIG. 25 were made with an Olympus AC160 cantilever with a fundamental resonance of 310 kHz and a second mode resonance of 1.75 MHz. The histograms of the loss tangent measurement in Panel 2503 and the stiffness measurement in Panel 2504 show clear separations of the three components. It should be noted that the surface roughness of the sandwich was on the order of 500 nm and despite this the materials are clearly differentiated.

The stiffness measurement made with the second resonant mode depends on interaction stiffness $k_{ts}$. The modulus of the sample(s) in question can be mapped by applying a mechanical model. One of the simplest models is a Hertz indenter in the shape of a punch. In this case, the elasticity of the sample is related to the tip-sample stiffness by the relation $k_{ts}=2\alpha E'$, where $\alpha$ is a constant contact area. Combining this with the SimpleTand equation above results in the expression $$E' = \frac{\Delta f_2 k_2}{\alpha f_{0,2}}.$$

Thus if the contact radius and spring constant are known, the sample modulus can be calculated.

Other tip shapes could be used in the model. Calibration of the tip shape is a well-known problem. However, it is possible to use a calibration sample that circumvents this process. As a first step, we have used a NIST-traceable ultra high molecular weight high density polyethelene (UHM-WPE) sample to first calibrate the response of the Olympus AC160 cantilever.

The equation immediately above can then be rewritten as $E'=C_2\Delta f_2$, where $C_2$ is a constant, measured over the UHM-WPE reference that relates the frequency shift to the elastic modulus. The result can be applied to unknown samples.

The foregoing bimodal technique providing for measuring stiffness with the second resonant mode can be performed at high speeds with the use of small cantilevers. The response bandwidth of the $i_{th}$ resonant mode of a cantilever is $BW_i = \pi f_{i,0}/Q_i$ where $f_{i,0}$ is the resonant frequency of the $i_{th}$ mode and $Q_i$ is the quality factor. The resonant frequency can be increased without changing the spring constant by making smaller cantilevers. In contrast to normal AM imaging, however, the second resonant mode must still be accessible to the photodetector—which requires $f_{2,0}<10$ MHz for an AFM like the Asylum Research Cypher AFM.

Figure 24:
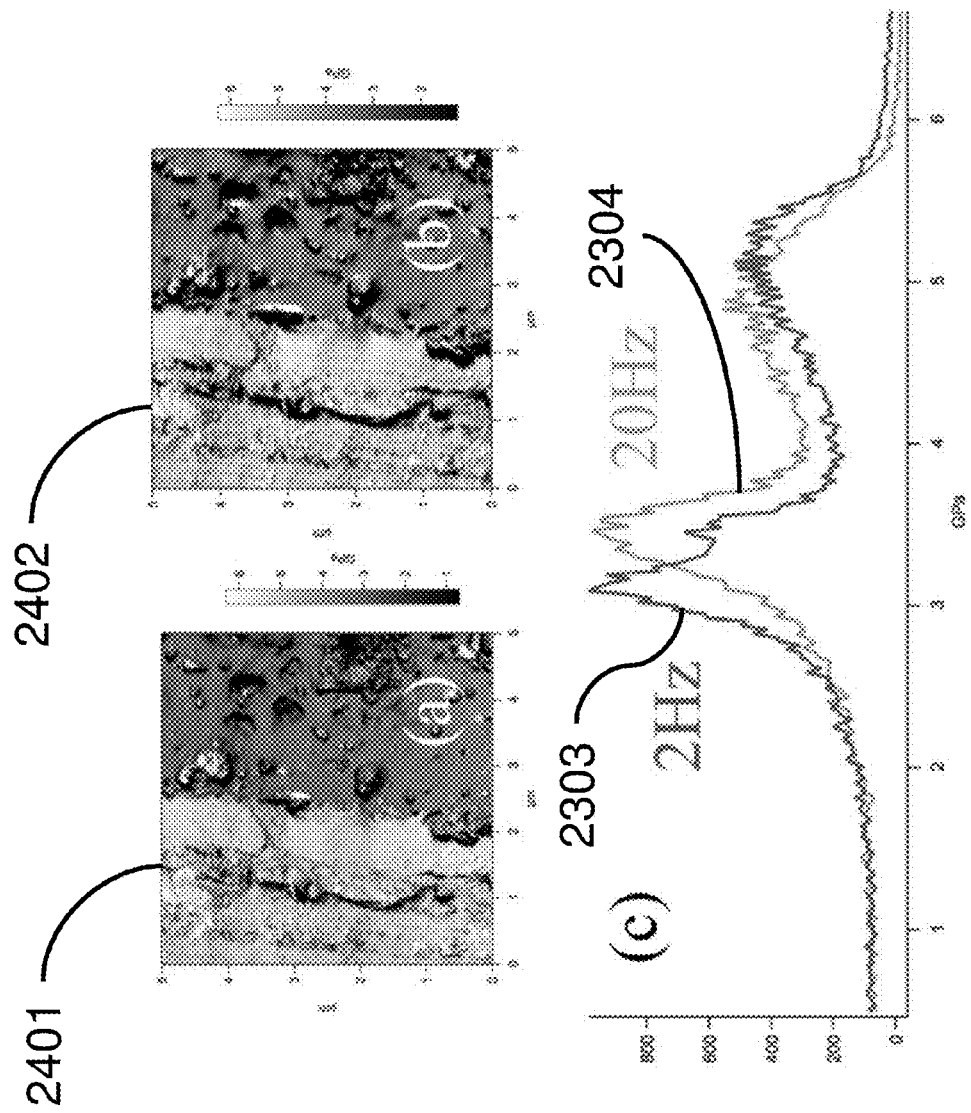
FIG. 24 EPDH/Epoxy cryo-microtomed boundary measured at 2 Hz and 20 Hz line scan rates.

FIG. 24 shows the effect of using smaller cantilevers. Panel 2401 and Panel 2402 show measurements at a 2 Hz line scan rate and a 20 Hz line scan rate, respectively, of a EPDH/Epoxy cryo-microtomed boundary. These measurements (5 μm on a side) were acquired with an AC55 cantilever from Olympus ($f_{1,0} \approx 1.3$ MHz, $f_{120} \approx 5.3$ MHz). Panel c of FIG. 24 shows histograms of the Panel 2401 2 Hz measurement (histogram 2403) and the Panel 2402 20 Hz measurement (histogram 2404). The very small deviation between the peak elasticity measurements indicates that the high speed image acquisition did not significantly affect the results.

In general, one can choose any higher resonant mode for measuring stiffness, but the following considerations should be kept in mind:

1. Avoid modes that are at or very close to integer multiples of the first resonance. Integer multiples result in harmonic mixing between the modes which can cause instabilities. For example, it is quite common that the second resonance of an Olympic AC240 is ~6× the first. For that reason, it is desirable to use the third resonant mode instead, which typically has a resonance of ~15.5× the first mode. This point should be kept in mind even when the cantilever is not being driven at the second resonant mode. If a higher mode is too close to an integer multiple of the drive frequency, unwanted harmonic coupling can take place that leads to spurious, noisy or difficult to interpret results.

Figure 27:
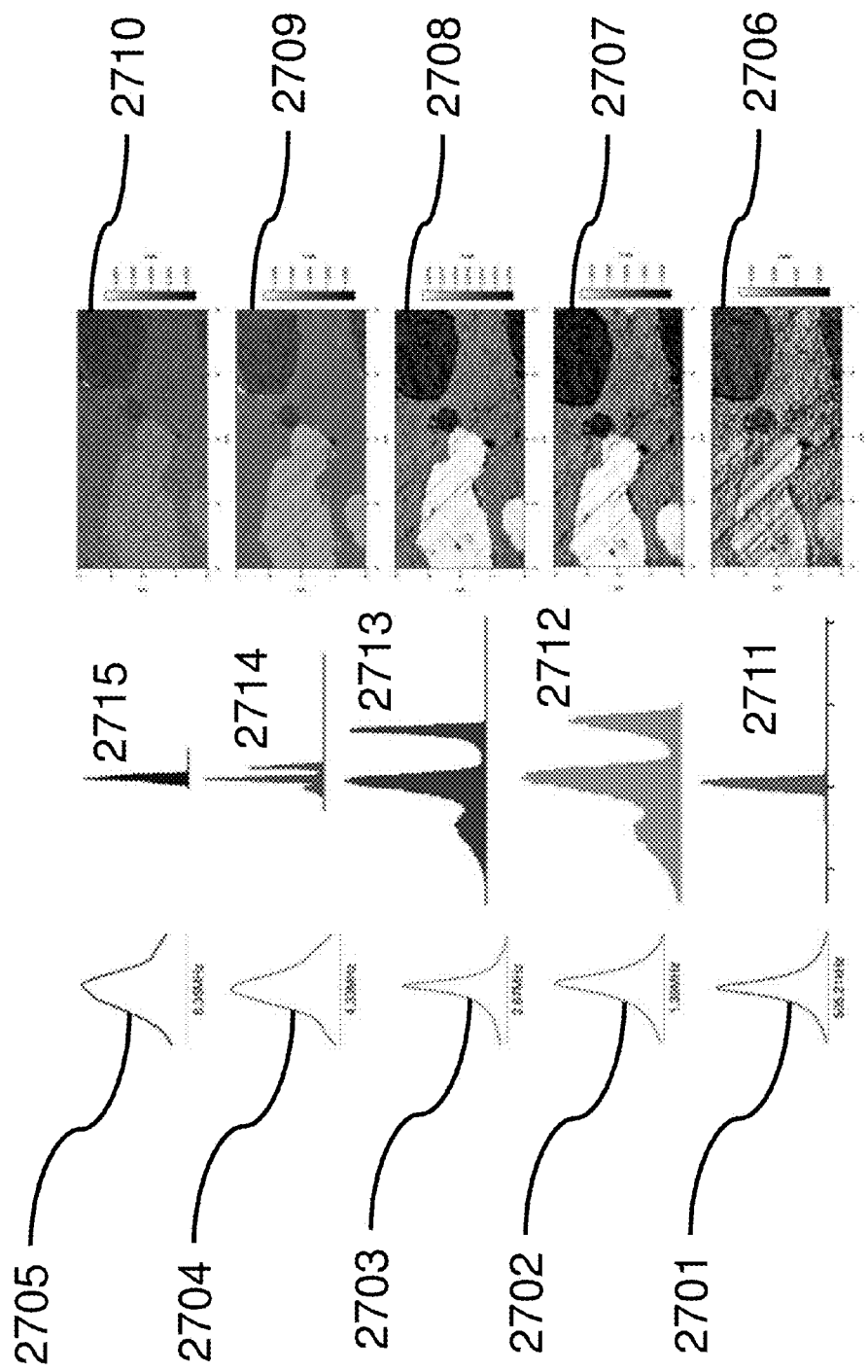
FIG. 27 Effects of choosing resonant modes that are softer, matched or stiffer than the tip-sample stiffness.

2. The sensitivity is optimized when the stiffness of the mode is tuned to the tip-sample stiffness. FIG. 27 shows the effects of choosing the resonant mode that was softer, matched or stiffer than the tip-sample stiffness. An Olympus AC200 cantilever was used to make each of the measurements shown in FIG. 27. The fundamental resonance of this cantilever (unlike the other resonant modes, not shown) was at ~1.15 kHz. The second resonance 2701 was at ~500 kHz, the third 2702 was at ~1.4 MHz, the fourth 2703 at ~2.7 MHz, the fifth 2704 at ~4.3 MHz and the sixth 2705 was at ~6.4 MHz. The elasticity images are shown in Panels 2706, 2707, 2708, 2709 and 2710 in ascending order by resonance. Note that the contrast in the second mode (soft) Panel 2706 is relatively low, as is the contrast in the 5th and 6th modes (stiff) Panels 2709 and 2710. This is explicitly visible in the Elasticity histograms shown in Panels 2711, 2712, 2713, 2714 and 2715, again arranged in ascending order by resonance.

In order to optimize the mechanical stiffness, contrast and accuracy of the tip-sample it appears to be advantageous to tune the amplitude of the second mode so that it is large enough to be above the detection noise floor of the AFM, but small enough not to affect significantly the trajectory and behavior of the fundamental mode motion as discussed above in reference to FIG. 4. For this purpose, it is useful to plot the higher mode amplitude or phase or frequency, or all of them, as a function of the second mode drive amplitude. This can be done for example, while the first mode is used in a feedback loop controlling the tip-sample separation or in a pre-determined tip-sample position. As shown in FIG. 4, careful observation of first mode amplitude, 4010 and 4050, and phase, 4020 and 4060, together with the higher mode amplitude 4030 and phase 4040 as a function of the higher mode drive amplitude 1090 (from FIG. 20), the user can chose a drive amplitude that optimizes the signal to noise while minimizing the effect of nonlinearities on the measured signals.

Figure 28:
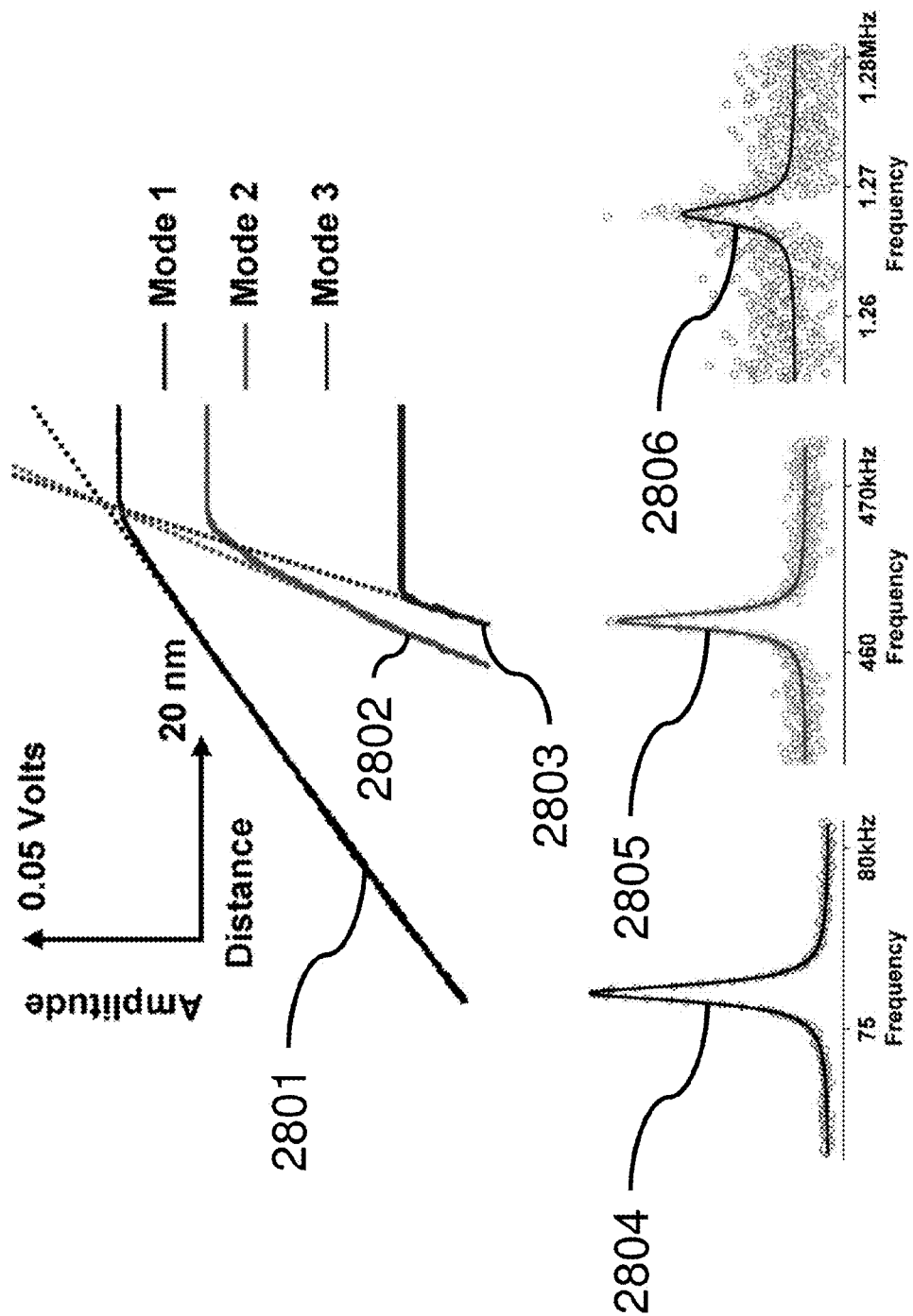
FIG. 28 Extension of thermal noise measurement method to higher modes.

It is also desirable to quantify the measurement of higher mode stiffness. In general, this is a challenging measurement. One method is to extend the thermal noise measurement method to higher modes. The thermal measurement depends on accurately measuring the optical lever sensitivity. This can be done by driving each resonant mode separately and then measuring the slope of the amplitude-distance curve as the cantilever approaches a hard surface. This calibrated optical sensitivity can then be used in a thermal fit as is well known in the art to get the spring constant for that particular resonant mode. Typical fits for the fundamental 2801, second resonant mode 2802 and third resonant mode 2803 are shown in FIG. 28. The optical lever sensitivities yielded by these fits were then used to fit the thermal noise spectra to extract the spring constants for the first 2804, second 2805 and third 2806 modes of the Olympus AC240 cantilever.

To obtain the interaction force between the tip and the sample, the FreqShift equation above has to be inverted. Initially, this would be done where the cantilever amplitude was either much smaller or much larger than the length scale of the tip-sample interaction. These limits can lead to practical errors in experimental data since the length scale of the tip-sample interaction forces is not necessarily known a priori. However, a very accurate inversion method has been developed by Sader and Jarvis which uses fractional calculus. Recently, Garcia and Heruzo have extended this method to bimodal frequency shifts. In particular, their method connects the frequency shift of the first and second resonant modes to a force model.

$$\Delta f_1 = \frac{f_1}{2k_1\sqrt{2\pi A_1}} D^{1/2} F(d_{min}) \qquad 2(a)$$

$$\Delta f_2 = -\frac{f_2}{2k_2\sqrt{2\pi A_1}} I^{1/2} F(d_{min}) \qquad 2(b)$$

In these equations $D^{1/2}$ and $I^{1/2}$ represent the half-derivative and half-integral operators respectively. $F(d_{min})$ is the tip-interaction force as a function of the position of closest $d_{min}$ for the tip to the sample. These expressions are valid in the limit that the higher mode amplitude is much smaller than the first and also larger than the characteristic length scale of the tip-sample force.

These equations involve frequency shifts in the resonant modes of the cantilever. As such, they are directly applicable to the FM-FM imaging described by Garcia and Herruzo. For other bimodal approaches discussed above (specifically AM/AM and AM/FM) another step is required since a frequency shift observable has been replaced by a phase observable. Earlier we presented a linear approximation. Now we develop an exact conversion between the phase observable and the frequency shift observable of a simple harmonic oscillator (SHO).

For a SHO, the phase and frequency are related by $\tan \phi = f_0 f_i / Q_{tot}(f_0^2 - f_i^2)$. In this expression, we have designated the quality factor as $Q_{tot}$ since it includes both the intrinsic damping of the cantilever and tip-sample dissipation. This expression can be inverted to yield frequency as a function of phase $$\frac{\Delta f}{f_0} = \frac{\pm 1 + \sqrt{1 + 4Q^2 \tan^2 \phi_i}}{2Q_i \tan \phi_i} - 1 = \pm \frac{1}{2Q_i \tan \phi_i} + \text{Order}\left(\frac{1}{(Q_i \tan \phi_i)^2}\right).$$

(FreqCalc)

For many samples, tip-sample dissipation is quite small, so that it can be neglected and the phase shift attributed only to conservative tip-sample interactions. In this situation, the Q factor for the above expression can be estimated from the free-air expression, $Q_{tot} \approx Q_{c,i}$, where $Q_{c,i}$ is the quality factor of the $i_{th}$ mode of the cantilever, measured at a reference position close to the sample. It can be shown that this expression is valid when the loss tangent of the tip-sample interaction is small, of the order of the cantilever phase noise, $\tan \delta_i \leq 10^{-2}$. For larger tip-sample losses, the tip-sample dissipation must be included in the calculation. This reduces the quality factor by $$Q_{tot,i} = Q_{c,i}/(Q_{c,i} \tan \delta + 1). \quad \text{(QCalc1)}$$

Using the loss tangent from above, if the cantilever is being driven at its free resonance frequency the tapping mode amplitude and phase observable yields:

$$Q_{tot,i} = \frac{Q_{c,i} \cos \phi_i}{\cos \phi_i + Q_{c,i}(A_i / A_{free,i} - \sin \phi_i)}. \quad \text{(QCalc2)}$$

As noted, this expression is valid when operating at a free resonance frequency, but is trivially generalizable to the off-resonance case. Using this formalism, it is possible to estimate the equivalent frequency shift from phase and amplitude measurements. We demonstrate this conversion for the second resonant mode of a cantilever interacting with a two-component polymer film in FIG. 31.

Figure 31:
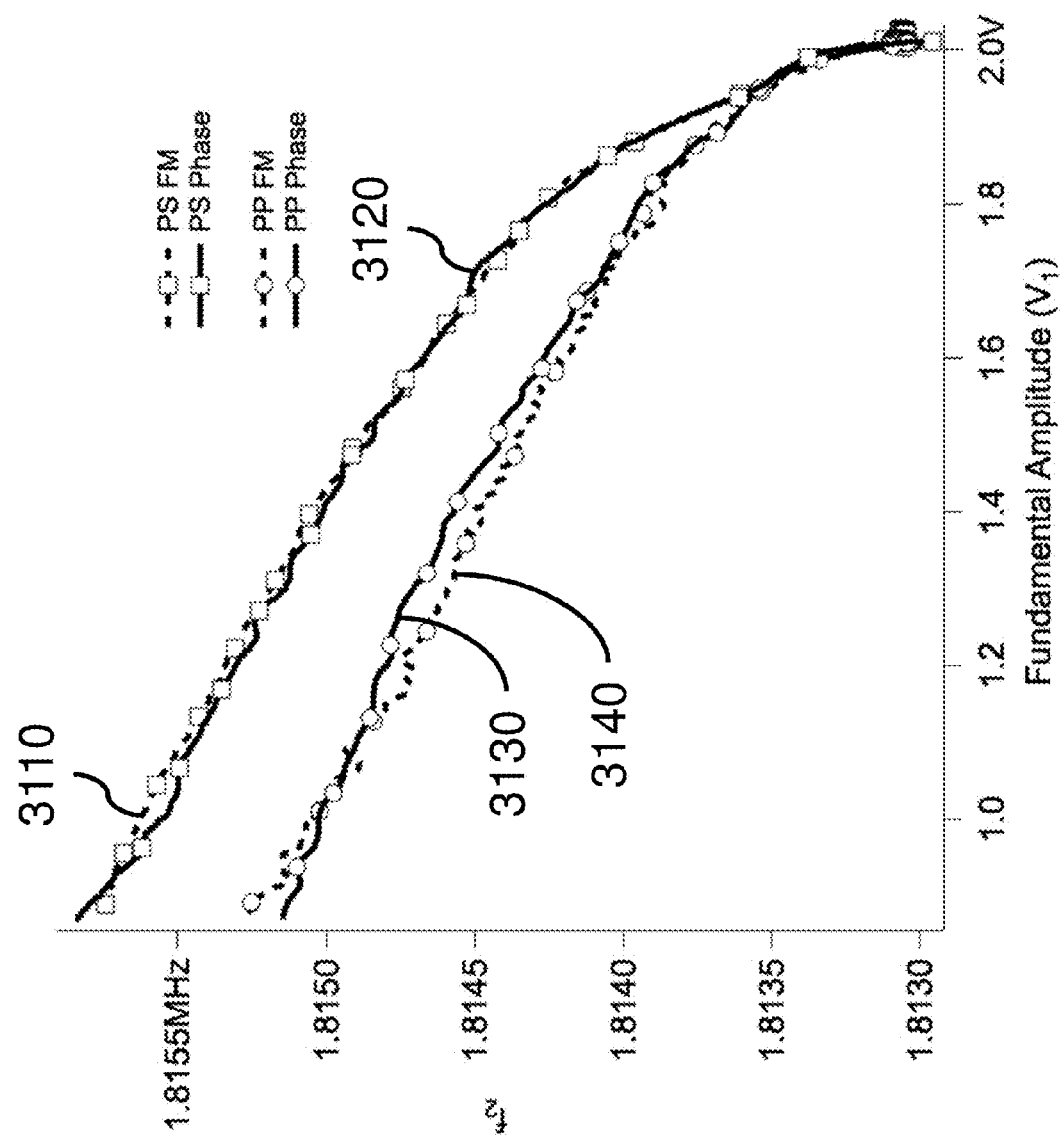
FIG. 31 Comparison of phase-locked loop frequency shift and effective frequency shifts calculated from phase and amplitude observables.

In FIG. 31 second mode observables were measured as a function of the first mode amplitude over a polymer sample composed of polystyrene 3110 and 3120 and polypropylene 3130 and 3140. One curve of each polymer 3110 and 3140 was made with the phase locked loop engaged. These curves represent a direct measurement of the second mode frequency shift. The method described above is verified by comparing the frequency shifts calculated from the measured second mode phase shifts combined with equations FreqCalc and QCalc1 or QCalc2. Curve 3130 shows the directly measured frequency shift while curve 3140 shows the calculated frequency shift in each case over the lower modulus polypropylene. Similarly, curve 3110 shows the directly measured frequency shift while curve 3120 shows the calculated frequency shift over the higher modulus polystyrene. As these curves make clear, the calculated values agree very well with the directly measured frequency shifts, verifying and justifying this approach to estimating equivalent frequency shifts from phase data.

Figure 32:
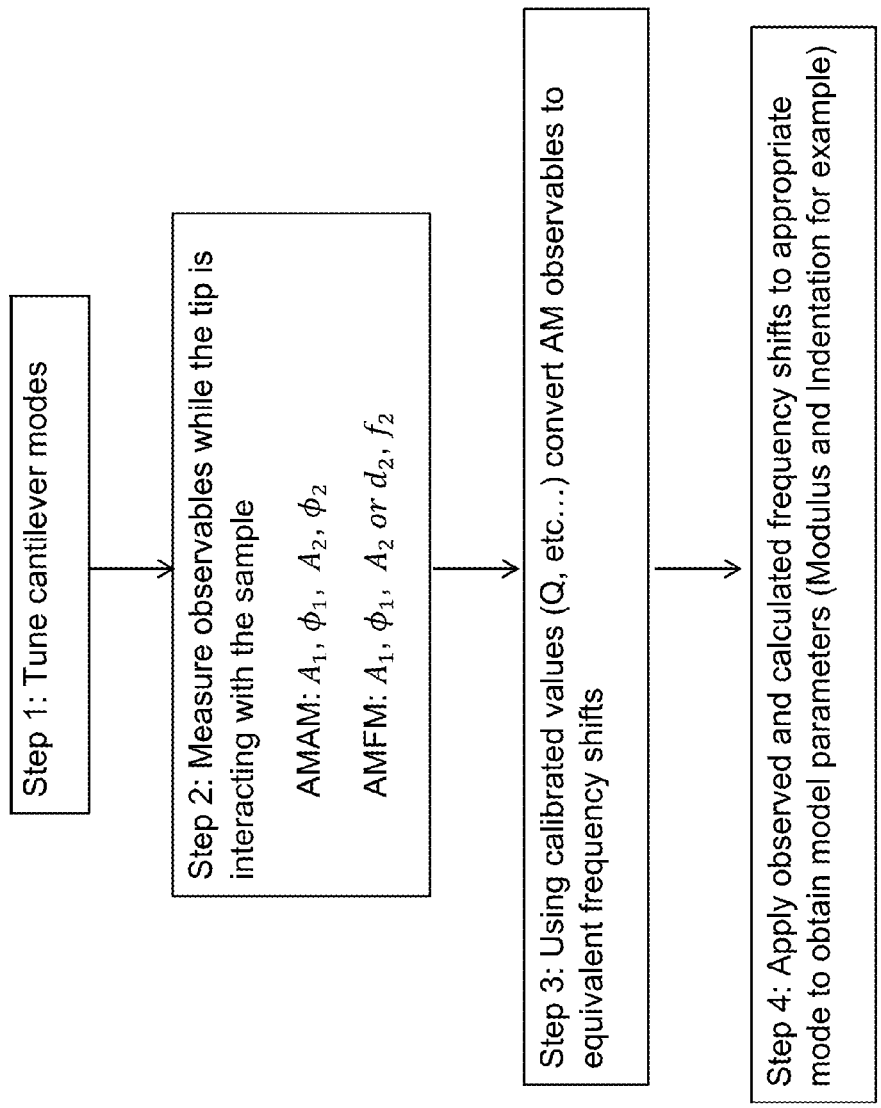
FIG. 32 A general method for calculating mechanical properties in tapping mode AFM measurements FIG. 33 Comparison of numerical (expected) and estimated modulus and indentation measurements using the preferred method described here versus the amplitude ratio.

FIG. 32 summarizes a general approach to obtaining quantitative mechanical properties in AM (or tapping) mode. For illustration, we use the example of an elastic Hertzian contact model with two unknown parameters: the effective modulus and the indentation depth. The process is quite similar for other models including those with dissipative contributions as will be apparent to one skilled in the art.

There are many contact mechanics models that may be used for interpreting tip-sample interactions between a nanoscale indenter tip and a sample. Equations 2(a) and 2(b) provide a framework for applying these models to any tip-sample interaction that is fractionally differentiable.

An example of a power-law force between the tip-sample indentation and the applied force was postulated by Oliver and Pharr. Values of m=1, 3/2 and 2 are associated with the Hertzian Punch, Sphere and Cone (Sneddon) models respectively. In addition, the $\alpha_m$ prefactor is replaced by the appropriate values in the expressions below:

$$F_{ts}(\delta) = E_m^{eff} \alpha_m \delta^m, \quad (3)$$

$$F_{punch}(\delta) = 2E_{punch}^{eff} R \delta, \quad (4a)$$

$$F_{sphere}(\delta) = \frac{4}{3} E_{sphere}^{eff} \sqrt{R} \delta^{\frac{3}{2}}, \quad (4b)$$

$$F_{cone}(\delta) = \frac{2}{\pi} \frac{E_{cone}^{eff}}{\tan \theta} \delta^2 \quad (4c)$$

Expression 3 just above can be applied to the fractional derivatives and integrals expressions 2(a) and (2b) above. Evaluation of the result gives the following model-dependent expressions for the indentation depth:

$$\delta_m = \frac{A_1}{2} \frac{k_1}{k_2} \frac{f_2}{\Delta f_2} \frac{\Delta f_1}{f_1} \frac{G_3}{G_1} \quad 4(a)$$

$$\delta_{cone} = \frac{3A_1}{4} \frac{k_1}{k_2} \frac{f_2}{\Delta f_2} \frac{\Delta f_1}{f_1}, \quad 4(b)$$

$$\delta_{sphere} = A_1 \frac{k_1}{k_2} \frac{f_2}{\Delta f_2} \frac{\Delta f_1}{f_1}, \quad 4(c)$$

$$\delta_{punch} = \frac{3A_1}{4} \frac{k_1}{k_2} \frac{f_2}{\Delta f_2} \frac{\Delta f_1}{f_1}, \quad 4(d)$$

Here, the constants $G_1$ and $G_3$ from equation 4(a) are defined as $$G_1 = \frac{\Gamma(m+1)}{\Gamma\left(m+\frac{1}{2}\right)} \text{ and } G_3 = \frac{\Gamma(m+1)}{\Gamma\left(m+\frac{3}{2}\right)}.$$

Similarly, the effective sample modulus is given by:

$$E_m^{eff} = \frac{\pi f_1^{m-1/2} k_2^{m+1/2}}{\alpha_m A_1^{m-1} f_2^{m+1/2} k_1^{m-1/2}} \frac{\Delta f_2^{m+1/2}}{\Delta f_1^{m-1/2}} \frac{G_3^{m-1/2}}{G_1^{m+1/2}}$$

$$E_{cone}^{eff} = \frac{3\pi\sqrt{2}\tan\theta f_1^{3/2} k_2^{5/2}}{5\sqrt{5} f_2^{5/2} k_1^3} \frac{\Delta f_2^{5/2}}{\Delta f_1^{3/2}}, \quad (5a)$$

$$E_{sphere}^{eff} = \frac{\sqrt{8} f_1 k_2^2}{\sqrt{RA_1} f_2^2 k_1} \frac{\Delta f_2^2}{\Delta f_1}, \quad (5b)$$

$$E_{punch}^{eff} = \frac{\pi\sqrt{2} f_1^{1/2} k_2^{3/2}}{R\sqrt{3} f_2^{3/2} k_1^{1/2}} \frac{\Delta f_2^{3/2}}{\Delta f_1^{1/2}} \quad (5c)$$

Note that Equations 4(b) and 5(b) for the sphere model are identical to the expressions appearing in the Garcia and Tomas-Herruzo reference.

The equations above involve frequency shifts in the resonant modes of the cantilever. In bimodal and AM/FM measurements, the phase measurement of both or the first modes are measured (rather than controlled by a phase locked loop) while the drive frequency is kept constant.

One desirable quality of modulus measurements made in tapping mode is that the measured modulus be independent of the $A_1$ setpoint value.

Figure 33:
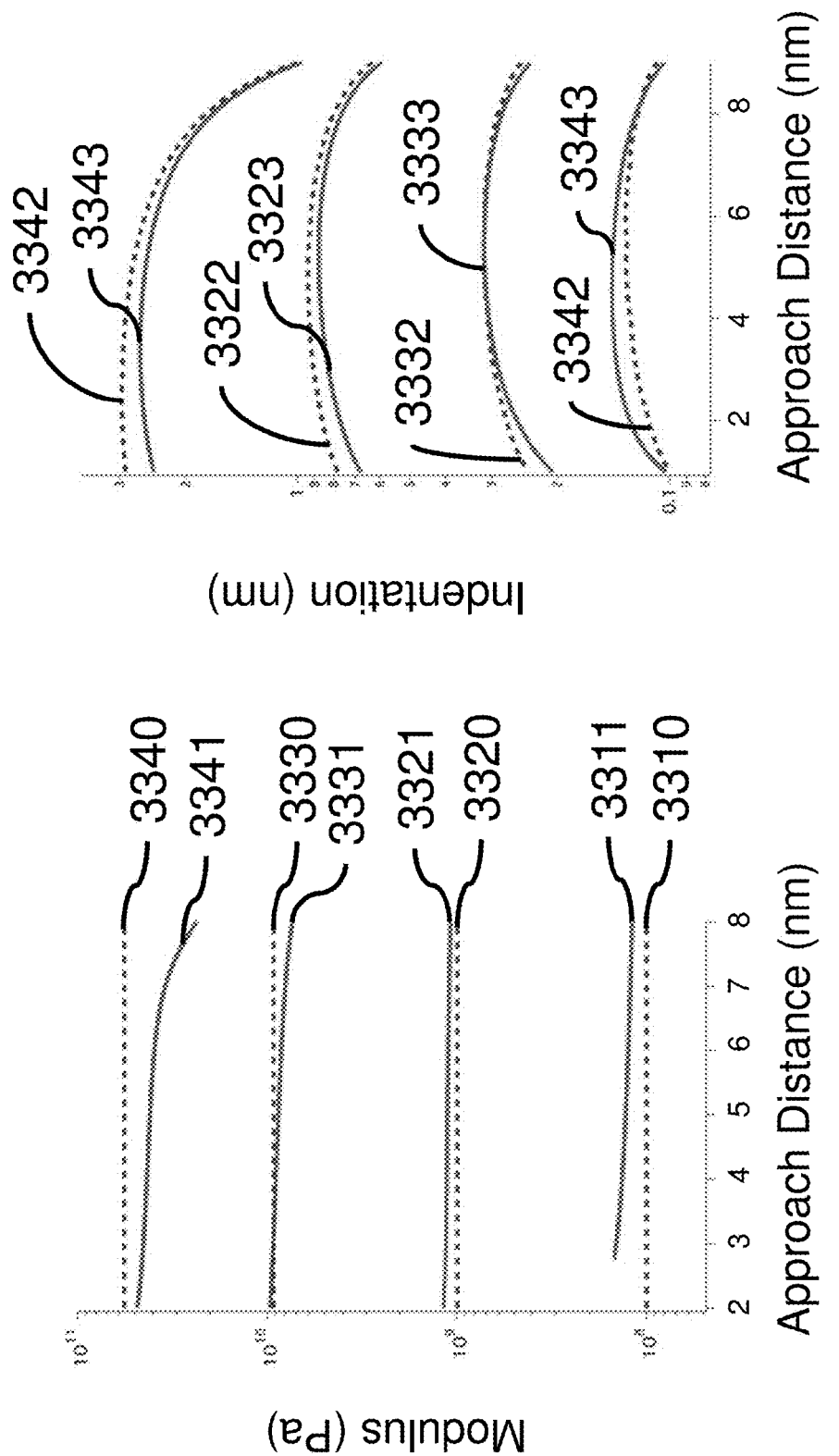
Figure 34:
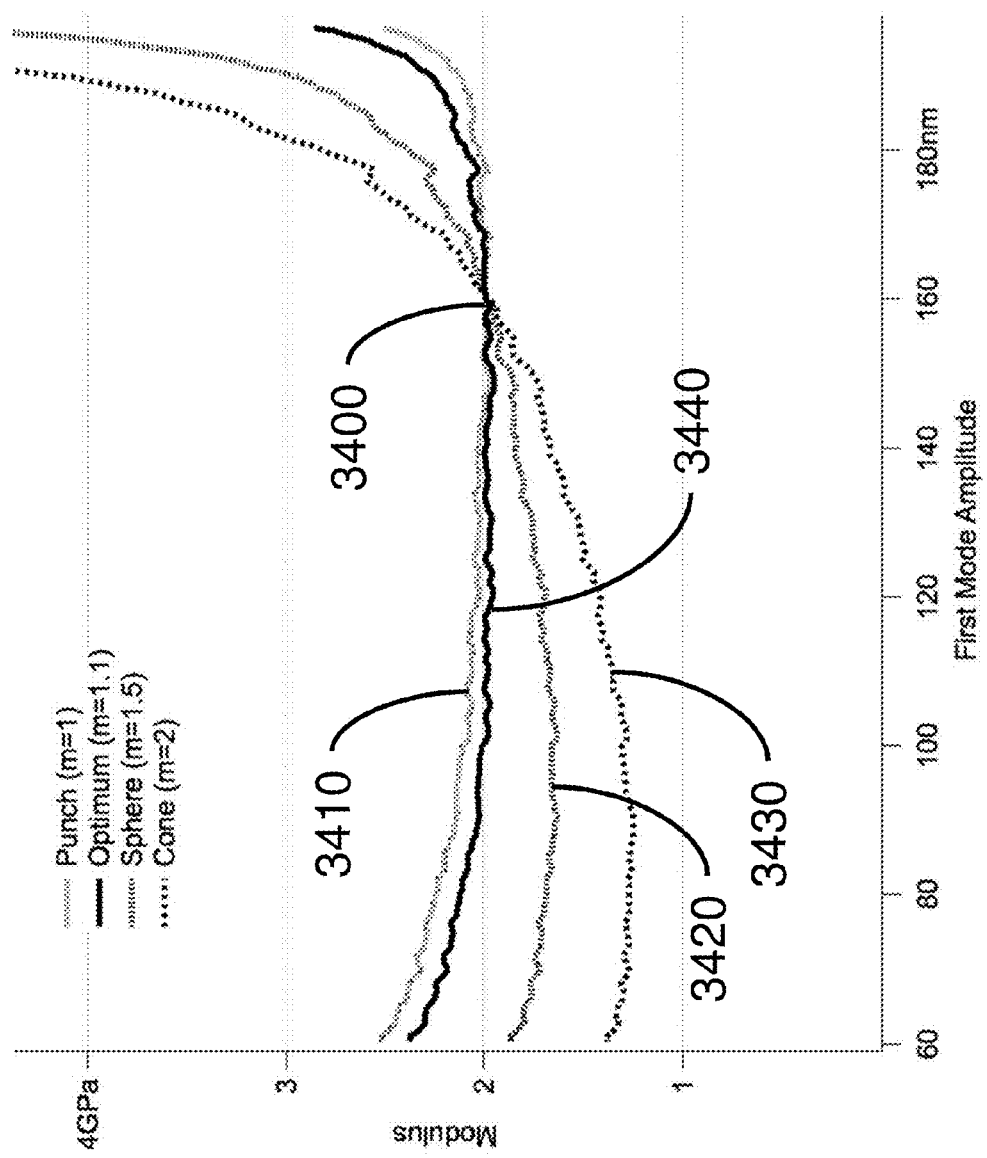
FIG. 34 Optimizing the response for the generalized Hertzian model to obtain information regarding the tip shape and to make the estimation more robust.
Figure 35:
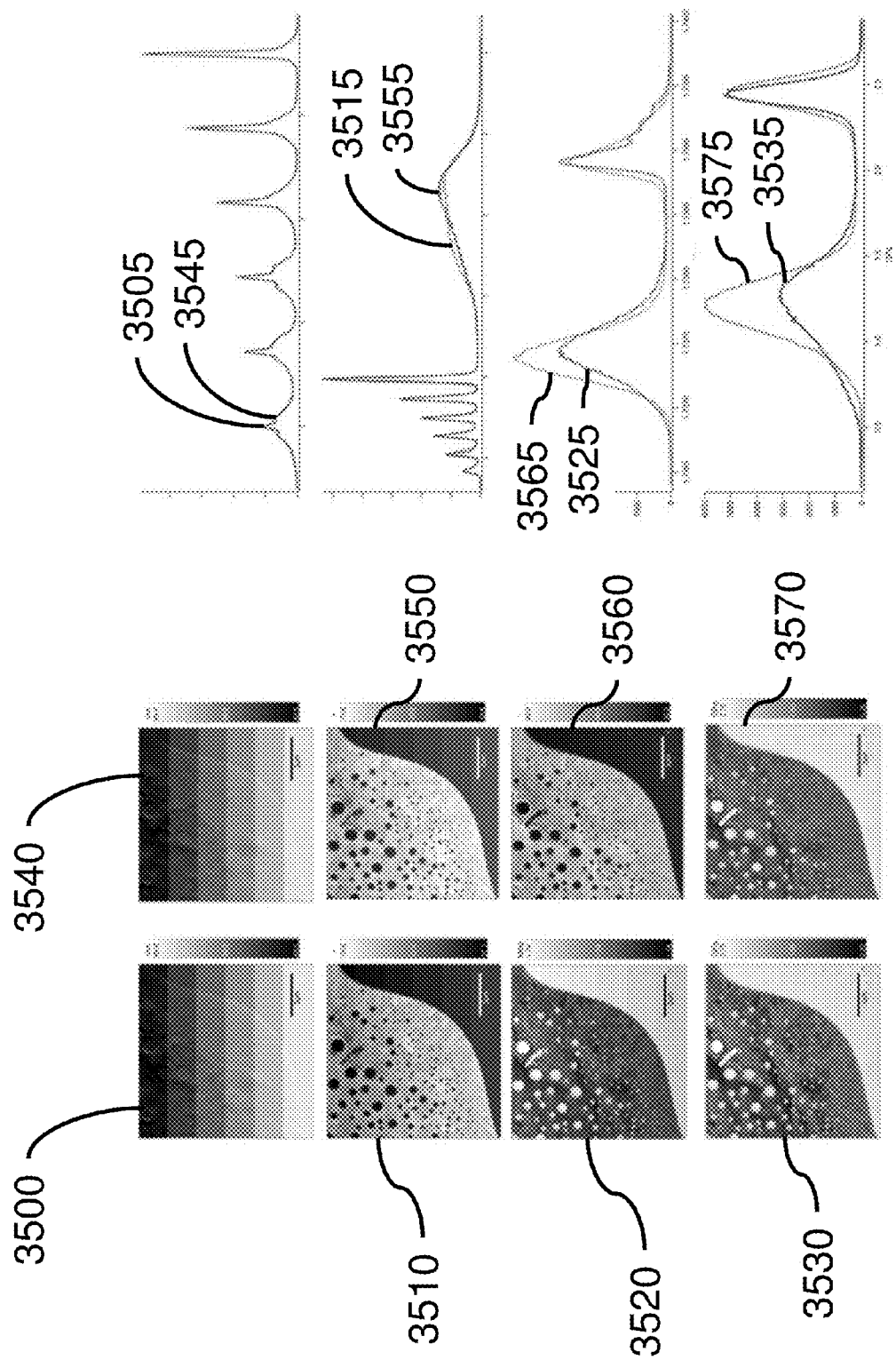
FIG. 35 Comparison of the modulus estimated using two preferred methods described here while varying the fundamental mode setpoint.

To test this condition the results of a series of numerical simulations of AM/AM (bimodal) tapping mode amplitude versus distance curves are shown in FIG. 33. The simulations were made with a publicly available tool: VEDA from nanohub.org. Similar simulations can be made using other software platforms such as MATLAB (Mathworks) and Igor (Wavemetrics). The simulated cantilever had the following parameters: $k_1$=40 N/m, $k_2$=1500 N/m, f1=320 kHz, f2=1.8 MHz, R=50 nm and Afree=10 nm. The tip-sample interaction was modeled as a spherical Hertzian contact $F_{sphere}$=4/3$E_{sphere}^{eff}\sqrt{R}\delta^{3/2}$. The sample modulus $E_{sphere}^{eff}$ was set at 100 MPa trace 3210, 1 GPa trace 3220, 10 GPa trace 3230 and 100 GPa trace 3240.

Since the simulation was made in AM/AM mode, the amplitude and phase observables of both resonant modes were converted to effective resonant frequency shifts as discussed above.

This return of a substantially constant modulus versus a indicates that the tip-sample contact mechanical model is behaving properly. In the example here, the implication is that we have correctly chosen the sphere model, consistent with the model used to generate the numerical data. Tip shape characterization is a well known problem in the art and based on this observation we describe a new method of characterizing the tip shape below.

FIG. 33 shows a series of curves where the modulus calculated with the above equations is plotted versus the first mode amplitude, 160 nm. For each of the curves, we chose the value at this amplitude to represent a "reference" point of 2 GPa. As discussed above, it is desirable that the modulus is as close to this value for every value of the first mode amplitude. The three standard models—a punch, a sphere and a cone show differing success at attaining this goal. The cone curve 3430 deviates the most and the sphere curve 3320 is only somewhat more successful. The punch curve 3410 in contrast is close to constant over the range of first mode amplitudes. However, the punch result can be improved upon by allowing the exponent value m to vary. In this case, by choosing m=1.1, we get curve 3440, which is an optimized value of the modulus over the full range of the measured first mode amplitude. The implication is that the tip shape is somewhere between a punch and a sphere, a slightly rounded punch.

The estimation of loss tangent can be extended to sub-resonant oscillatory measurements as well. While sub-resonant measurements generally have reduced signal to noise performance and tend to exert larger forces on the sample, they can also have some advantages over resonant techniques.

With sub-resonant oscillatory measurements, we can define the virial of the tip-sample interaction by $$V_{ts} = \frac{\omega}{2\pi}\langle F_{ts}z_{tip}\rangle.$$

Similarly, the dissipated power is given by $P_{ts}=\langle F_{ts}\dot{z}_{tip}\rangle$. Using these expressions, the loss tangent can be estimated by $$\tan\delta = \frac{P_{ts}}{V_{ts}}.$$

These equations can be applied to non-resonant oscillatory motion including the sub-resonant oscillatory motion made while performing force-distance curves. These curves include so called "fast" force curves that are made at a frequencies greater than a few Hertz up to frequencies at or near the resonance frequency of the cantilever. One advantage of this approach is that the oscillatory waveform can be sinusoidal, triangular or other waveforms that could be expressed as a Fourier series.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other devices, and forms of modularity, can be used.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A method of calibrating an atomic force microscope, which is equipped with a cantilever with a tip, a photodetector and a coarse positioning system and a fine positioning system for controlling a position of the cantilever and a sample, comprising the following steps:

turning a drive mechanism off;

positioning a detection laser on a side of the cantilever opposite the tip and in a center of the photodetector;

calibrating a stiffness of the cantilever from a measured thermal spectrum taken far from the surface of the sample and recording information indicative of the stiffness as representing a natural frequency of the cantilever;

approaching the tip of the cantilever to close proximity with the sample, as determined by optical inspection of the tip and the sample using the coarse-positioning system;

after said approaching, turning the drive mechanism on;

setting a drive frequency equal to the natural frequency of the cantilever as determined from said thermal spectrum;

setting a drive amplitude to a desired free oscillation amplitude;

approaching the tip of the cantilever to the surface of the sample until contact is established by setting a feedback set point to a desired interaction amplitude that is slightly less than a free oscillation amplitude;

fully separating the sample from the tip of the cantilever as determined by optical inspection using the fine-positioning system;

acquiring a cantilever tune by either setting the drive frequency to the natural frequency of the cantilever as determined from said thermal spectrum or from setting the drive frequency to a local amplitude maximum of the cantilever near a resonant frequency of the cantilever;

turning off the drive mechanism and acquiring an additional thermal spectrum of the cantilever that is closer to imaging conditions;

using a simple harmonic oscillator model and the data from the additional thermal spectrum to define a new natural frequency of the cantilever and determine a phase-to-drive-frequency relationship of the cantilever;

turning on the drive mechanism and choosing a drive frequency equal either to the new natural frequency of the cantilever or to a local amplitude maximum of the cantilever near the cantilever resonant frequency;

choosing a drive amplitude which achieves the desired cantilever free oscillation amplitude; and setting phase from a result of the aforesaid simple harmonic oscillator model.

* * * * *